(12) United States Patent
Crosbie et al.

(10) Patent No.: US 9,374,423 B2
(45) Date of Patent: Jun. 21, 2016

(54) SYSTEM AND METHOD FOR MONITORING APPS IN A VEHICLE OR IN A SMARTPHONE TO REDUCE DRIVER DISTRACTION

(71) Applicant: Excelfore Corporation, Fremont, CA (US)

(72) Inventors: John Crosbie, Fremont, CA (US); Anoop Balakrishnan, Fremont, CA (US); Shrikant Acharya, Fremont, CA (US); Shrinath Acharya, Fremont, CA (US)

(73) Assignee: Excelfore Corporation, Fremont, CA (US)

( * ) Notice: Subject to any disclaimer, the term of this patent is extended or adjusted under 35 U.S.C. 154(b) by 0 days.

(21) Appl. No.: 14/569,009

(22) Filed: Dec. 12, 2014

(65) Prior Publication Data

US 2015/0099495 A1    Apr. 9, 2015

Related U.S. Application Data

(63) Continuation-in-part of application No. 13/790,985, filed on Mar. 8, 2013, now Pat. No. 8,914,012.

(60) Provisional application No. 61/953,506, filed on Mar. 14, 2014, provisional application No. 61/714,442, filed on Oct. 16, 2012.

(51) Int. Cl.
*H01L 29/06* (2006.01)
*H04L 29/08* (2006.01)
(Continued)

(52) U.S. Cl.
CPC ............. *H04L 67/12* (2013.01); *B60K 35/00* (2013.01); *B60K 37/06* (2013.01); *B60W 50/14* (2013.01); *G06F 1/1632* (2013.01); *H04W 4/001* (2013.01); *H04W 4/008* (2013.01); *H04W 4/027* (2013.01); *H04W 4/046* (2013.01); *H04W 4/18* (2013.01); *B60K 2350/1004* (2013.01); *B60K 2350/106* (2013.01); *B60K 2350/1024* (2013.01);
(Continued)

(58) Field of Classification Search
USPC ............... 455/456.4, 466; 340/438, 439, 576
See application file for complete search history.

(56) References Cited

U.S. PATENT DOCUMENTS 6,262,657 B1 * 7/2001 Okuda ................. B60K 28/066 340/438
8,446,270 B2 * 5/2013 Shuster ................. H04M 19/04 340/438

(Continued)

FOREIGN PATENT DOCUMENTS

WO    WO 2011/047056 A1    4/2011

OTHER PUBLICATIONS

International Search Report and Written Opinion in International Application No. PCT/US2013/064837 dated Aug. 25, 2014 (15 pages).

*Primary Examiner* — David Q Nguyen
(74) *Attorney, Agent, or Firm* — Brinks Gilson & Lione

(57) ABSTRACT

A system and method for monitoring apps in a vehicle or in a smartphone to reduce driver distraction is disclosed. A controller operating inside or in combination with the head unit of the vehicle or operating inside or in combination with the smartphone may monitor operation of the vehicle, and generate alerts indicative of operation of the vehicle (such as an alert indicative that the vehicle is operating at a predetermined speed). In response to the alert, the operation of the app in the vehicle or in the smartphone may be modified.

21 Claims, 34 Drawing Sheets

(51) Int. Cl.
*H04W 4/00* (2009.01)
*H04W 4/02* (2009.01)
*H04W 4/18* (2009.01)
*B60W 50/14* (2012.01)
*B60K 35/00* (2006.01)
*B60K 37/06* (2006.01)
*G06F 1/16* (2006.01)
*H04W 4/04* (2009.01)
*H04M 1/60* (2006.01)
*H04M 1/725* (2006.01)

(52) U.S. Cl.
CPC . *B60K2350/1032* (2013.01); *B60K 2350/1096* (2013.01); *B60K 2350/352* (2013.01); *B60K 2350/901* (2013.01); *B60K 2350/903* (2013.01); *B60K 2350/906* (2013.01); *B60K 2350/962* (2013.01); *B60K 2350/967* (2013.01); *G06F 2200/1635* (2013.01); *H04M 1/6091* (2013.01); *H04M 1/72577* (2013.01); *H04M 2250/02* (2013.01)

(56) References Cited

U.S. PATENT DOCUMENTS

| | | |
|---|---|---|
| 2001/0020893 A1 | 9/2001 | Kawai et al. |
| 2007/0159354 A1 | 7/2007 | Rosenberg |
| 2010/0234047 A1* | 9/2010 | Lipovski ............ H04M 19/044 455/456.4 |
| 2011/0105097 A1 | 5/2011 | Tadayon et al. |
| 2012/0040652 A1 | 2/2012 | Lewis |
| 2012/0242474 A1 | 9/2012 | Oh et al. |
| 2013/0046510 A1* | 2/2013 | Bowne ............... G06Q 10/0833 702/187 |
| 2013/0297097 A1* | 11/2013 | Fischer ................... G06F 17/00 701/1 |
| 2013/0332063 A1 | 12/2013 | Pirwani et al. |
| 2014/0309914 A1* | 10/2014 | Scofield ............ G01C 21/3492 701/119 |

* cited by examiner

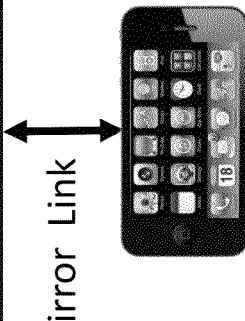
FIG. 1E
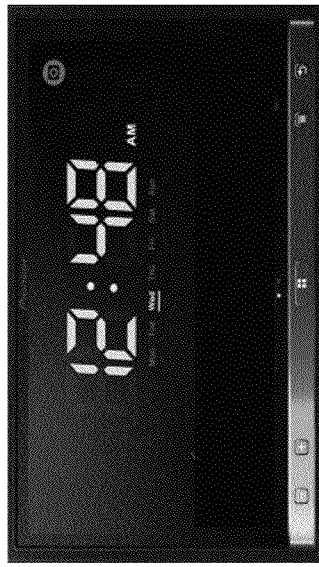
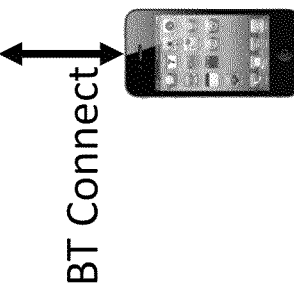
FIG 1D

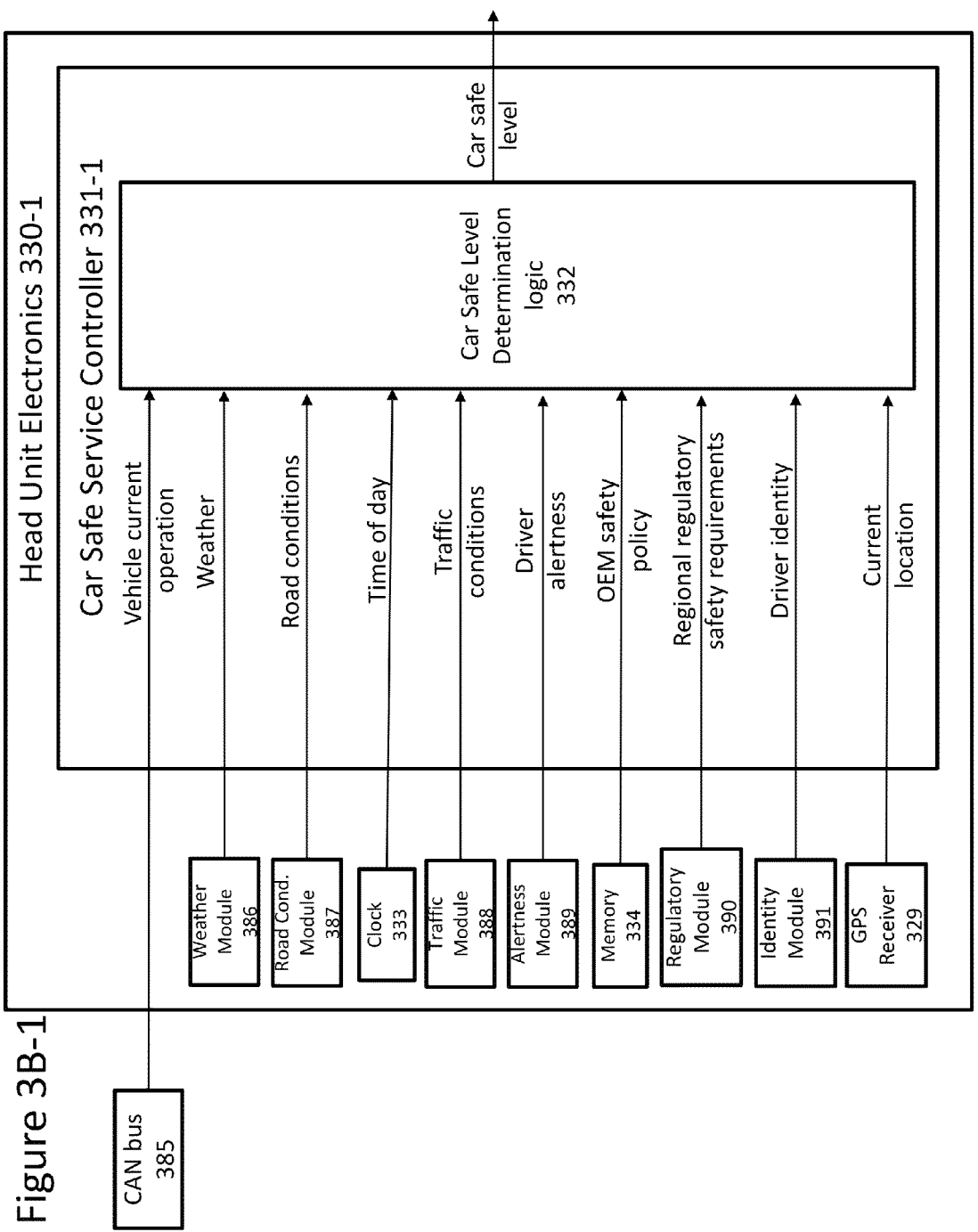

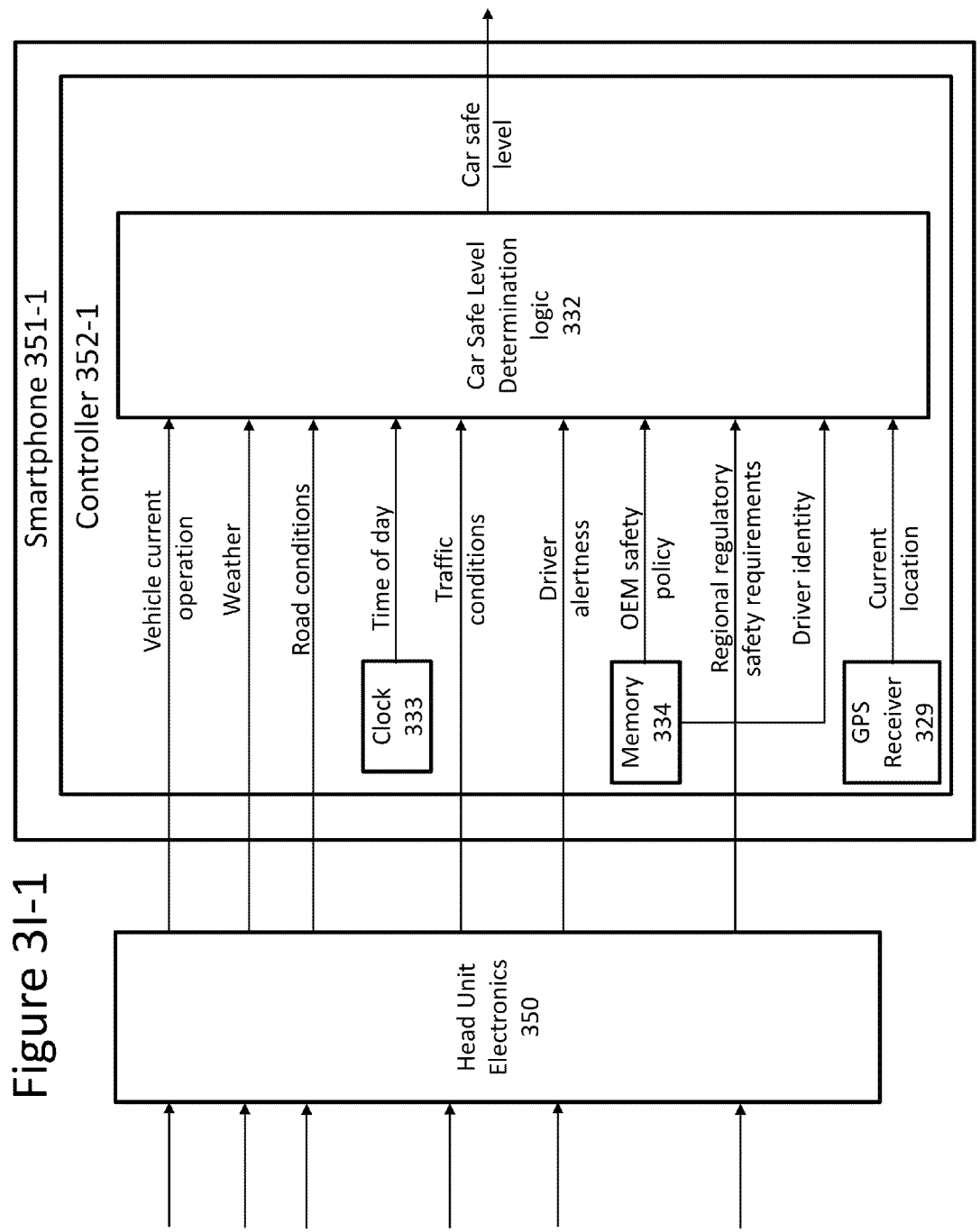

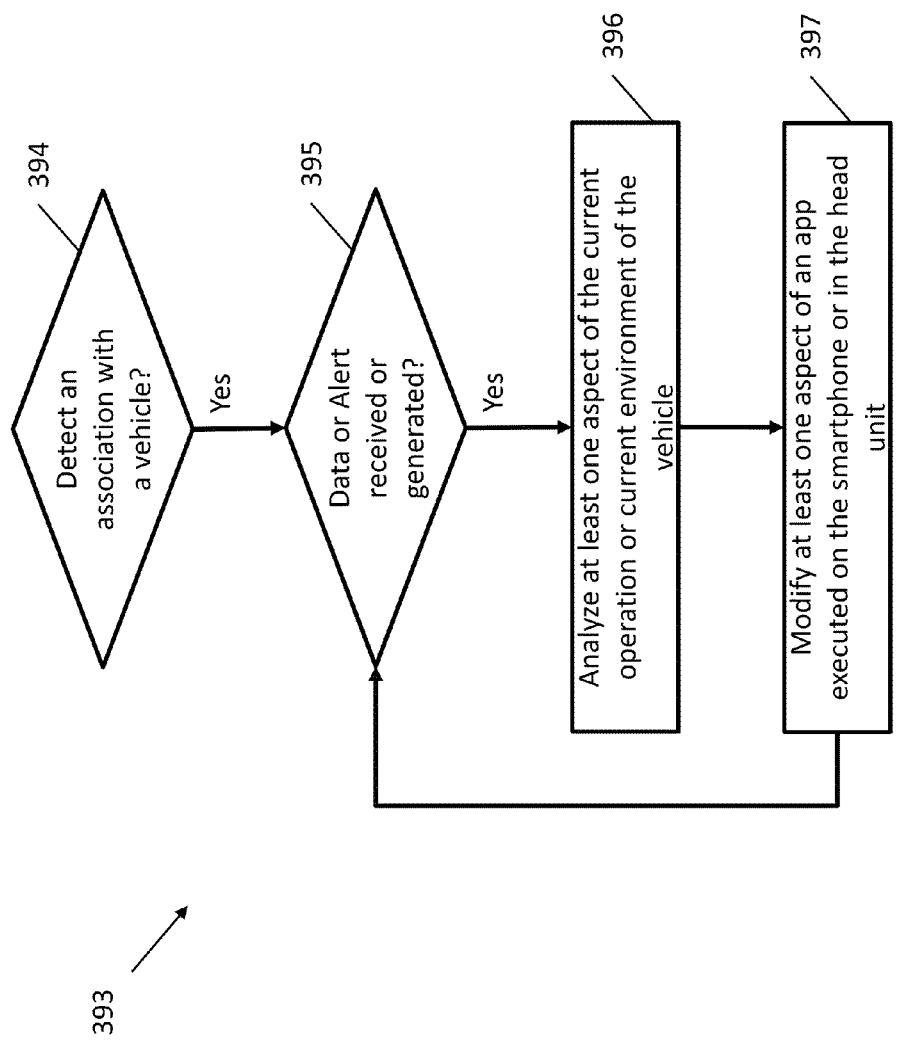

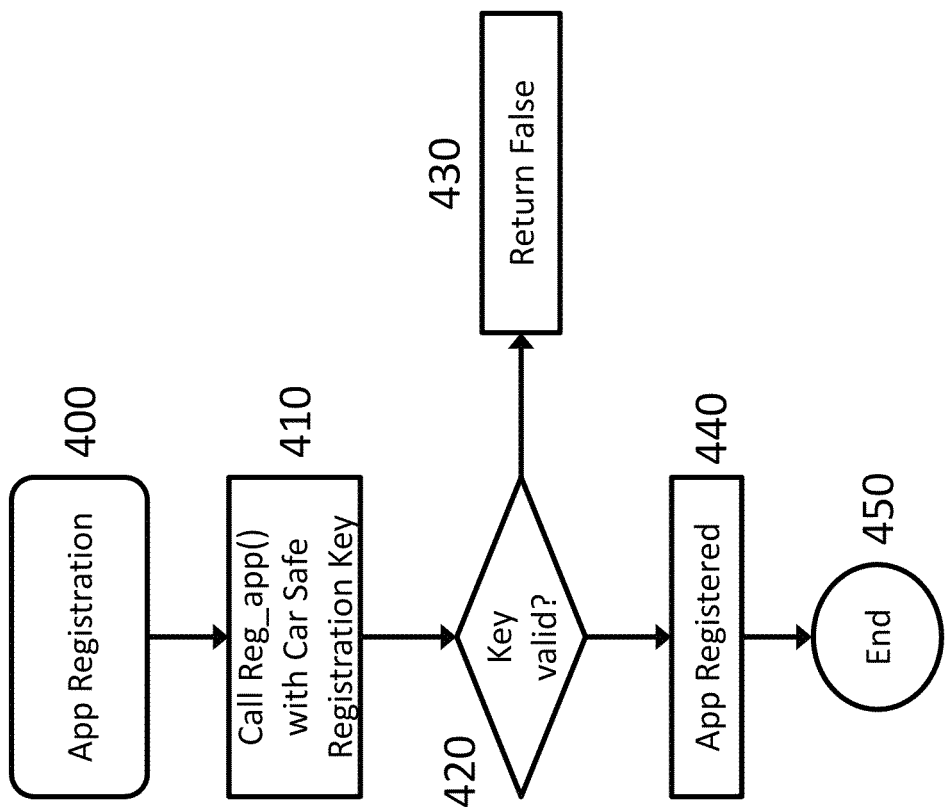

Note:
Developer may create own key pair. The Platform may generate a public key specific to Developer. Developer may encrypt with Platform public and its own private key pair. Developer may send encrypted Application along with the Public Key to Platform. Platform may then use the Developer public key and Platform private key to decrypt the submitted package.

SYSTEM AND METHOD FOR MONITORING APPS IN A VEHICLE OR IN A SMARTPHONE TO REDUCE DRIVER DISTRACTION

REFERENCE TO RELATED APPLICATIONS

This application claims the benefit of U.S. Provisional Application No. 61/953,506, filed on Mar. 14, 2014, and is a continuation in part of U.S. application Ser. No. 13/790,985 (now U.S. Pat. No. 8,914,012), filed on Mar. 8, 2013, which claims the benefit of U.S. Provisional Application No. 61/714,442, filed on Oct. 16, 2012, the entirety of U.S. Provisional Application No. 61/953,506, U.S. application Ser. No. 13/790,985 (now U.S. Pat. No. 8,914,012), and U.S. Provisional Application No. 61/953,506 are incorporated by reference herein.

TECHNICAL FIELD

This application relates generally to application software, commonly referred to as an app. More specifically, this application relates to installing and operating of apps in a moving vehicle, such as an automobile.

BACKGROUND

Apps are computer software designed to help the user to perform specific tasks. Apps may be executed on a variety of computing devices, such as on mobile devices including smartphones. For example, mobile apps are software applications designed to run on smartphones, tablet computers and other mobile devices. The apps are available through application distribution platforms, which are typically operated by the owner of the mobile operating system, such as the Apple App Store, Google Play, Windows Phone Store and BlackBerry App World. The mobile devices, such as the smartphones and tablet computers, are designed to readily accept the apps for installation and operation.

Vehicles have computing devices that interface with the driver and passengers. One type of vehicle computing device is the head unit, one example of which is a connected infotainment unit. The head unit is typically the control center and user interface for an automobile's entertainment and information center, which typically resides in the center of the dashboard and has a wireless connection to the web e.g., a Cloud Server. The head unit may provide the main controls for the radios (any combination of AM, FM, XM, Sirius, HD Radio) as well as a CD/DVD player, GPS navigation, Bluetooth cellphone integration, hard disk storage for music and iPod® connector and system status. With a Wireless connection the head unit provides status information back to the Cloud and a control to the Cloud to allow apps to be downloaded into head unit.

Today, car manufacturers have released a handful of applications for their individual platforms, such as BMW 5, Toyota Entune 8, Ford Sync 6. Car companies are reluctant to allow for apps to be freely downloaded into a vehicle. So, by design, the car manufacturers make it exceedingly difficult to load generic apps into the vehicle.

BRIEF SUMMARY

Method and systems are disclosed for operating apps in a head unit of a vehicle or in a smartphone in communication with the head unit of the vehicle. A part of the head unit, such as a controller operating inside or in combination with the head unit, or a part of the smartphone, such as a processor operating inside or in combination with the smartphone, may analyze operation of the vehicle and/or current environment of the vehicle, and based on the analysis, may determine whether and/or how to modify operation of an app (such as an app configured for execution in the head unit and/or configured for execution in the smartphone).

In one aspect, a smartphone is disclosed. The smartphone includes: a transceiver and a processor in communication with the transceiver. The processor is configured to: determine an association with a vehicle; in response to determining the smartphone is associated with the vehicle: analyze at least one aspect related to a current operation or a current environment of the vehicle; and in response to the analysis, modify at least one aspect of operation of an app, wherein the app is configured for execution in the smartphone or in a head unit of the vehicle.

The processor may determine whether there is an association with the vehicle in one of several ways. In one embodiment, the processor of the smartphone may determine whether there is an association based on whether the smartphone is in short range wireless communication with the head unit. In an alternate embodiment, the processor of the smartphone may determine whether there is an association based on whether a network is formed amongst the smartphone and the head unit. The processor may further be configured to, in response to determining no association with the vehicle, reject modifying operation of the app based on the at least one aspect related to the current operation or the current environment of the vehicle.

The app which is controlled by the smartphone may be resident in the smartphone and/or resident in the head unit of the vehicle. In the instance that the app is resident in the memory of the smartphone, the processor is configured to modify the at least one aspect of operation of the app by modifying operation of the app in the smartphone. In the instance that the app is resident in the head unit of the vehicle, the processor is configured to modify the at least one aspect of operation of the app by transmitting a communication from the smartphone to the head unit, the communication indicative to the head unit to modify operation of the app in the head unit (e.g., indicative to the head unit to disallow at least one functionality or characteristic of the app being executed in the head unit).

The smartphone, in analyzing at least one aspect related to a current operation or a current environment of the vehicle, may analyze data related to the current operation or the current environment of the vehicle or may analyze alerts related to the data. Examples of alerts include: a speed alert indicative of speed of the vehicle, a weather alert indicative of weather in the current environment of the vehicle, a traffic alert indicative of traffic in the current environment of the vehicle, or an accident alert indicative of an accident in the current environment of the vehicle. The data or the alerts may thus be used to determine whether to modify operation of the app. In one embodiment, the smartphone receives the data from an external device (such as the head unit or a remote server external to the vehicle). In an alternate embodiment, the smartphone generates the data (such as the current location of the vehicle) and/or generates the alert. In still an alternate embodiment, the smartphone may receive an alert from an external device.

Further, the smartphone, in analyzing at least one aspect related to a current operation or a current environment of the vehicle, may analyze the data or alerts to determine a vehicle safe indicator, which may also be termed the car safe level and which may be a number or other indicator of a degree of vehicle safety (such as 10 different levels of safety). The vehicle safe indicator may be correlated to functions or characteristics of the app that are allowed and/or disallowed. In this regard, the analysis may first determine, based on the current operation or current environment of the vehicle, the vehicle safe indicator. In turn, using the determined vehicle safe indicator, the correlated allowed or disallowed functions or characteristics of apps may be determined.

One example of current operation of the vehicle is speed of the vehicle. The speed of the vehicle may be determined by the smartphone, or may be received by the head unit. In one embodiment, the speed may be used to determine the vehicle safe indicator, which in turn, may be used to determine the allowed or disallowed functions.

In one embodiment, the smartphone's analysis of the current operation or current environment of the vehicle may be dependent on the current location of the vehicle. Different jurisdictions, such as different states or countries, may have different rules to prevent driver distraction (such as no texting while driving at a speed greater than zero MPH or no texting while driving at a speed greater than ten MPH). In this regard, the smartphone may determine the current location of the vehicle, may determine, based on the current location, the current jurisdiction of the vehicle, and determine, based on the determined jurisdiction, the rules for allowing or disallowing functions/characteristics of apps. For example, based on the determined jurisdiction, the smartphone may access a look-up table that correlates jurisdictions to corresponding rules. As another example, the smartphone may send a poll to an external device, such as a server, with the determined jurisdiction, and in response, receive the rules from the external device for the determined jurisdiction.

In another aspect, a method for operating a smartphone is disclosed. The method includes: determining, by the smartphone, an association with a vehicle; in response to determining the smartphone is associated with the vehicle, analyzing at least one aspect related to a current operation or a current environment of the vehicle, and in response to the analysis, modifying at least one aspect of operation of an app, In yet another aspect, a head unit in a vehicle is disclosed. The head unit may control apps executed within the head unit and/or apps executed within a smartphone. For example, the head unit may include: a transceiver; a processor in communication with the transceiver. The processor is configured to: determine an association of a smartphone with the head unit; in response to determining the smartphone is associated with the head unit: analyze at least one aspect related to a current operation or a current environment of the vehicle in order to determine whether to modify at least one aspect of operation of an app in the smartphone; and in response to determining to modify at least one aspect of operation of the app, transmitting, via the transceiver, a communication to the smartphone, the communication indicative to the smartphone to modify operation of the app in the smartphone (e.g., the communication is indicative to the smartphone to disallow at least one functionality or characteristic of the app being executed in the smartphone).

Likewise, the head unit may be configured to control apps on the head unit. To that end, the processor is further configured to determine, based on the current operation or the current environment of the vehicle, whether or how to control operation of a head unit app, with the head unit app configured for execution in the head unit.

In one embodiment, the head unit's analysis of the current operation or current environment of the vehicle may be dependent on the current location of the vehicle. The head unit may determine the current location of the vehicle, may determine, based on the current location, the current jurisdiction of the vehicle, and determine, based on the determined jurisdiction, the rules for allowing or disallowing functions/ characteristics of apps. For example, based on the determined jurisdiction, the head unit may access a look-up table that correlates jurisdictions to corresponding rules. As another example, the head unit may send a poll to an external device, such as a server, with the determined jurisdiction, and in response, receive the rules from the external device.

In an alternate embodiment, different apps may be assigned to different classifications. Examples of classifications may include navigation, text-input apps, video-output apps, etc. In this regard, different classes of apps may be controlled differently.

In still another aspect, a controller of a head unit is disclosed. The controller is configured to receive information regarding a current operation or a current environment of the vehicle; and determine whether or how to control operation of an app based on the current operation or the current environment of the vehicle, wherein the app comprises a software application downloaded from a server to the head unit. In one example, the controller is configured to receive information generated either internal to the vehicle (such as relating to the current status of the vehicle) and/or information external to the vehicle (such as relating to road conditions, weather conditions, traffic conditions, or the like). Depending on the information received, the controller may determine whether to modify operation of the app and/or how to modify operation of the app (such as modifying the ability to make changes to the app or provide inputs to the app). In another example, the controller is further configured to execute the app, and is configured to determine whether or how to control operation of the app by determining a type of app. Examples of types of apps include, but are not limited to, whether the app is controllable by the controller in order to reduce distraction to a driver of the vehicle; whether the app is an audio app; whether the app is a video app; whether the app is displaying info such as insurance quotes, parking or weather etc. The controller may receive information from a variety of sources, such as sensors on the vehicle and/or sensors external to the vehicle. Examples of sensors include, but are not limited to, speed sensors, camera sensors (e.g., ADAS), or the like. The information may further be one of several types, such as car operation alerts, weather alerts, road alerts, emergency alerts, or the like. The alerts may be generated internal to the vehicle or external to the vehicle. The information may be communicated using a multitude of communication methods, such as wired or wireless communication (such as a cellular communication, Wi-Fi, Bluetooth, etc.). For example, the information may be generated in the vehicle and communicated via the CAN bus. As another example, the information may be communicated wirelessly, such as via the 802.11p standard. As still another example, the vehicle may receive the alerts via the web (such as through a cloud web). The controller may use the information in order to determine the current state of the vehicle and/or the current environment of the vehicle (e.g., speed of vehicle, catastrophic event, traffic info from the surround cameras, lane departure warnings etc.). The controller may control the operation of the app based on one or more factors, such as based on any combination of the following: the current state of the vehicle; the current environment of the vehicle; the type of app (e.g., whether the app is "car safe" or can be modified to reduce distraction to the driver); the input device used to input data to the app (e.g., whether the input device requires a text input via a keyboard or touchpad or whether the input device is voice-activated); and/or the output device used to output data from the app (e.g., a display configured either for output to the driver or to a backseat passenger). For example, if the app is found not to be "car safe", the operation of the app may be frozen (so that input is not accepted or output is not generated) or may be ended (so that execution of the app is stopped). As another example, if the app is found to be "car safe", the operation of the app may be modified. As still another example, if the controller determines that the app receives input from an input device (such as an input device associated with the driver or associated with a backseat passenger), in response to a determination of a state of the vehicle, the controller may determine whether to change operation of the app to modify the ability to input via the input device (e.g., if the input device is associated with the driver, disallow input via the input device, or if the input device is associated with a backseat passenger, maintain the ability to input via the input device). As yet another example, if the controller determines that the app generates output for an output device (such as an output device associated with the driver or associated with a backseat passenger), in response to a determination of a state of the vehicle, the controller may determine whether to change operation of the app to modify the ability to output to the output device (e.g., if the output device is associated with the driver, disallow output to the output device, or if the output device is associated with a backseat passenger, maintain the ability to output to the output device). As still another example, if the controller determines an alert as to the operation of the vehicle (e.g., a CAN alert indicative of the anti-lock breaking system activating) and/or to the environment of the vehicle (such as a determination as to inclement weather (e.g., foggy, snowy or rainy conditions), excessive traffic, other road alerts or emergency alerts), the controller may modify operation of the app. More specifically, the Apps and/or the controller may be linked to services, such as Road Alerts, Weather alerts specific to a journey the driver is taking or other emergency services, which can send alerts through the web into the app. In response to receipt of the alert, the controller may change operation of the app and/or may change the metrics for controlling operation of the app. In one embodiment, in response to receiving an emergency alert (either indicative of an emergency alert related to operation of the vehicle or related to the environment of the vehicle), the controller may disable operation of part or all of the app. Alternatively (or in addition), the controller may change the metrics of controlling the app. For example, the amount of freedom that the driver (or other passenger) has to make changes or provide inputs to the app. As another example, in response to receiving an emergency alert, the controller may change the speed at which such limitations are enforced (e.g., in ordinary conditions, functions of the app may be enable or disabled at 10, 20, 30 MPH (below 10 MPH, all operations allowed, 10-20 MPH, certain inputs allowed, 20-30 MPH, voice input allowed, and over 30 MPH, no input allowed), can be changed to 5, 15 and 25 MPH, respectively.

In another aspect, a controller of a head unit in a vehicle is disclosed, the head unit being in communication with a portable electronic device (such as a smartphone). The controller is configured to: receive information regarding a current operation or a current environment of the vehicle; generate an alert, the alert indicative of the current operation or the current environment of the vehicle; and send the alert to the portable electronic device, the alert used by the portable electronic device to determine whether or how to control operation of an app executed by the portable electronic device, wherein the app comprises a software application downloaded from a server to the portable electronic device. The controller may control the operation of the app being executed on a smartphone in communication with the head unit based on one or more factors, such as based on any combination of the following: the current state of the vehicle; the type of app (e.g., whether the app being executed on the smartphone is "car safe" or can be modified to reduce distraction to the driver); the input device used to input data to the app (e.g., whether the input device requires a text input via a keyboard or touchpad or whether the input device is voice-activated); and/or the output device used to output data from the app (e.g., a display on the smartphone is configured either for output to the driver or to a backseat passenger).

In yet another aspect, an app configured for execution on a smartphone is disclosed. The app is configured to: request, via a transceiver on the smartphone, communication with a head unit of a vehicle; receive, via the transceiver, an alert, the alert indicative of the current operation or a current environment of the vehicle; and analyze the alert to determine whether or how to control operation of the app, wherein the app comprises a software application downloaded from a server to the portable electronic device.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

FIGS. 1D-E are car-safe configurations with smartphones.

FIG. 3B-1 is one example of a block diagram of the head unit electronics.

FIG. 3B-2 is another example of a block diagram of the head unit electronics.

FIG. 3I-1 is still another example of a block diagram of the head unit electronics and the smartphone in which the smartphone determines the car safe level.

FIG. 3I-2 is yet another example of a block diagram of the head unit electronics and the smartphone in which the smartphone determines the car safe level.

FIG. 3O is a flow diagram in which the functionality determination logic (either resident in the head unit or in the smartphone) determines which functions are allowed or disallowed.

FIG. 3Q is a flow diagram in which the smartphone detects an association with a vehicle and monitors operation and/or environment of the vehicle in order to determine whether to modify operation of apps being executed in the smartphone or in the vehicle.

FIG. 4 is a flow diagram of registration of a car-safe app.

DETAILED DESCRIPTION

Figure 1B:
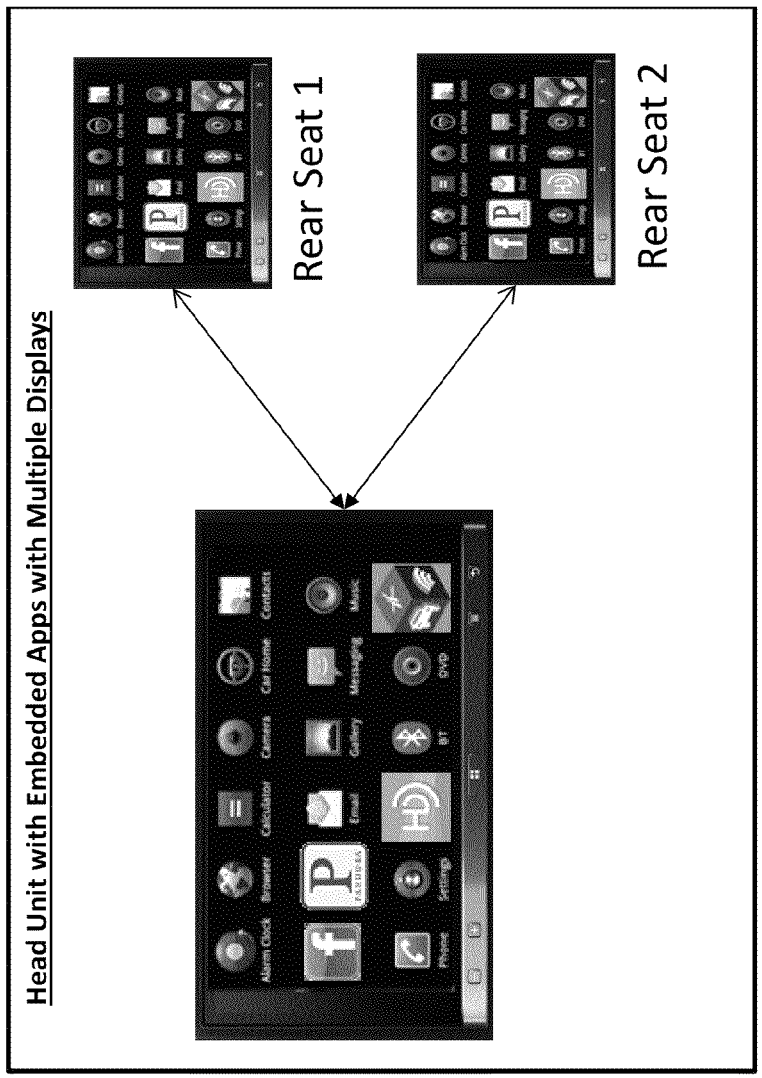
FIGS. 1A-C are car-safe configurations with head units.
Figure 1A:
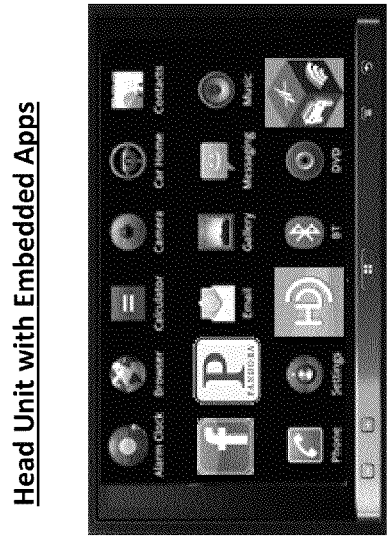
Figure 1C:
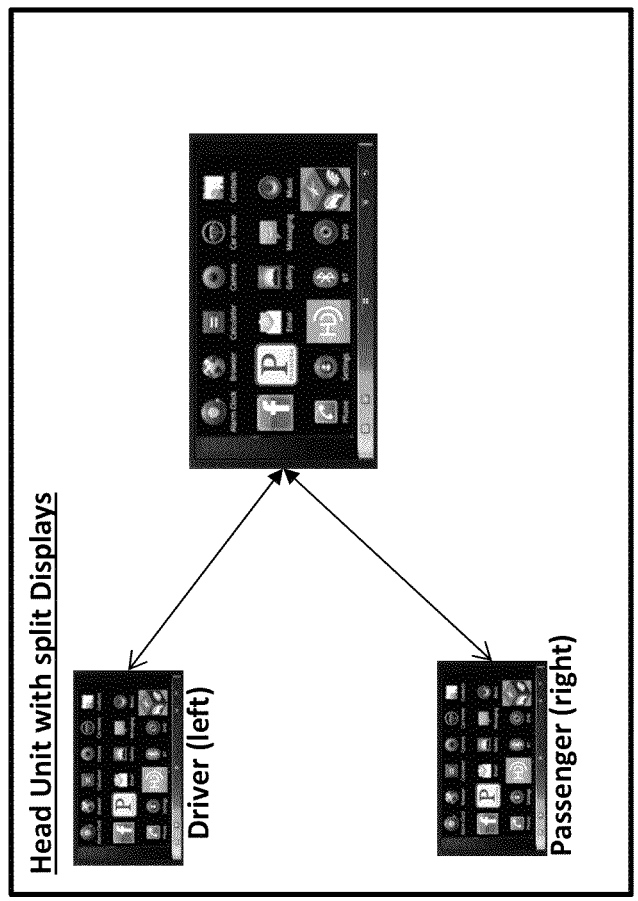

Apps may be executed in a vehicle in one of several ways. In one embodiment, the app may be stored in and be executed by the head unit. One example of this is illustrated in FIG. 1A in which one or more apps are embedded in the head unit of a vehicle. The vehicle may be used for transporting people or goods, and may be any one of the following: an automobile, a motorcycle, a truck, a cart, or the like. Another example of this is illustrated in FIG. 1B in which one or more apps are embedded in the head unit, and in which one or more electronic devices communicate with the head unit. The one or more electronic devices may be mounted for display in a rear seat of the vehicle (such as in the back side of a headrest). Another example is illustrated in FIG. 1C in which one or more apps are embedded in the head unit, and in which the main display screen is split into two, one for the driver and the other for the front seat passenger. The driver is not privy to the front passenger display screen and vice-versa. Therefore, the front seat passenger display acts as if there is another device connected to the head unit. In operation, the one or more electronic devices may communicate with the head unit, request execution of the app, and receive a stream of data from the head unit when executing the app.

In another embodiment, the app may be stored in and be executed by a device other than the head unit. One example of this is illustrated in FIG. 1D in which an electronic device, such as a smartphone, communicates with a head unit. More specifically, FIG. 1D illustrates a display-less head unit with connection to a smartphone where the smartphone may become the "car safe" applicable device. The smartphone may include an Android interface, or other type of interface, e.g. HTML5 which may have the same application packaged download capabilities such as the Android. The smartphone stores the one or more apps therein, and executes the apps. Further, the smartphone communicates with the head unit, such as via a Bluetooth or other near-field wireless communication protocol. As shown in FIG. 1D, the display of the head unit does not mirror the display of the smartphone. Rather, the head unit provides information (such as alerts as to the operation of the vehicle) to the smartphone, as discussed in more detail below. Another example of this is illustrated in FIG. 1E in which an electronic device, such as the smartphone, communicates with a head unit. More specifically, the head unit may operate in Mirror Mode, wherein the Smartphone Screen is projected onto the head unit Display. In such a situation, the car safe apps are installed in the smartphone so that the smartphone stores the one or more apps therein, and executes the apps. Further, the smartphone communicates with the head unit, such as via near-field wireless communication protocol. As shown in FIG. 1E, the smartphone provides information for display on the display of the head unit (e.g., so that the display of the head unit mirrors the display of the smartphone). As still another example, the smartphone may communicate with the head unit, such as via a near-field wireless communication protocol, and may use various input and/or output devices from the head unit. More specifically, the smartphone may include one or more safe apps installed therein. When executed, the safe apps may communicate with the head unit in order to: send information to the head unit for output (e.g., send information for display on a screen of the head unit, send information for output on a speaker of the head unit, etc.); and receive information from the head unit (e.g., receive from the head unit a touch-screen input indicative of a user touching a part of the touch-screen in the head unit; receive information as to current operation of the vehicle, etc.).

In FIGS. 1D and/or 1E, in one embodiment, the head unit provides information (such as alerts or event notifications as to the operation of the vehicle) to the smartphone, and the smartphone makes the determination whether and/or how to modify operation of the app, as discussed in more detail below. In this embodiment, the smartphone is provided the information as to the operation of the vehicle (such as in the form of an alert), and makes the determination whether and/or how to modify operation of the app. In an alternative embodiment, the head unit determines whether and/or how to modify operation of the app, and sends a command to the smartphone. In response to receiving the command, the smartphone executes the command in order to implement whether and/or how to modify operation of the app. In this embodiment, the head unit makes the determination whether and/or how to modify operation of the app. Further, in this embodiment, the head unit may make a threshold determination as to the type of app that is being executed on the smartphone. If the type of app is one that can be controlled by the head unit (and more specifically, is deemed "car safe", as discussed below), the head unit is configured to send information to the smartphone (such as the head unit sending information as to the operation of the vehicle for the smartphone to process as illustrated in FIG. 1D or such as the head unit sending information in a mirror link as illustrated in FIG. 1E).

In this regard, in managing the operation of an app, car safe functionality (which may be manifested in hardware, software, or a combination of hardware and software) may make one or more determinations including: (1) determination that an alert which may affect the car safe operation has occurred; (2) determination of the state of the vehicle (including the determination of the current operation and/or the current environment of the vehicle, the determination of the car safe level, etc.); (3) in response to the determination of the state of the vehicle, determining whether (and how) to modify operation of the app; (4) dependent of the varying stages of the state of the vehicle, change the level of modification of the app; (5) determining whether an app is car safe approved; (6) determination as to which car safe policies are implemented for different electronic devices within (or in communication with) the vehicle; and/or (7) determination which jurisdiction the vehicle is in, and the policies corresponding to the determined jurisdiction.

In one embodiment, the one or more car safe determinations or functionality may be performed by the head unit (such as the same elements within the head unit or different devices within the head unit). In an alternate embodiment, the one or more car safe determinations or functionality may be performed by an electronic device other than the head unit (such as a smartphone in communication (e.g., Bluetooth communication) with the head unit). In still an alternate embodiment, a first set of car safe determinations or functionality may be performed by the head unit and a second set of car safe determinations or functionality may be performed by the electronic device other than the head unit (such as the smartphone in Bluetooth communication with the head unit). In a first more specific embodiment, the first set of car safe determinations or functionality performed by the head unit is mutually exclusive to the second set of car safe determinations or functionality performed by the electronic device other than the head unit. In a second more specific embodiment, the first set of car safe determinations or functionality performed by the head at least partly overlap with the second set of car safe determinations or functionality performed by the electronic device other than the head unit.

For example, the head unit may determine the state of the vehicle. Further, based on the state of the vehicle, the head unit may determine whether (and how) to control the operation of the app. For example, depending on the type of alert and/or the type of app (e.g., whether the app is designated as "car safe", as discussed below) and/or which display the app is outputting to (e.g., whether the app outputs to a display on the main console, which is visible to the driver, or whether the app outputs to a display in the rear seat, which is not visible to the driver), the head unit may determine whether to control the operation of the app. As one example, the head unit may determine that the app is outputting to the rear seat, in which case, the head unit will determine not to modify the operation of the app. As another example, the head unit may determine that the app is outputting to the main console (visible to the driver), in which case, the head unit may determine to modify the operation of the app. As still another example, the head unit may determine that the functionality and/or characteristics of the app cannot be controlled (e.g., the app is not designated as car safe), the head unit may determine to modify operation of the app. Further, in response to determining to control the operation of the app, the head unit may determine how to control the operation of the app based on the type of alert and/or the type of app (e.g., the control of the app may be dependent on whether the app is designated as "car safe" or not, as discussed below). In one embodiment, the head unit driver side display may show a different screen than the front passenger display. In such cases, only the driver side screen may be constrained per the "car safe" policies in force.

In an alternate embodiment, the determination as to the state of the vehicle may be performed by the head unit, whereas the determination whether (and how) to control the operation of the app may be performed by an electronic device other than the head unit (such as a smartphone that is communication with the head unit, as illustrated in FIGS. 1D-E). For example, the smartphone (or other electronic device) may receive a communication from the head unit, with the communication indicating the current state of the vehicle. In response to the communication, the smartphone may determine whether (and how) to control the operation of the app. So that, the "car safe" software for determining whether (and how) to control operation of the app may be resident on the smartphone. For example, depending on any combination of the following factors including: the type of alert (road alert, weather alert, emergency alert, car emergency alert, etc.); the type of app (e.g., whether the app is designated as "car safe", as discussed below); and/or which display the app is outputting to (e.g., whether the smartphone is docked in a position visible by the driver, or whether the smartphone is docked in the rear seat of the vehicle), the smartphone may determine whether to control the operation of the app. Further, in response to determining to control the operation of the app, the smartphone (or other electronic device) may determine how to control the operation of the app based on the type of alert and/or the type of app (e.g., the control of the app may be dependent on whether the app is designated as "car safe" or not, as discussed below).

The functionality of the smartphone determining whether (and how) to modify operation of the app may be dependent on the mode of the smartphone. For example, the smartphone may recognize one of two modes: (1) a head unit communication mode in which the smartphone is communicating with the head unit; and (2) a normal communication mode in which the smartphone is not communicating with the head unit. When the smartphone determines that the smartphone is communicating with the head unit (e.g., via the BT connection illustrated in FIG. 1D), the smartphone may determine that it is in the first mode. In the first mode, when the smartphone receives the communication from the head unit, the smartphone may determine whether (and how) to modify operation of the app running on the smartphone. In the second mode (whereby the smartphone is not communicating with the head unit) when no connection exist, the smartphone may run under no supervision or controls and operations of the app are not restricted.

In yet another embodiment, the head unit may send information as to the state of the vehicle (such as the current operation of the vehicle and/or the current environment of the vehicle) to an electronic device other than the head unit (such as a smartphone), and the determination as to the state of the vehicle and the determination whether (and how) to control the operation of the app may be performed by the electronic device other than the head unit (such as the smartphone that is communication with the head unit, as illustrated in FIGS. 1D-E). For example, the smartphone (or other electronic device) may receive a communication from the head unit, with the communication indicating information that the smartphone may use to determine the current state of the vehicle. In response, the smartphone may determine the state of the vehicle, and accordingly determine whether and/or how to control the app.

The state of the vehicle may comprise any one of multiple states. As discussed in more detail below, the head unit may determine the state of the vehicle and/or the smartphone may determine the state of the vehicle. For example, the head unit may receive one or more data inputs from the current operation (e.g., current speed, etc.) or the current environment of the vehicle (e.g., traffic congestion, road conditions, weather conditions, etc.) in order to determine the state of the vehicle. In one embodiment, the state of the vehicle is determined. As merely one example, the state of the vehicle may be reflected in a determined car safe level, discussed in more detail below. After the state of the vehicle is determined, a determination may be made whether (or how) to control the app. As discussed in more detail below, different car safe levels may be correlated (such as via a look-up table) to different functionalities and/or different characteristics that are allowed and/or disallowed. In this regard, once the current car safe level is determined, the functionalities and/or characteristics (corresponding to the current car safe level) that are allowed and/or disallowed may be determined. The car safe software may then command the app to enable (or disable) the functionalities and/or characteristics corresponding to the current car safe level.

Alternatively, the state of the vehicle is not determined in a separate step. Rather, the inputs reflective of the current state of the vehicle are correlated directly to whether (or how) to control the app. More specifically, the inputs reflective of the current state of the vehicle may be correlated to the functionalities and/or characteristics that are allowed and/or disallowed. In this regard, there is no intermediate step of determining the state of the vehicle (such as the car safe level). For example, one or more rules may correlate the inputs reflective of the current state with functionalities and/or characteristics that are allowed and/or disallowed.

Whether or not the state of the vehicle is determined in a separate step, prior to controlling the apps, the apps may be polled to determine the functionalities and/or characteristics of the apps. For example, in response to the poll, the apps may state that "audio input", "video output", "manual input (e.g., via touch-screen or keyboard)", etc. is included when executing the app. Alternatively, the apps may state varying degrees of the functionalities and/or characteristics of the apps. For example, with regard to "manual input", different apps may require more extensive manual input than other apps. Thus, the app may report "extensive manual input" (such as in the context of an airline reservation app, which requires extensive manual input) or may report "minimal manual input" (such as in the context of an Internet radio app, which requires minimal manual input). As discussed in more detail below, one car safe level may allow (or disallow) one varying degree of functionality or characteristic (e.g., "extensive manual input") and allow another varying degree of functionality or characteristic (e.g., "minimal manual input") In this regard, when it is determined what functionalities and/or characteristics are allowed and/or disallowed, only the functionalities and/or characteristics that the app previously reported are considered and/or reported to the app. For example, if the app reports "manual input" but does report "audio input", in the event that it is determined, based on the current inputs, both "manual input" and "audio input" are allowed, the software may command the app only that "manual input" is allowed. Conversely, if the app reports "manual input" but does report "audio input", in the event that it is determined, based on the current inputs, both "manual input" and "audio input" are disallowed, the software may command the app only that "manual input" is disallowed.

Figure 2A:
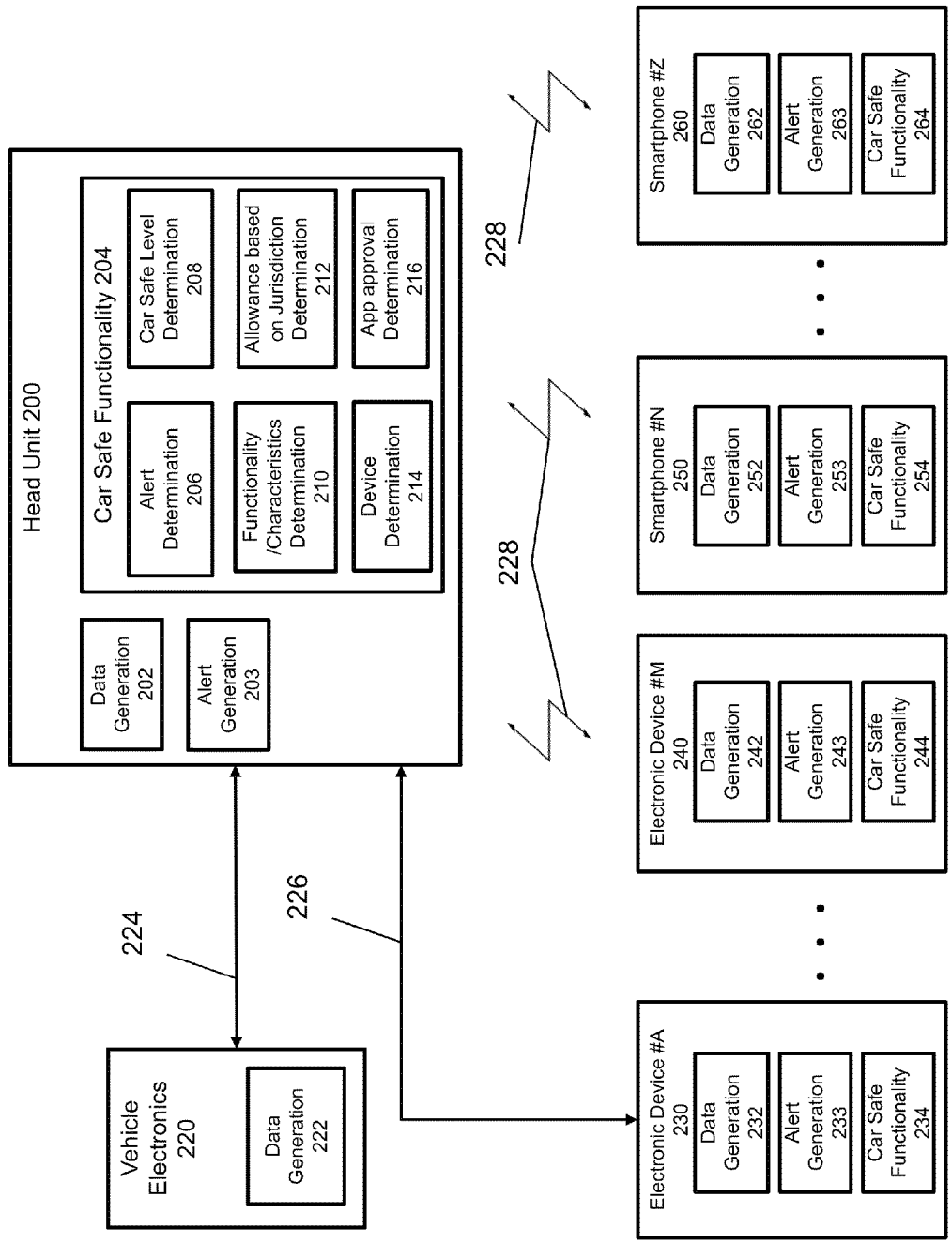
FIG. 2A is one example of a block diagram of a head unit, vehicle electronics, one or more electronic devices, and one or more smartphones.

FIG. 2A is one example of a block diagram of a head unit 200, vehicle electronics 220, one or more electronic devices (represented as electronic device #A 230 and electronic device #M 240), and one or more smartphones (represented as smart phone #N 250 and smartphone #Z 260). Examples of the electronic device may include, but are not limited to: a smart watch; a camera; GPS navigation device; or the like.

The various devices may communicate wirelessly or wired with the head unit 200. For example, as illustrated in FIG. 2A, vehicle electronics 220 communicates via bus 224 (e.g., via a CAN bus). Likewise, electronic device #A 230 communicates via a wired connection 226. For example, the wired connection 226 may comprise a USB connection or a DMI connection. Finally, electronic device #M 240, smartphone #N 250, and smartphone #Z 260 communicate wirelessly. For example, the wireless connection 226 may comprise a BT connection or a Wi-Fi connection or other short range wireless communication protocol.

Regardless of the mode of communication, the devices may send communications to and/or receive communications from head unit 200. The communications to and/or from the head unit 200 may indicate an association of the device with head unit 200. As one example, a smartphone may communicate with head unit 200 via Bluetooth. More specifically, Bluetooth may include handshaking whereby the device may communicate with the head unit 200. In one embodiment, a network may be established between the smartphone and the head unit 200. Thus, the association may be based on a connection validation with a part of the vehicle, such as the head unit 200.

For example, when Bluetooth-capable devices come within range of one another (such as the smartphone being placed within the vehicle), an electronic conversation takes place to determine whether the head unit 200 and the smartphone have data to share or whether one needs to control the other. The electronic conversation may happen automatically. Once the conversation has occurred, the head unit 200 and the smartphone may form a network. In one particular example, Bluetooth systems may create a personal-area network (PAN), or piconet, that may fill the vehicle. In this way, the smartphone and the head unit 200 may both recognize that the smartphone is associated with the head unit. In this regard, in one embodiment, when a smartphone is not in Bluetooth communication with the head unit 200, the smartphone determines that it is not associated with the head unit 200.

As another example of an association with the head unit 200, the device may communicate with the head unit via another wireless protocol, such as Wi-Fi or WiDi. When the head unit 200 and/or the electronic device communicate with one another via the wireless protocol, the association may be determined.

As still another example of an association with the head unit 200, the electronic device, such as electronic device #A 230, may be connected to the head unit 200 via a wire 226. This wired connection may likewise indicate to the electronic device and the head unit 200 of an association of the electronic device with the head unit.

As discussed in more detail below, association of the device with the head unit 200 (whether determined by the head unit 200 or by the device) may determine whether to implement some or all of the car safe functionality. More specifically, in response to determining that the smartphone is not in association with the head unit 200, app(s) being executed on the smartphone are not affected by the car safe functionality (e.g., execution of the apps are not modified based on the determined car safe level, as discussed in more detail below). Conversely, in response to determining that the smartphone is in association with the head unit 200, apps being executed on the smartphone may be affected by the car safe functionality (e.g., execution of the apps are modified based on the determined car safe level, as discussed in more detail below).

Data for use by the car safe functionality may be generated in one of several places. As one example, the data may be generated internal to the vehicle. More specifically, the data may be generated within head unit 200. Alternatively (or in addition), data may be generated in the vehicle electronics 220 and may be transmitted via a bus 224. This is illustrated in FIG. 2A, with each of head unit 200, vehicle electronics 220, one or more electronic devices 230, 240, and one or more smartphones 250, 260 including a respective data generation module, including data generation 202 in head unit 200, data generation 222 in vehicle electronics, data generation 232 in electronic device #A 230, data generation 242 in electronic device #M 240, data generation 252 in smartphone #N 250, and data generation 262 in smartphone #Z 260. As another example, the data may be generated external to the vehicle. In particular, data relating to traffic, weather, accidents, or the like may be generated external to the vehicle and may be transmitted to a part of the vehicle (such as transmitted to head unit 200 or vehicle electronics 220) or may be transmitted to a device associated with the vehicle (such as transmitted to a smartphone that is associated with the head unit).

Likewise, alerts may be generated internal and/or external to the vehicle. Alerts may be generated based on the data to indicate an analysis of the data. For example, weather data may comprise a number representative of the external temperature, whereas a weather alert may comprise an indication of severe weather. Alerts may be generated internal to the vehicle (such as via the CAN bus), external to the vehicle (such as weather alerts, accident alerts, traffic alerts); and/or devices in association with the vehicle (such as alerts as recognized within the smartphone through the use of the smartphones sensors (e.g., accelerometers, gyros)).

As illustrated in FIG. 2A, different devices within the system may include alert generation functionality, including alert generation 203 resident in head unit 200, alert generation 233 resident in electronic device #A 230, alert generation 243 resident in electronic device #M 240, alert generation 253 resident in smartphone #N 250, and alert generation 263 resident in smartphone #Z 260. In this regard, one, some, or all of the devices illustrated in FIG. 2A may include alert generation functionality. More specifically, in one embodiment, only head unit 200 includes alert generation functionality. In an alternate embodiment, only smartphones, such as smartphone #N 250 and smartphone #Z 260, include alert generation functionality. In still an alternate embodiment, both head unit 200 and smartphones include alert generation functionality.

Further, the car safe functionality may reside in one of several places. More specifically, car safe functionality may reside within the vehicle and/or within a device that is associated with the vehicle. For example, car safe functionality 204 may reside in the head unit. As another example, car safe functionality may reside in devices that can be associated with the vehicle, such as car safe functionality 234 in electronic device #A 230, car safe functionality 244 in electronic device #M 240, car safe functionality 254 in smartphone #N 250, and car safe functionality 264 in smartphone #N 260.

As discussed below, car safe functionality may include one or more functions. In one embodiment, the car safe functionality included in the head unit is different from the car safe functionality included in devices that can be or are associated with the vehicle (such as smartphones). In a first more specific embodiment, all of the car safe functionality is included in the head unit and none of the car safe functionality is included in devices that can be associated with the vehicle. In a second more specific embodiment, none of the car safe functionality is included in the head unit and all of the car safe functionality is included in devices that can be associated with the vehicle.

In a third more specific embodiment, a first part of the car safe functionality is included in the head unit and a second part of the car safe functionality is included in devices that can be associated with the vehicle. In one embodiment, the first part of the car safe functionality is mutually exclusive to the second part of the car safe functionality. In this regard, car safe functionality performed by the head unit is not performed by the devices that can be associated with the vehicle. In an alternate embodiment, the first part of the car safe functionality at least partly overlaps with the second part of the car safe functionality. In this regard, both the head unit and the devices that can be associated with the vehicle can perform one or more common car safe functions.

As discussed in more detail below, the car safe functionality may include a plurality of functions. FIG. 2A illustrates within head unit 200 examples of the car safe functionality including: alert determination 206, car safe level determination 208, functionality/characteristics determination 210, allowance/disallowance based on jurisdiction determination 212, device determination 214 and app approval determination 216. The listing in FIG. 2A of the car safe functions is merely for exemplary purposes. Other functions are contemplated.

For example, the car safe functionality, such as alert determination 206, may identify or recognize data or alerts which may impact or modify control of apps being executed in the head unit 200 or in a device associated with the vehicle. In one embodiment, alert determination 206 may reside in head unit 200, illustrated in FIG. 2A. The head unit 200 may receive data from a bus and may select which data from the CAN bus that may be needed to determine the car safe level, discussed in more detail below. Alternatively, or in addition, alert determination 206 may reside a smartphone, such as smartphone #N 250. The smartphone may receive data directly (not via the head unit 200) and identify the alert. Or, the smartphone may receive the data via head unit 200, such as receiving CAN bus relayed by the head unit 200 to the smartphone, and identify the alert.

In one embodiment, the head unit 200 identifies the alert and then sends the identified alert to a smartphone, such as smartphone #N 250. The smartphone receives the alert and then determines car safe level and/or the allowed/disallowed functionality. In an alternate embodiment, the smartphone, such as smartphone #N 250 identifies the alert and then sends the identified alert to head unit 200. The head unit 200 receives the alert and then determines car safe level and/or the allowed/disallowed functionality.

As another example, the car safe functionality, such as car safe level determination 208, may determine a level or an indication of how to control apps being executed in the head unit 200 or in a device associated with the vehicle. In one embodiment, discussed below, a model may be used that inputs data related to the vehicle (e.g., internal inputs and/or external inputs) and/or inputs data related to the environment of the vehicle (e.g., traffic, weather, accidents, etc.). The inputs may be assigned a weighting factor, with the accumulation of some or all the weighting factors then being combined (e.g., averaged) to obtain an indication of how to control apps. One example of the indication is the car safe level, which get a single quality used to determine how to control (e.g., modify) operation of the apps being executed in the head unit 200 or in a device associated with the vehicle. As discussed below, the determination as to the car safe level may be performed in the head unit (such as head unit 200) or may be performed in a device associated with the vehicle (such as smartphone #N 250).

In one embodiment, the car-safe level may be determined by head unit 200, with the head unit 200 sending the determined car-safe level to a smartphone, such as smartphone #Z 260. The smartphone may receive the car safe level and then determine what functionality is allowed and/or disallowed based on the received car safe level. In an alternate embodiment, the car-safe level may be determined by the smartphone, such as smartphone #Z 260, with the smartphone sending the determined car safe level to the head unit 200. The head unit 200 may receive the car safe level and then determine what functionality is allowed and/or disallowed based on the received car safe level.

As still another example, the car safe functionality, such as functionality/characteristics determination 210, may determine which functionality and/or characteristics in the apps being executed are allowed or disallowed. Again, this determination may be performed in the head unit or may be performed in a device associated with the vehicle.

As yet another example, the car safe functionality, such as allowance based on jurisdiction determination 212, may determine which location (or jurisdiction) the vehicle is located, and based on the determined location, determine which functions are allowed or disallowed. As discussed in more detail below, different locations, such as different cities, different counties, or different states, may have different rules for execution of apps in vehicles. Because vehicles, by their nature, may move amongst different locations, the car safe functionality may adapt according to the vehicle's current location. More specifically, the car safe functionality may monitor the location of the vehicle. For example, the car safe functionality may monitor the location at predetermined time periods, such as once every hour. The car safe functionality, using allowance based on jurisdiction determination 212, may determine the rules to implement based on the current vehicle location. The determined rules may then be used by functionality/characteristic determination 210 to determine which functionalities or characteristics of apps may be allowed or disallowed based on the current state of the vehicle and/or the current environment of the vehicle. Again, this determination may be performed in the head unit or may be performed in a device associated with the vehicle.

As still another example, the car safe functionality, such as device determination 214, may determine which policies are implemented for different devices in the vehicle. For example, FIG. 1B illustrates devices in the front seat and the rear seat of the vehicle. The car safe functionality may determine the different policies of controlling execution of apps in the devices in the front seat and the rear seat of the vehicle. In particular, due to the potential for distraction, devices in the front seat may have a more stringent policy of driver input and devices in the rear seat may have a less stringent policy of driver input. In this regard, the car safe functionality, executed in the head unit, in a smartphone, or in the devices in the front seat or the rear seat, may determine the allowed and/or disallowed functions or characteristics of the apps based on current vehicle and/or environmental conditions.

As another example, the car safe functionality, such as app approval determination 216, may determine whether an app is car safe approved. Again, this determination may be performed in the head unit or may be performed in a device associated with the vehicle.

Figure 2B:
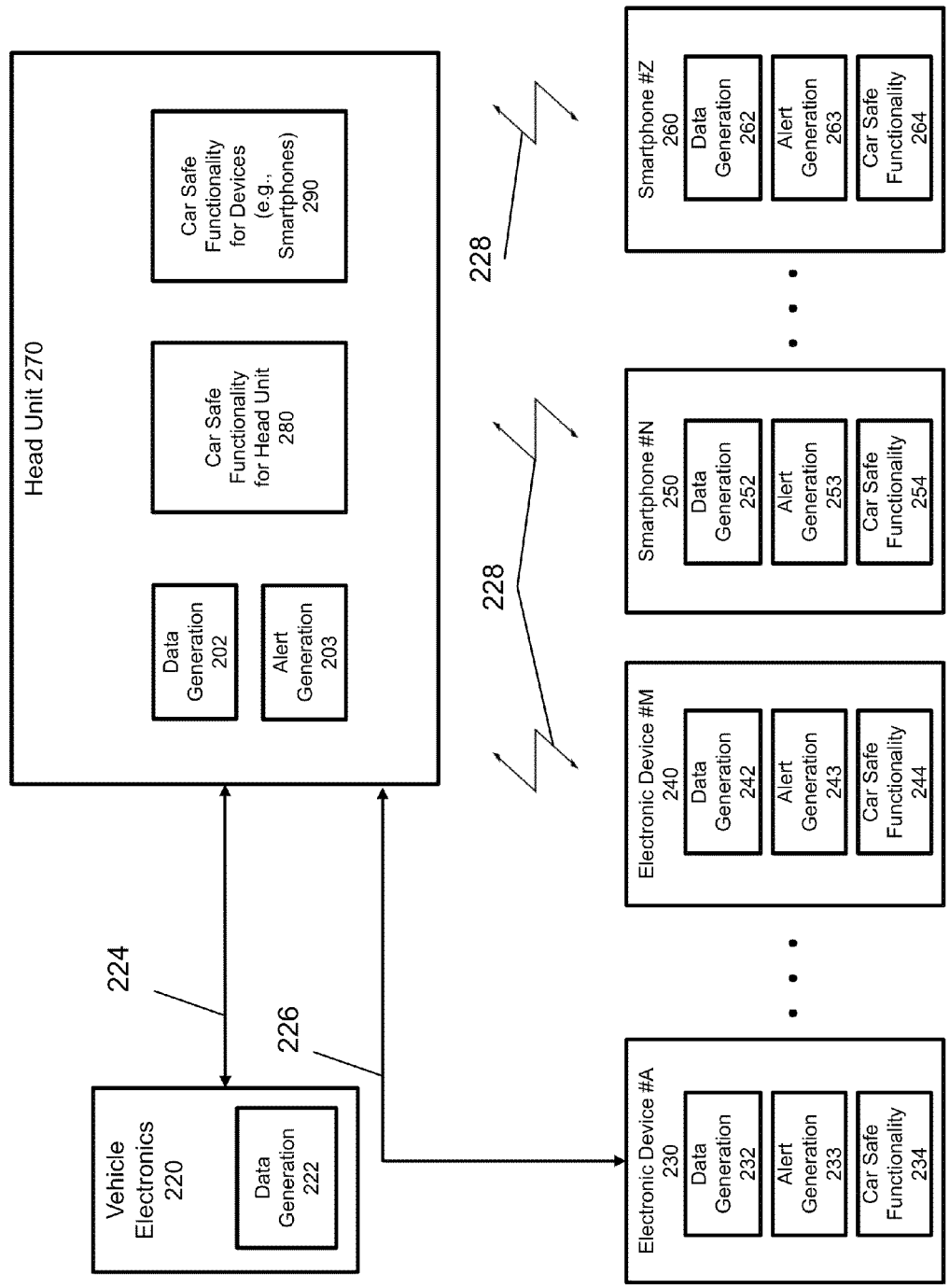
FIG. 2B is another example of a block diagram of a head unit, vehicle electronics, one or more electronic devices, and one or more smartphones.

FIG. 2B is another example of a block diagram of a head unit, vehicle electronics, one or more electronic devices, and one or more smartphones. As discussed above, the car safe functionality, such as car safe functionality 204, may control apps being executed within the device in which the car safe functionality is resident and/or control apps being executed within a device other than where the car safe functionality is resident. For example, car safe functionality 204 resident in head unit 200 of FIG. 2A may control apps being executed within head unit 200 and/or may control apps being executed within another device (such as smartphone #N 250). As another example, car safe functionality 254 resident in smartphone #N 250 of FIG. 2A may control apps being executed within smartphone #N 250 and/or may control apps being executed within another device (such as head unit 200).

In one embodiment, the car safe functionality may run separate processes to monitor apps being executed within head unit 270 apps being executed in other devices (such smartphone #N 250). The separate processes are illustrated in FIG. 2B as child processes with car safe functionality for head unit 280 and car safe functionality for devices (e.g., smartphones) 290. In this regard, the alert generation 203 may provide alerts to one or both of child processes car safe functionality for head unit 280 and car safe functionality for devices (e.g., smartphones) 290.

Likewise, in one embodiment, the car safe functionality being executed in the smartphones may include a single process (represented as a single block, such as car safe functionality 254) to control apps being executed both within a respective smartphone and being executed in devices associated with the smartphone (e.g., the head unit in BT communication with the respective smartphone). In an alternate embodiment, the car safe functionality being executed in the smartphones may include separate processes, with a first process to control apps being executed both within a respective smartphone and a second process to control apps being executed in devices associated with the smartphone (e.g., the head unit in BT communication with the respective smartphone).

In one embodiment, the head unit receives the one or more data inputs via a controller area network (CAN) bus, Advanced Driver Assistance System (ADAS), 802.11p wireless interface, etc. Alternatively or in addition, the head unit receives the alert via a communication from the Internet (such as receiving weather, traffic, or emergency conditions via the Internet). The CAN bus is one example of a vehicle bus designed to communicate data regarding the operation of the vehicle. Other protocols of communication include, but are not limited to: Local Interconnect Network (LIN); FlexRay; or Audio Video Bridging (AVB). Examples of data received via the CAN bus include, but are not limited to: velocity of the vehicle; operation of the cruise control; operation of the electronic brake system (including whether the brakes are operating and how the brakes are operating (e.g., whether the anti-lock braking system is activated); operation of the electronic circuitry (e.g., the operation of the steering mechanism, the operation of the accelerator pedal, the operation of the headlights (including whether the headlights are on and whether the headlights are on high-beam); the operation of the sunroof, the operation of the door control unit; the operation of the power windows); operation of the airbag system; etc. Examples of ADAS related input include, but are not limited to: lane departure warnings, traffic congestion warning through surround cameras, rear camera, etc. In response to receiving the data, the head unit may determine the state of the vehicle.

Further, as discussed above, the determination whether (and how) to modify operation of the app may be dependent on the type of app that is being executed. As one example, the app may be designated as "car safe". Designation of an app as "car safe" indicates that the app is configured to be controlled by the head unit and/or by the smartphone in order to reduce distraction to the driver when the vehicle is in a particular state (such as when the vehicle is travelling above a predetermined speed, such as 10 mph). More specifically, a "car safe" app may include one or both of the following: (1) the ability of an external device, such as the head unit or a smartphone, to monitor the functions being performed by the app; and (2) the ability of the external device, such as the head unit or a smartphone, to modify the functions being performed by the app. For example, the app, when executed, may provide navigation functionality. In a first predetermined state of the vehicle (such as the vehicle traveling more than 10 mph), the app may be limited to a first predetermined functionality (such as input of a destination only via voice-input). In a second state of the vehicle (such as the vehicle traveling more than 50 mph), the app may be limited to a second predetermined functionality (such as removal of any ability to input the destination into the navigation app). As another example, the app, when executed, may provide streaming audio functionality (such as Internet radio). In a first predetermined state of the vehicle (such as the vehicle traveling more than 10 mph), the app may be limited to predetermined functionality (such as a display with icons indicating "buttons" for presets of radio stations akin to a normal radio). In a second predetermined state of the vehicle (such as the vehicle traveling more than 50 mph), the app may be limited to a second predetermined functionality (such as removing any ability to change the operation of the Internet radio). In this way, "car safe" software may be used to control the "car safe" app in order for the control of the "car safe" app to be adaptive depending on the determined state of the vehicle. As another example, the app, when executed, may provide for video output. In one predetermined state of the vehicle (such as less than 5 MPH), the app may be allowed to generate video output. In another predetermined state of the vehicle (such as greater than 5 MPH), the app may be commanded to cease all video output (e.g., the display goes blank). As still another example, the app, when executed, may provide for audio output. In one predetermined state of the vehicle (such as less than 10 MPH), the app may be allowed to generate audio output. In another predetermined state of the vehicle (such as greater than 10 MPH), the app may be commanded to cease all audio output. Thus, different outputs (video versus audio) may have different trigger inputs to cease operation.

In the event that the app is not designated as "car safe", the "car safe" software may still control operation of the app. In one embodiment, the control of the operation of the app may be different from control of an app that is designated as "car safe". In the event that the "car safe" software is aware of the features of the app (e.g., the functionality and/or characteristics of the app) such as by polling the app (discussed below), the "car safe" software may still control the app based on the predetermined state of the vehicle. As one example, the "car safe" software may determine that the app has "manual input" capability. The "car safe" software may also determine that the predetermined state of the vehicle (e.g., the car safe level, discussed below) allows for "manual input" capability. In this instance, the "car safe" software may allow the app to continue to execute. An alternative example is where the "car safe" software may determine that the app has "manual input" capability and "video output" capability. The "car safe" software may also determine that the predetermined state of the vehicle (e.g., the car safe level, discussed below) allows for "manual input" capability but disallows for "video output" capability. In this instance, the "car safe" software may not have the ability to disallow the "video output" capability in the app; therefore, the "car safe" software may command the device executing the app to end execution of the app. In the event that the "car safe" software is unaware of the features of the app, when the "car safe" software determines that the predetermined state of the vehicle allows for all functionality (e.g., no functionality is disallowed), the "car safe" software may allow for the continued execution of the app. Conversely, when the "car safe" software determines that the predetermined state of the vehicle disallows for functionality or a characteristic, the "car safe" software may command the device executing the app to end execution.

As another example, the controller may determine whether or how to control the app based on the type of alert. More specifically, the controller may receive information as to a weather alert, traffic alert, emergency alert (e.g., an accident reported or road conditions), and in response thereto, change the metrics for controlling the app. Examples of metrics that may be changed include, but are not limited to: modify operation of the app (e.g., cease operation of the app, cease the ability of the driver to input data into the app, etc.); modify the criteria in which to control the app (e.g., in response to a weather alert, reduce the pre-determined speeds from 10 MPH to 5 MPH that trigger the controller to cease the ability of the driver to input data into the app so that the driver cannot input data to the app at a lower speed of the vehicle).

In this regard, one, any combination, or all of the following may be used as inputs to determine whether and/or how to control operation of the app: vehicle current operation (e.g., vehicle's current speed); weather; road conditions; time of day; traffic conditions; driver alertness; OEM safety policy; regional regulatory safety requirements; and driver identity.

As discussed above, the vehicle's current operations may be determined via a variety of sources, such as the vehicle's CAN bus, discussed below. One or more aspects of the vehicle's current operations, such as the vehicle's current speed, may be determined via the CAN bus. As another example, the weather may be a factor in determining whether and/or how to control operation of the app. Information regarding the weather may be received from a variety of sources, as discussed herein. Road conditions may likewise affect whether and/or how to control operation of the app. Further, time of day (e.g., whether it is daytime or nighttime, whether it is after midnight, etc.) may affect whether and/or how to control operation of the app. Traffic conditions, discussed herein, may likewise be a factor. Driver alertness may further be a factor. Driver alertness may be measured in a variety of ways. In one way, the vehicle's lane departure warning systems may be used as an indicator of driver alertness. More specifically, the lane departure warning system may issue a lane departure warning if the vehicle is leaving its lane. In this regard, a lane departure warning may be used to determine driver alertness. Alternatively, a camera (or other sensor) may analyze eye movement of the driver to determine alertness. OEM safety policy may comprise guidelines provided by an OEM as to operation of apps and may be used in order to determine whether or how to control operation of an app. For example, the OEM safety policy may include a first set of rules for displays that are visible to the driver and a second set of rules for displays that are not visible to the driver (e.g., back seat displays). In this regard, the control of apps may depend on which display the app is outputting to. As discussed in more detail below, a car safe level may result in a different set of functionality and/or characteristics allowed (or disallowed) depending on whether the display is visible to the driver. In addition, regional regulatory safety requirements may be used as an input. For example, various localities (such as a particular city, a particular county, or a particular state) may have regulations as to approved operations of apps under various conditions. The controller may determine where the vehicle is located based on one or more inputs (e.g., GPS signal). Based on the location of the vehicle, the controller may access a look-up table correlating specific locations with approved operations. Finally, driver identity may be used as an input. Driver identity may comprise one or more attributes of the driver, such as age, driver's license status (e.g., licensed driver or student driver), etc. The controller may, for example, determine the driver identity based on input from a smartphone in near-field wireless communication with the head unit (e.g., the smartphone sends information to the head unit identifying the owner of the smartphone). Based on the one or more attributes, the controller may determine whether and/or how to control the app. In this regard, the control of the app may be based on one or more dynamic conditions (e.g., dynamic changes in operation of the vehicle, in the weather, in the road conditions, in the time of day, in the traffic conditions, in driver alertness, in the location of the vehicle, etc.)

As discussed above, the controller may input the one or more inputs in order to determine whether and/or how to control operation of the app. The determination may manifest itself in one of several ways. One way is to use the one or more inputs in order to determine an indicator, and then correlate the indicator to a set of functions for the app that are allowed and/or disallowed. One type of indicator is a car safe level. More specifically, there may be a predetermined number of car safe levels, such as 0 to 10 (e.g., 0, 1, 2, 3, 4, 5, 6, 7, 8, 9, and 10). Factoring the one or more inputs, the controller may determine the car safe level. Further, one, some, or each of the car safe levels may be correlated with a set of functions that are allowed.

As one example, a driver is leaving his home at 3:30 PM. It is determined that, based on current traffic conditions, it would take 1 hour to drive to his destination (e.g., the airport). Given these inputs, and no reports of inclement weather (or reports that the weather is acceptable), the controller may determine that the car safe level is 0 (e.g., indicative of very good driving conditions). The level of 0 may be correlated to a predetermined set of functions. In the example of an Internet radio app, the controller may determine, based on the car safe level of 0, that the driver is allowed a scrollable list of music stations.

As another example, the driver may be traveling at 55 MPH. The weather is partly cloudy, with good visibility and good traffic conditions. Given the increase in speed of the vehicle, the controller may determine that the car safe level is 6 (e.g., indicative of acceptable driving conditions). Given this car safe level rating, the controller may determine the predetermined set of functions. In the example of the Internet radio app, the controller may determine that only station presets are visible on the screen. In this regard, the app is allowed less functionality than when the car safe level is at 0.

As still another example, the driver is driving at 55 MPH. The weather has changed and is raining. Traffic likewise is starting to get moderately busy. Given these conditions, the controller determines that the car safe level is 8, reflecting a deterioration in conditions. Given this car safe level rating of 8, the controller accesses the predetermined functions allowed. At the level of 8, the app is allowed only voice activation input. In this regard, the amount of functions in the Internet radio app is less than when the car safe level is set to 0 and less than when the car safe level is set to 6.

As yet another example, the driver increases his speed to 60 MPH. The weather is still inclement and rainy. The traffic is heavy. Given these conditions, the car safe level may be set to 10 (e.g., indicative of very bad conditions). Given this, the controller may access the look-up table correlating car safe levels with allowed functions. In the example of the Internet radio app, the controller may determine that at a level of 10, no activation of the Internet radio app is allowed. In this regard, the controller may determine to disallow use of the app entirely.

In one embodiment, the set of examples above may be for a single car trip. In this regard, the car safe level may change based on dynamic changes in the conditions of the trip. In an alternate embodiment, the set of examples may be for different car trips.

In order to support "car safe" apps, different aspects in the life of the "car safe" app are discussed below, including testing, validating, packaging, downloading, and operating the "car safe" app.

In another aspect, the apps in the vehicle may be monitored. The apps and their environment within the vehicle may be monitored and policed via the Internet. The monitoring and policing may be performed to create a safe environment for vehicles. The ability to monitor usage behavior, such as the number of clicks, the number of concurrent applications being invoked and other similar metrics, may allow for dynamic adjustment of the restrictions for specific applications that are invoked by consumers. More specifically, the determination of whether (or how) to control the operation of apps may be based on one or more parameters. The one or more parameters may be updated. The updated parameters may be based on the monitored usage behavior. For example, an external device may analyze the usage behavior, and generate one or more updated parameters to send to the head unit. The head unit, in turn, may use the one or more updated parameters in order to determine whether (or how) to modify operation of apps in a dynamic manner.

Safety is one factor when executing apps in a vehicle. The apps should not unduly distract the driver from operation of the vehicle while maintaining the apps' utility. More specifically, the vehicle is a means of transportation and not a platform to play apps. In order to safely execute apps in the vehicle, the various stages of the life cycle of the app are discussed below including: the design of the apps; the operation of the apps; and the policing of the apps. In this way, a "car safe" Eco System may be generated for vehicles, such as vehicles that have a head unit and potentially one or more Bluetooth connected Smartphones.

The following are factors resulting in the advancement of using apps in vehicles: (1) platforms incorporating multicore SOIC processors with HW virtualization; (2) incorporation of multi OS environments with firewall inside head units (e.g., a separate OS (e.g., Linux) that Car OEMs control for critical car functions; or a separate OS dedicated to consumers apps (e.g., Android, HTML5)); (3) Web Delivery, Administration, Monitoring of Apps and Quality of Service; (4) ability to refresh the consumer OS on the same timelines as the Phone OS so that the smartphone and Car head unit consumer OS are on the similar trajectory.

In one embodiment, a set of system APIs and processes are presented that allow individual app developers the ability to test, validate and package their application for integration into the vehicle head units. Thereafter, the operation of the apps may be predetermined and well-behaved so as not to distract the driver of the vehicle. The integrated apps may be deemed "car cafe". This means that the applications will reduce the potential to distract the driver or reduce driver interaction with the app while the vehicle is in a predetermined state (e.g., when the vehicle is in motion). For example, a threshold event is triggered at a predetermined vehicle velocity, and in response to the trigger, the system is configured to initiate actions (such as preventative actions) that increase safety of the vehicle. By implementing the "car safe" functionality, apps may be executed more safely in the vehicle, thereby reducing fears by vehicle manufacturers of the proliferation of execution of apps in vehicles while in motion.

In multi-display systems, such as a main head unit (center console) and multiple displays (such as rear-seat displays and/or front passenger display), the rules associated with control of the apps may be dependent on which display is the output of the app is sent. More specifically, the rules may be different depending on which display in the vehicle is the output of the app rendered. For example, since the rear seat displays typically will not be distracting to the driver, the output of the app to the rear seat display may not be restricted. Similarly, only the phone(s) that are connected to the head unit may be subject to restrictions and not the other phones in the car. More specifically, when it is determined that the smartphone is in a mode of communicating with the head unit, the smartphone may be subject to restrictions on the output of apps to the display.

One stage in the life cycle of an app is application registration. In particular, the app may be registered as "car safe". Applications that have been validated in the car environment and are tested for proper behavior in the car may be signed as "car safe". "Car safe" signed applications may have special privileges in how they present and interact with the driver while the car is in motion. Unregistered Apps may still work in this environment but may have more restrictions in their actions when the car is in motion, as discussed in more detail below. "Car safe" restrictions may be applicable to the main head unit as well the primary phone that is connected to head unit's BT communication system.

When the apps are executed while the vehicle is in operation (e.g., when the vehicle is in motion), the behavior of the app may be modified in one of several ways. For example, apps that are not signed as "car safe" may either be terminated or pushed in the background and a home app screen may be brought into the foreground. If apps are "car safe" registered, then the system may restrict the apps operations but may still allow them to operate according to predetermined operations. As merely a few examples (though not exhaustive), the "car safe" registered app may play according the following use cases:

(1) if the "car safe" registered app is a motion video application, then the head unit (such as the car safe service controller 650, discussed below) may bring the home app screen to the foreground (or may command the display to output the home app screen), thereby hiding the video output of the app while allowing the audio to play (unsigned apps may simply be paused);

(2) if the "car safe" signed app is an internet radio application (e.g., Pandora, Stitcher, etc.), then the audio may play in the background. In addition, the controller may modify the operation of the app to limit input to the app. For example, the driver operator may be disallowed from using a first type of input (such as a text or numerical input for an Internet radio station) but may be allowed a second type of input (such as skipping streams or pre-sets already in memory). Unsigned apps may move into the background with audio on.

(3) if the "car safe" signed app requests text entry (e.g., a navigation app which requests an address input or an info app such a road condition alert application), then such applications may be put in background and/or may disable text entry but allow speech-to-text facility so as to allow input to continue while the car is in motion. Unsigned apps may simply move to the background, thereby disabling all text entry.

One or more states of the vehicle may trigger a modification of operation of the app. For example, the CAN bus indicates the speed of the vehicle or ADAS indicates a lane departure or traffic congestion warning. As another example, other electronic devices associated with the vehicle, such as a smartphone or a smartwatch, may trigger a modification of operation of the app. The CAN/ADAS/smartphone Alert Manager 322 is illustrated as a single block. However, different devices, such as devices in communication with the CAN bus, ADAS, and/or smartphones, within the system may generate alerts. The CAN/ADAS/smartphone Alert Manager 322, discussed below, may determine whether a speed threshold has been met (e.g., 10 mph) or another ADAS warning has been triggered. In response to determining the speed threshold or ADAS trigger has been met, the CAN/ADAS/smartphone Alert Manager 322 may issue an alert that acts as a trigger to disable the keyboard and request all active applications to report their usage of the Windows. The CAN/ADAS/smartphone Alert Manager 322 may be implemented in hardware or in software. Further, one or more sensors may be used to generate input(s) to CAN/ADAS/smartphone Alert Manager 322. The one or more sensors may comprise hardware sensors. As another example, information from the CAN bus may indicate an airbag deployment, tire deflation issue, or other type of catastrophic alert. In response to receiving the catastrophic alert, the "car safe" software may modify operation of the apps, such as controlling the display of the head unit in order to indicate the problem.

Further, as discussed above, the vehicle may have various configurations of the electronics, such as illustrated in FIGS. 1A-E. The car safe management system may apply to the primary display (such as the display on the head unit) and/or to the displays on smartphone(s) active through the BT system. For example, cars of today have unitary or multiple configurations (e.g., vehicles with rear seat entertainment systems). The car safe management system may distinguish where the apps are working in the vehicle and create different policies for displays based on their physical location within the vehicle. Similarly, phones or other electronic devices that are connected to the BT System may have their ability to invoke apps restricted while the car is in motion. This may be triggered by the same motion event that apps executed on the head unit are subjected.

The system may further be used to generate data for web metrics. The metrics may measure any one of multiple aspects such as: how many applications are running in foreground when triggers are activated; how many applications are disabled, which may be the same that are active and how many are in the background; how many times a particular app is executed in a predetermined period (e.g., 24 hrs/week/month etc.); how many are registered applications, how many are non-registered or not safe. The Internet may adjust the rating of the application over time if it is deemed to be useful. Further, the "car safe" registrations and policies may be updated over the Internet into one or more devices in the vehicle, such as the head unit.

Figure 3A:
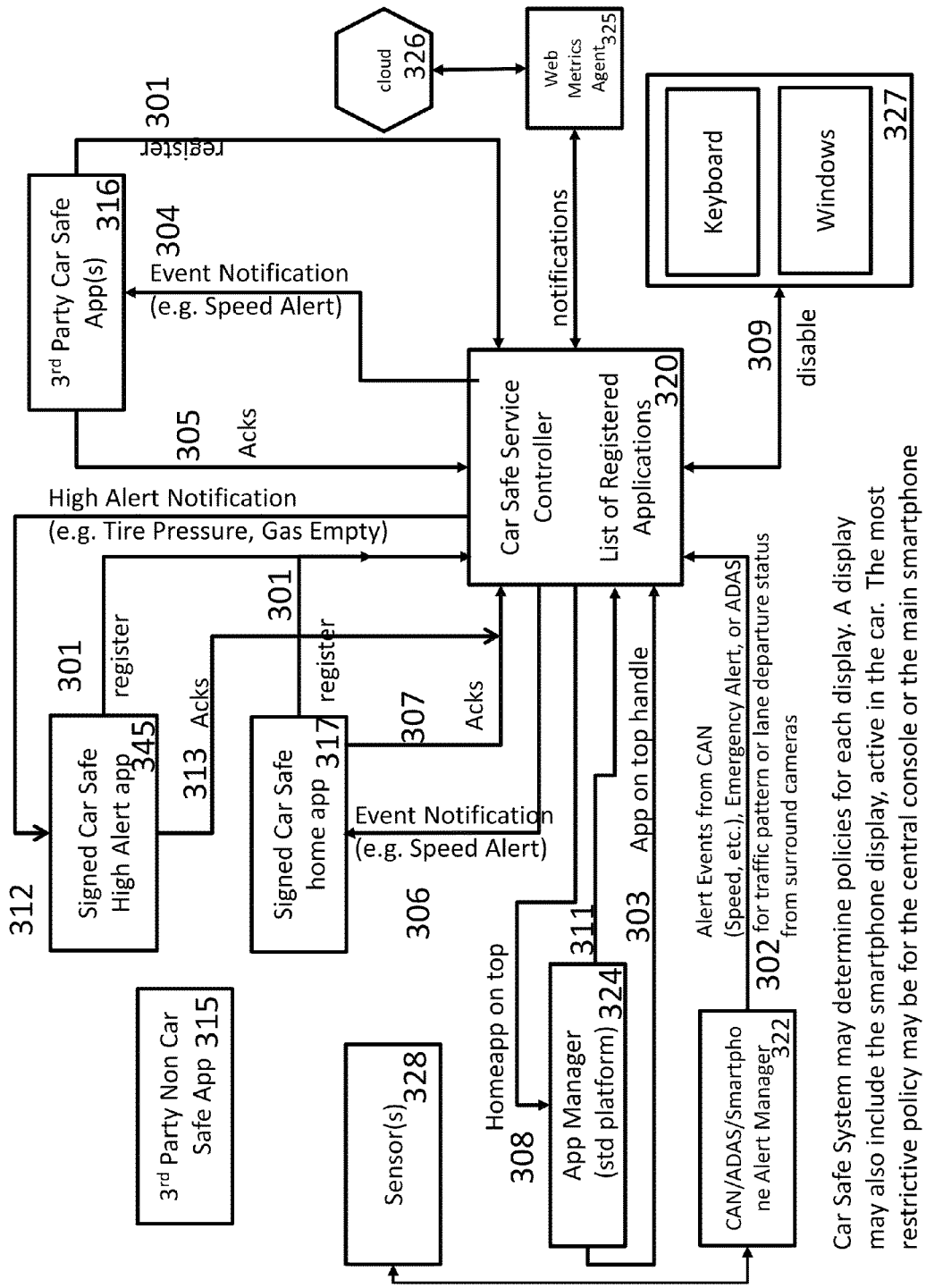
FIG. 3A is one example of a block diagram of the car-safe system components at run time.

One stage of life of the app is operation. FIG. 3A is a block diagram of the dynamic operation of car-safe system components (e.g., operation at run time). More specifically, FIG. 3A describes the operation of the Car Safe System when Applications are running and the vehicle is being driven. The operation may be viewed as a series of transition of states related to various blocks comprising the Car Safe system. State 301 is the beginning wherein every 3$^{rd}$ Party Car Safe app and even the Car Safe home app initiate a registration process with the Car Safe Service Controller 320. Non Car Safe applications (e.g., 315) may not be visible to the Car Safe Service Controller 320 except the Application Manager 324. State 302 is the trigger initiated by the CAN/ADAS/smartphone Alert Manager 322 (e.g., the vehicle is at or exceeding a predetermined speed). Many parameters may be used to determine the trigger. For simplicity, the trigger illustrated uses speed as an alert to invoke Car Safe Operation of the head unit.

As illustrated in FIG. 3A, Car Safe Service Controller 320 may execute car safe software in order to determine whether (and how) to modify operation of the apps based on alerts received from the CAN/ADAS/smartphone Alert Manager 322. In an alternate embodiment, the functionality of generating the alerts and determining whether (and how) to modify operation of the apps may be performed by one device (such as a single microcontroller or in App Manager 324). Moreover, Car Safe Service Controller 320 may be any type of processor, such as a microprocessor, microcontroller, programmable logic array or other type of arithmetic logic unit that is configured to execute instructions relating to the car safe software. Further, the various blocks illustrated in FIG. 3A may reside in a single device, such as in a head unit or a smartphone, or may reside in separate devices.

States 304 and 306 provide notifications for all $3^{rd}$ Party Car Safe Apps including the Car Safe home app. 320 initiates transition 311 requesting Handle of the Top App to the 324 the Application Manager and the handle is returned by state 303. State 302 leads to transitions 303 in which Car Safe Service Controller 320 requests the handle of the top most application to 324. 324 sends back the handle of the "App on top" handle to 320. The Android/HTML5 systems may allow only one application to obtain control of the screen at a time, while it has not stopped the previous application but merely invokes the new application.

CAN/ADAS Notifications go to Car Safe Service Controller 320, which in turns sends out notifications (304, 306) to Car Safe Apps. Similarly, Car Safe Service Controller 320 may send CAN Event notifications to 316, 317. Car Safe Service Controller 320 awaits acknowledgements of the running application which is delivered by transition 303.

Car Safe Service Controller 320 may initiate state transition 309, which may disable one or more hardware devices, such as the keyboard and the windows functions in electronic device 327 in if so desired. Periodically, the Car Safe Service Controller 320 may send metrics about Apps to the Web Metrics Agent 325, which may in turn sends it for Analytics to the cloud 326.

Figures 2, 3B:
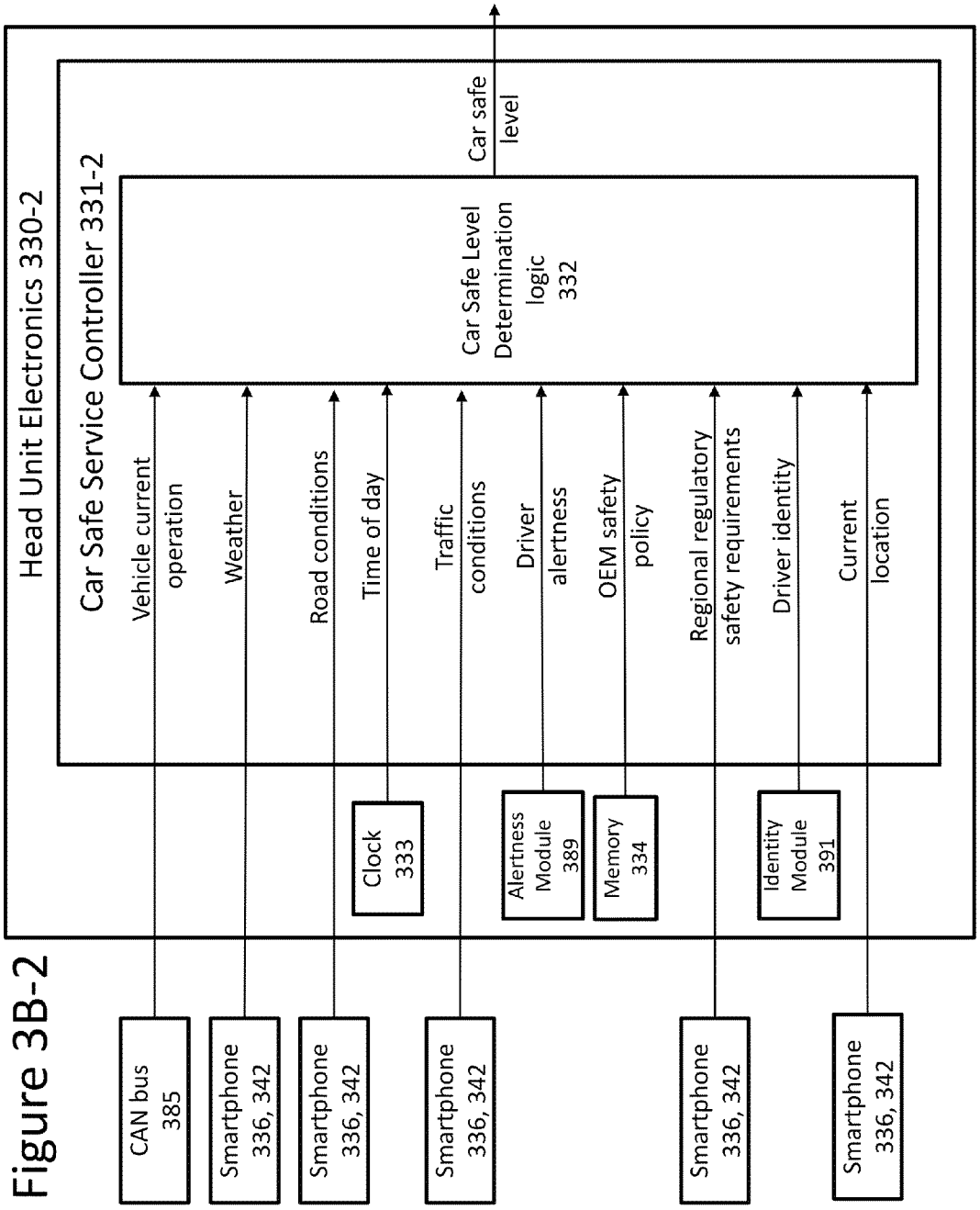

As discussed above, the car safe level may be determined using one or more factors. FIG. 3B-1 is one example of a block diagram of the head unit electronics 330-1, which a controller 331-1 (or other type of processor) that is configured to execute car safe level determination logic 332. As shown, the car safe level determination logic 332 may use one or more inputs to determine the car safe level. For example, the various inputs may include any one, any combination, or all of: the vehicle current operation (e.g., the vehicle's current speed); the current weather; the road conditions; the time of day; the traffic conditions; driver alertness (or an indication of driver alertness); OEM safety policy; regional regulator safety requirements; and driver identity. The inputs may come from various sources, such as external from the vehicle (e.g., receiving the current weather or the road conditions from a communication received from a website), from within another part of the vehicle (e.g., the current speed being received from the CAN bus), from within the head unit (e.g., the clock 333 may generate the time of day or a memory 334 may store the OEM safety policy), and/or from within another device associated with the vehicle (e.g., a gyro or accelerometer in a smartphone in BT connection with the head unit). Thus, in one embodiment, the car safe level may be based on a weighted average of data related to the current operation and the current environment of the vehicle, such as a weighted average of the sensor-based alerts and the indications regarding the weather and the road condition.

For example, data regarding the vehicle current operation may be received from CAN bus 385. Data regarding the may be received from weather module 386, which may comprise an app or other executable program which may communicate with an external server that is configured to provide weather information. Data regarding the road conditions may be received from road condition module 387, which may comprise an app or other executable program which may communicate with an external server that is configured to provide road conditions local to the vehicle. Data regarding the time of day may be received from clock 333. Data regarding the traffic conditions may be received from traffic module 388, which may comprise an app or other executable program which may communicate with an external server that is configured to provide traffic information local to the vehicle. Data regarding the driver alertness may be received from alertness module 389, which may comprise an app or other executable program which may analyze various pieces of data, such as lane departure warnings, to determine the alertness level of the driver. Data regarding regional regulatory safety requirements may be received from regulatory module 380, which may comprise an app or other executable program which may determine the location of the vehicle using GPS receiver 329 and access a memory that correlates regulations to locations. Data regarding the driver identity may be received from identity module 391, which may comprise an app or other executable program which may determine the identity of the driver (e.g., by determining the identity of the user of the smartphone that is associated with the head unit). Data regarding the current location of the vehicle may be received from GPS receiver 329.

FIG. 3B-2 is another example of a block diagram of the head unit electronics 330-2 with car safe service controller 331-2. In FIG. 3B-2, some of the data is provided by smartphone 336 or 342, such as data for weather, road conditions, traffic conditions, regional regulatory safety requirements, and current location. With regard to weather, road conditions, and traffic conditions, smartphone 336 or 342 may execute an app or other program in order to obtain the respective information. Likewise, for the current location, the GPS receiver resident on smartphone 336 or 342 may generate the current location of the vehicle, for input to car safe service controller 331-2.

Figure 3C:
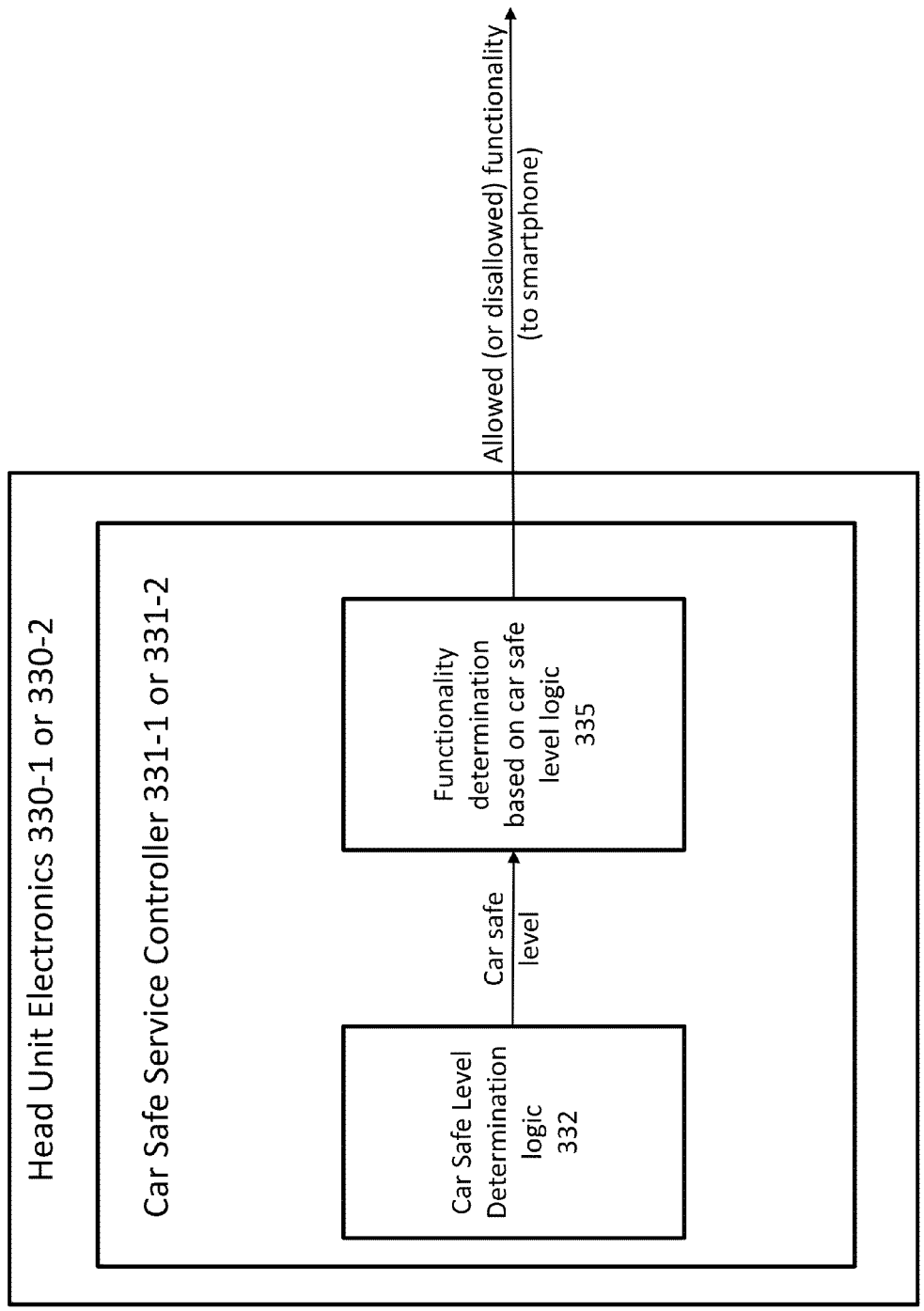
FIG. 3C is yet another example of a block diagram of the head unit electronics in which allowed or disallowed functionality is sent to the smartphone.

Once generated, the car safe level may be used by the head unit and/or may be used by a smartphone. FIG. 3C is another example of a block diagram of the head unit electronics 330-1 or 330-2 in which allowed or disallowed functionality is sent to the smartphone. Car safe level determination logic 332 may generate the car safe level, which may be input to functionality determination based on the car safe level logic 335. Functionality determination based on the car safe level logic 335 may determine which functions are allowed and/or disallowed based on the determined car safe level. Examples of functions include, but are not limited to: enabling scrolling list of music stations; displaying station presets; voice activation of command input.

Figure 3D:
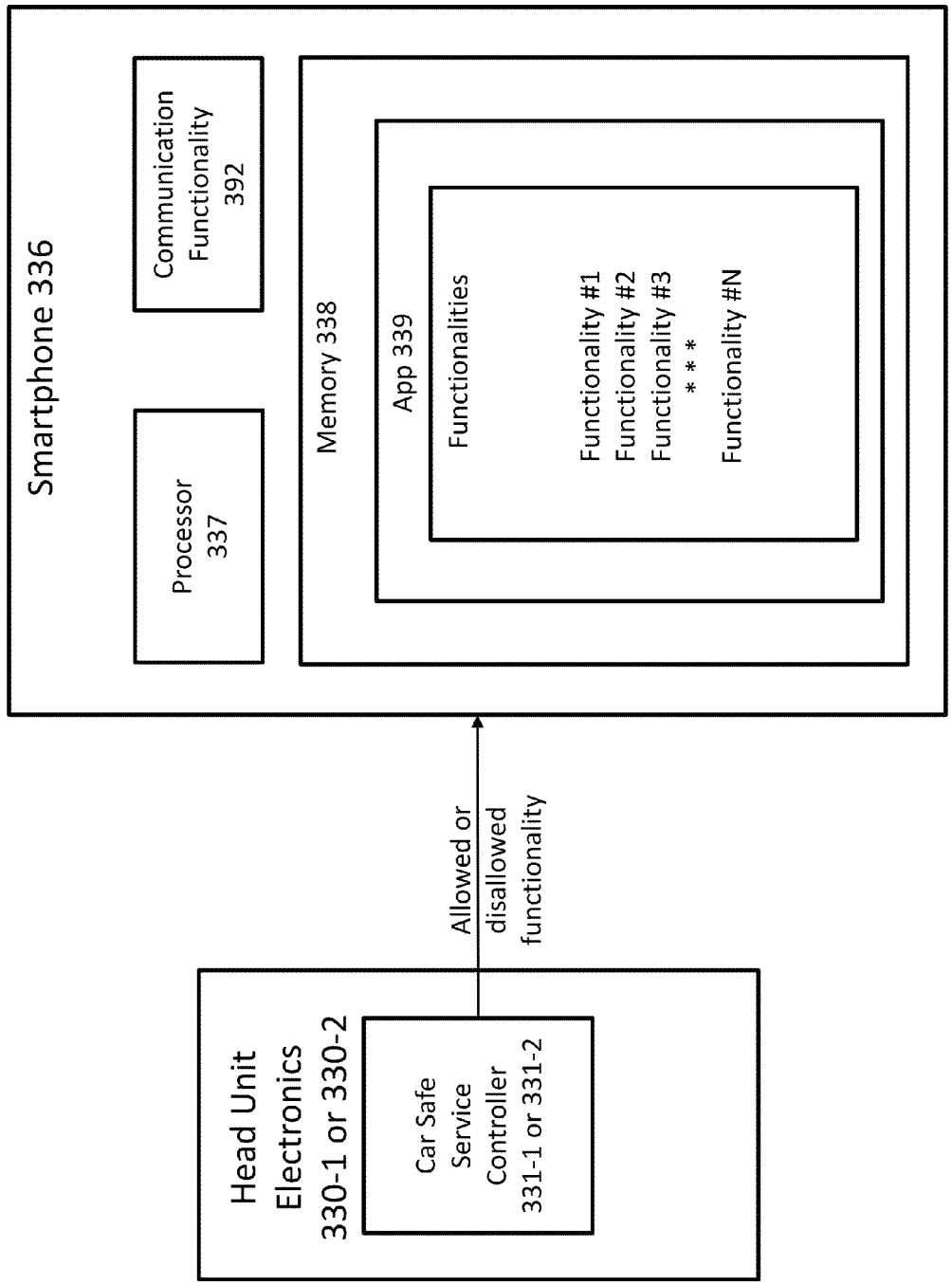
FIG. 3D is one example of a block diagram of the head unit electronics and the smartphone.

FIG. 3D is one example of a block diagram of the head unit electronics 330-1 or 330-2 and the smartphone 336. A smartphone 336 is illustrated in FIG. 3D; however, any electronic device that may communicate with the head unit electronics 330-1 or 330-2 may be used. The smartphone 336 includes a processor 337, a memory 338, and communication functionality 392. Communication functionality 392 may comprises one or more types of communication, such as cellular or other RF-type communication and/or near field communication (such as Bluetooth or Wi-Fi). In this regard, in one embodiment, communication functionality 392 may comprise a transceiver.

One app 339 is illustrated in FIG. 3D; however, one or more apps may be stored in memory 338. The app 339 includes a list of functionalities, such as functionality #1, functionality #2, functionality #3, . . . functionality #N. In operation, the smartphone 336 may receive the allowed (or disallowed) functionalities from the head unit electronics 330-1 or 330-2, may examine the functionalities listed in the app, and allow (or disallow) the functionalities accordingly. For example, if "enabling scrolling list of music stations" is the functionality that is disallowed, the app, when executed by the processor, may receive the disallowed functionality and disallow scrolling list of music stations.

Figure 3E:
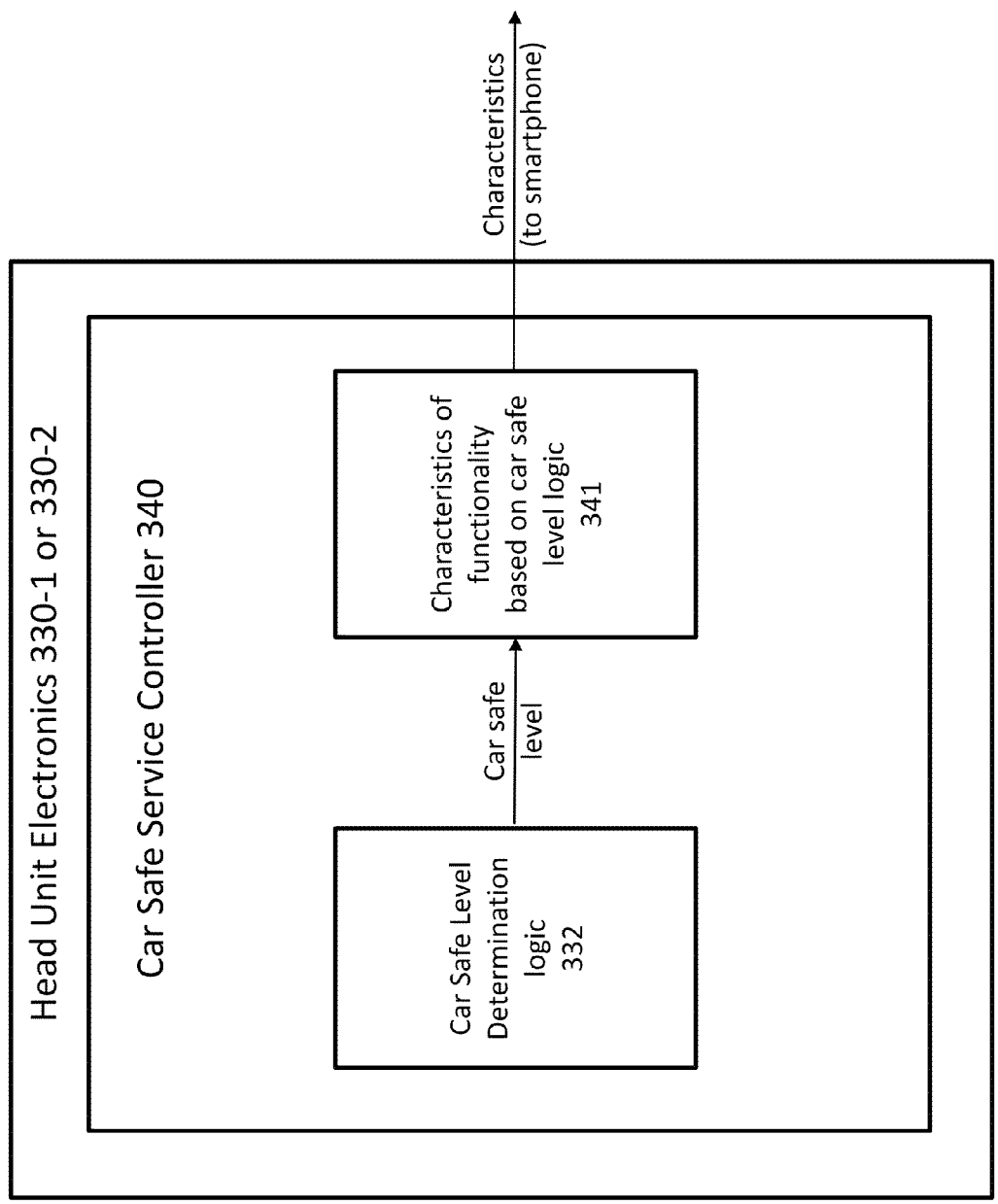
FIG. 3E is still another example of a block diagram of the head unit electronics in which allowed or disallowed characteristics are sent to the smartphone.

Instead of (or in addition to) functionalities, characteristics may be sent to the smartphone 342. Characteristics may be considered more abstract than functionalities and may comprise one or more features to perform a function (or to avoid performing). Examples of characteristics include, but are not limited to: video (e.g., disabling video); manual input (e.g., disabling manual input); audio (e.g., disabling audio); manual entry via keyboard or touch display (e.g., disabling manual entry via keyboard or touch display); presets (e.g., display only presets); etc. Thus, the characteristics may define a trait that is allowed or is disallowed. FIG. 3E is still another example of a block diagram of the head unit electronics 330-1 or 330-2 in which allowed or disallowed characteristics are sent to the smartphone 342. Included in controller 342 is characteristics based on car safe level logic 341, which may generate the characteristics that are allowed (or disallowed) based on the determined car safe level. The characteristics may be sent to the smartphone 342.

Figure 3F:
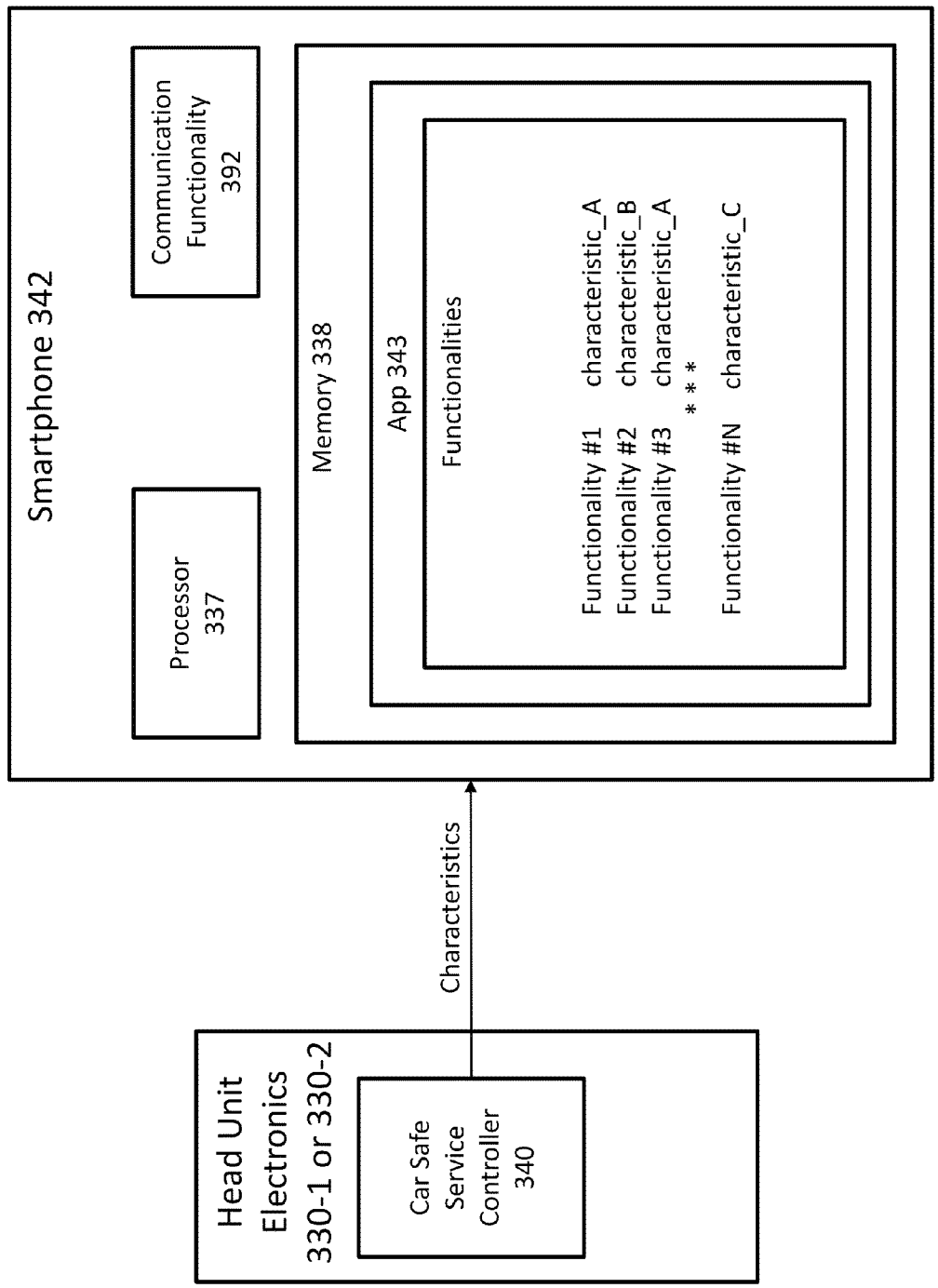
FIG. 3F is another example of a block diagram of the head unit electronics and the smartphone.

FIG. 3F is another example of a block diagram of the head unit electronics 330-1 or 330-2 and the smartphone 342 in which the characteristics are input to the smartphone 342. As shown in FIG. 3F, app 343 includes a list of functionalities and associated characteristics. For example, the various functionalities in an app may have the same or different characteristics. In practice, app 343 may receive the characteristics sent from head unit 330-1 or 330-2 and may determine which functions to allow (or disallow). For example, if one of the functionalities has an associated characteristic of "manual input via keyboard or touchscreen" and the received characteristic is indicative of disabling "manual input via keyboard or touchscreen", the functionality associated with "manual input via keyboard or touchscreen" is disabled.

Figure 3G:
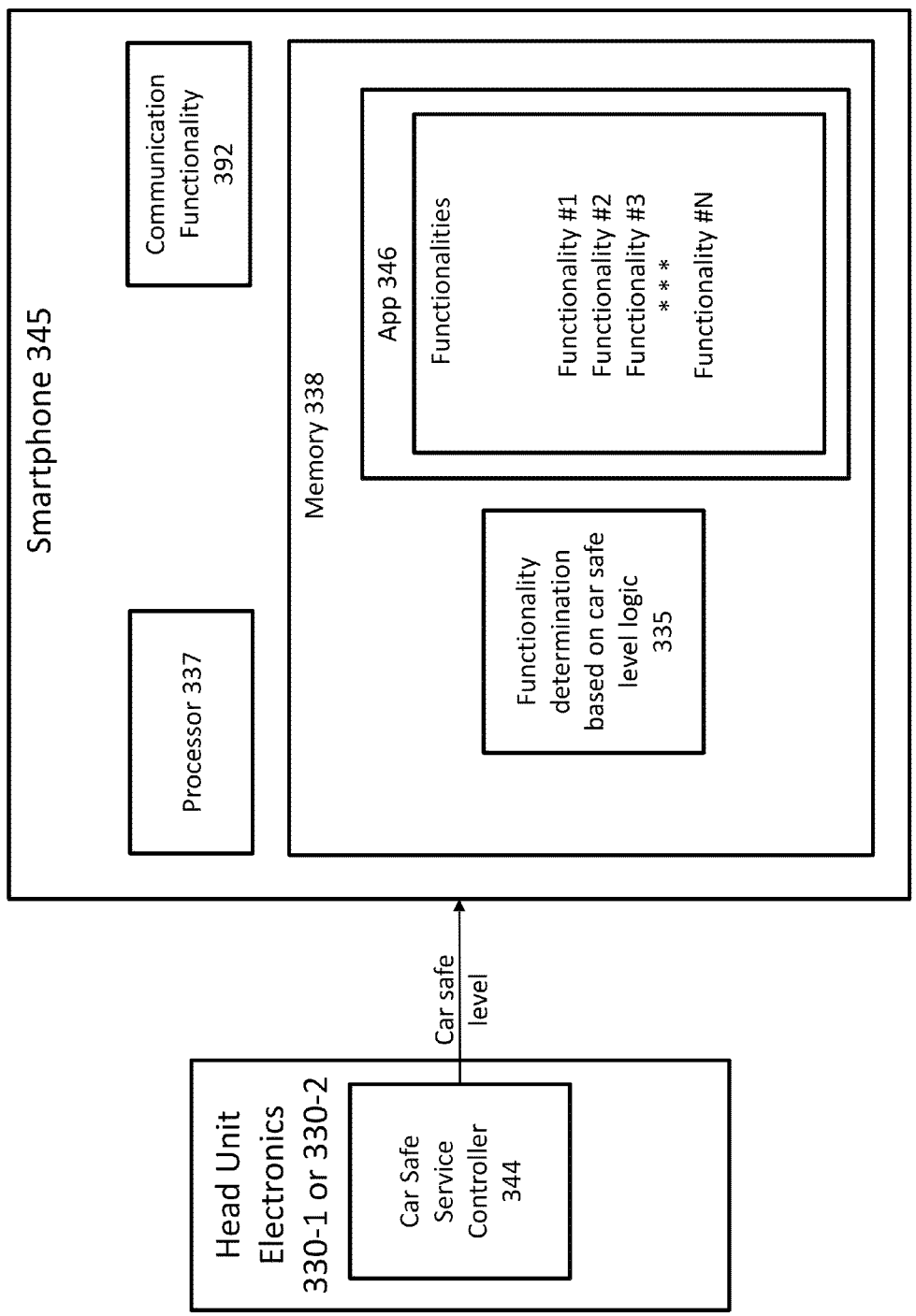
FIG. 3G is yet another example of a block diagram of the head unit electronics and the smartphone.

FIG. 3G is yet another example of a block diagram of the head unit electronics 330-1 or 330-2 and the smartphone 345 in which the car safe service controller 344 outputs the car safe level to the smartphone 345. Functionality determination based on the car safe level logic 335 is resident in smartphone 345 (instead of on head unit 330-1 or 330-2, such as illustrated in FIG. 3C) so that the determination as to the allowed (or disallowed) functionalities may be performed within smartphone 345. In practice, functionality determination based on the car safe level logic 335 may determine the allowed (or disallowed) functions based on the car safe level, which may be input to app 346 to allow (or disallow) the respective functions. As shown in FIG. 3G, functionality determination based on the car safe level logic 335 is located outside of app 346. In an alternate embodiment, functionality determination based on the car safe level logic 335 may reside inside app 346.

Figure 3H:
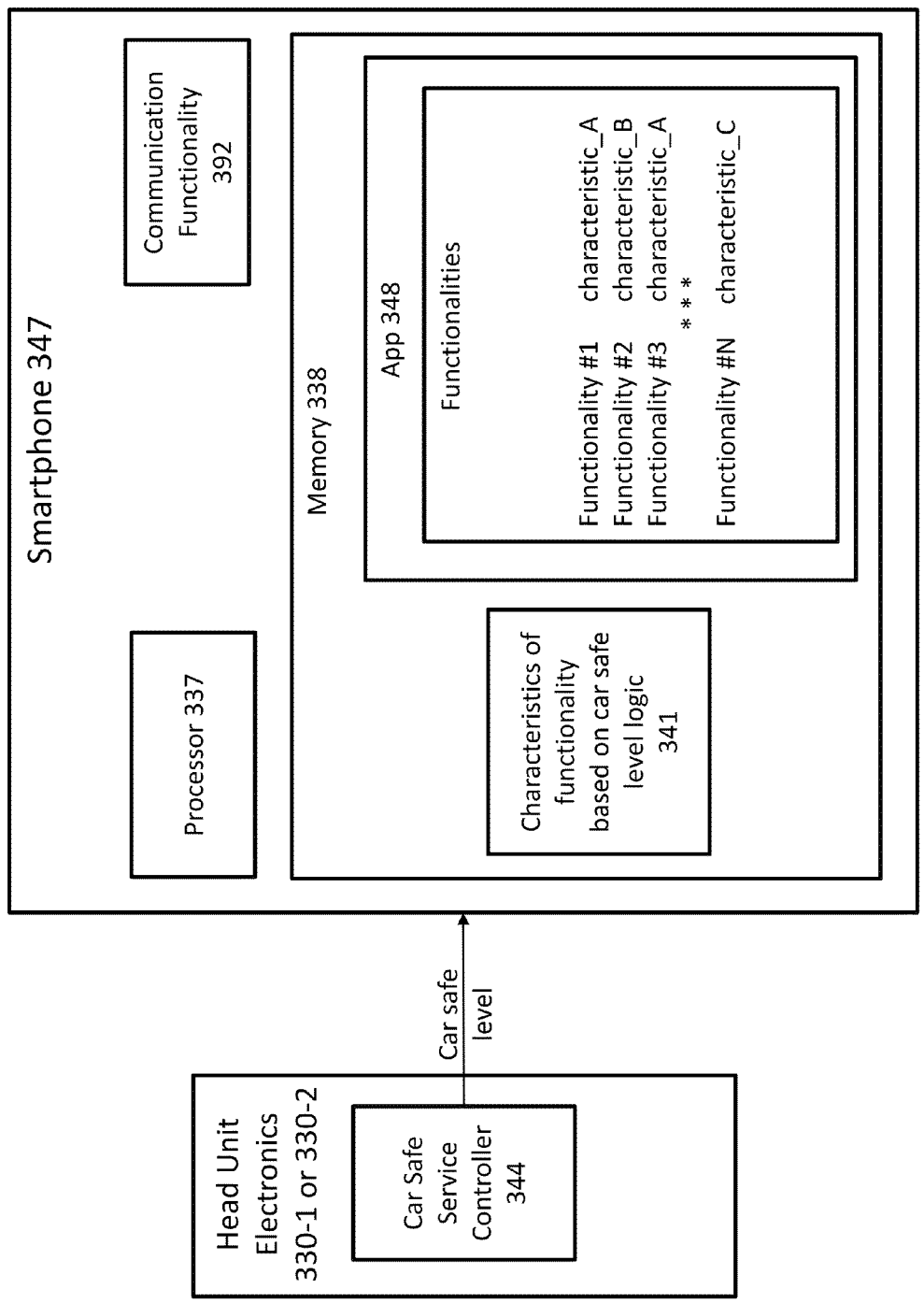
FIG. 3H is still another example of a block diagram of the head unit electronics and the smartphone.
Figures 2, 31:
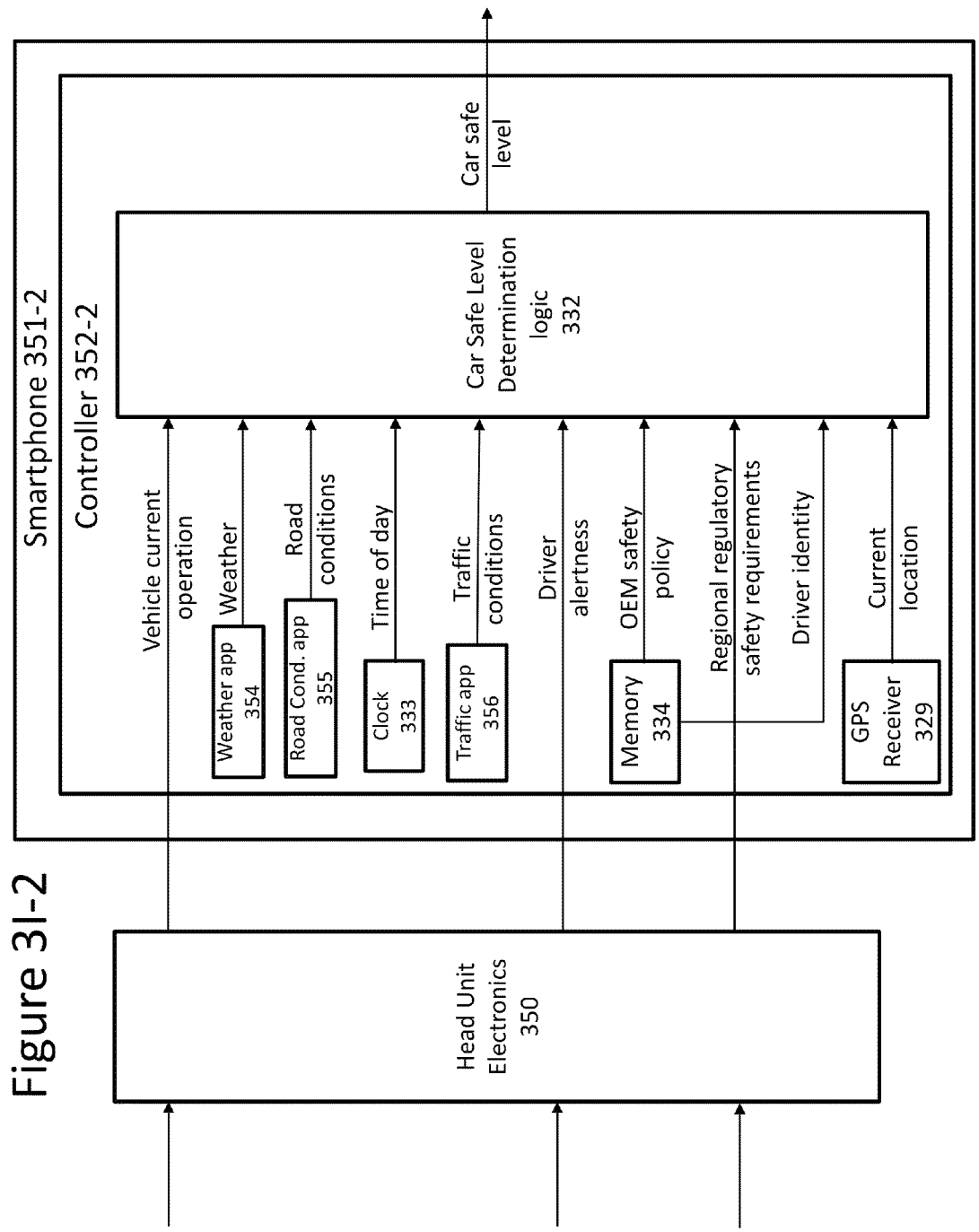

FIG. 3H is still another example of a block diagram of the head unit electronics 330-1 or 330-2 and the smartphone 347 in which the car safe service controller 344 outputs the car safe level to the smartphone 347. Characteristics of functionality based on the car safe level logic 341 is resident in smartphone 347 (instead of on head unit 330-1 or 330-2, such as illustrated in FIG. 3E) so that the determination as to the allowed (or disallowed) characteristics may be performed within smartphone 347. In practice, characteristics of functionality determination based on the car safe level logic 341 may determine the allowed (or disallowed) characteristics based on the car safe level, which may be input to app 348 to allow (or disallow) the respective functions. As shown in FIG. 3H, characteristics of functionality determination based on the car safe level logic 341 is located outside of app 348. In an alternate embodiment, characteristics of functionality determination based on the car safe level logic 341 may reside inside app 348.

As discussed above, the determination as to the car safe level may be performed in one of several devices, including the head unit and/or a smartphone. FIG. 3I-1 is another example of a block diagram of the head unit electronics 350 and the smartphone 251 in which the smartphone 351-1 determines the car safe level. As shown in FIG. 3I-1, controller 352-1 executes car safe level determination logic 332 in order to generate the car safe level. Similar to FIG. 3B-1, car safe level determination logic 332 may input data from a variety of sources, such as from head unit electronics 350 or internally (such as from clock 333 or memory 334). As shown in FIG. 3I-1, the head unit electronics may receive the data from external sources and pass the data to smartphone 351-1. For example, vehicle current operation (such as the current vehicle speed) may be received by head unit electronics 350 from an external source, such as the CAN bus. As another example, the weather conditions may be received by head unit electronics 350 from an external source. Alternatively, instead of some or all of the data being received from head unit electronics 350, the smartphone 351-1 may receive the data without the head unit electronics 350 acting as an intermediary. For example, the smartphone may receive road conditions directly, such as discussed with regard to FIG. 3I-2.

FIG. 3I-2 is yet another example of a block diagram of the head unit electronics 350 and the smartphone 351-2 in which the smartphone 351-2 determines the car safe level. Certain data inputs to the car safe level determination logic 332 may be generated within smartphone 351-2, such as weather from weather app 354, road conditions from road conditions app 355, and traffic conditions from traffic app 356. One some, or all of weather app 354, road conditions app 355 and traffic app 356 may be executable code that is configured to access a remote server via a cellular connection in order to obtain the data for controller 352-2.

Figure 3J:
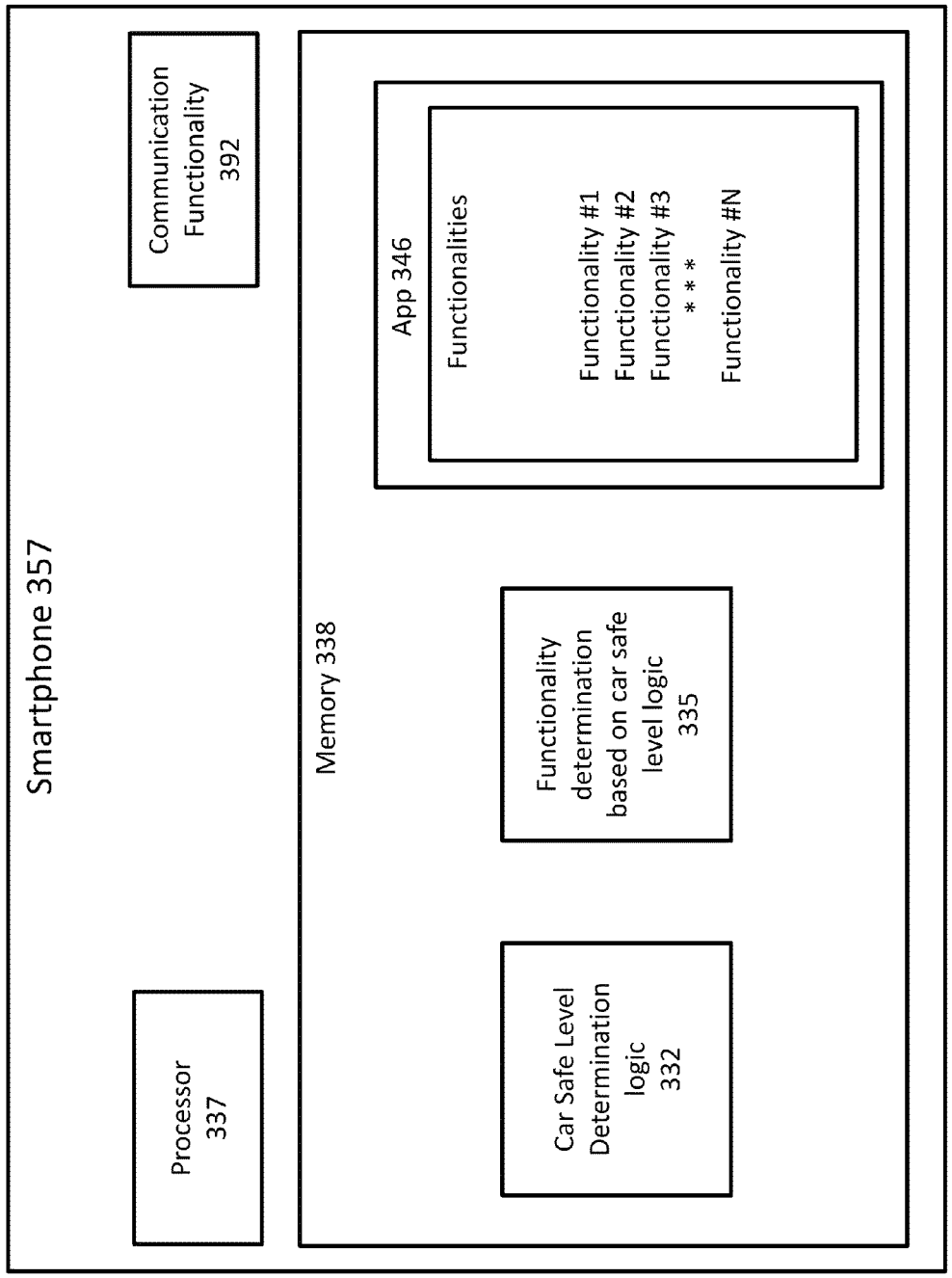
FIG. 3J is one example of a block diagram of the smartphone in which the car safe level and the allowed (or disallowed) functionality are determined.

FIG. 3J is one example of a block diagram of the smartphone 357 in which the car safe level and the allowed (or disallowed) functionality are determined. Memory 338 within smartphone 357 includes car safe level determination logic 332 and functionality determination based on car safe level logic 335. As discussed above, car safe level determination logic 332, when executed by processor 337, is configured to determine the car safe level based on one or more inputs. Further, functionality determination based on car safe level logic 335 is configured to input the car safe level in order to determine the functionality that is allowed (or disallowed). Based on this determination as to the allowed (or disallowed)

functionality, the processor 337 may determine which of the functionalities in app 346 may be allowed (and/or disallowed).

Figure 3K:
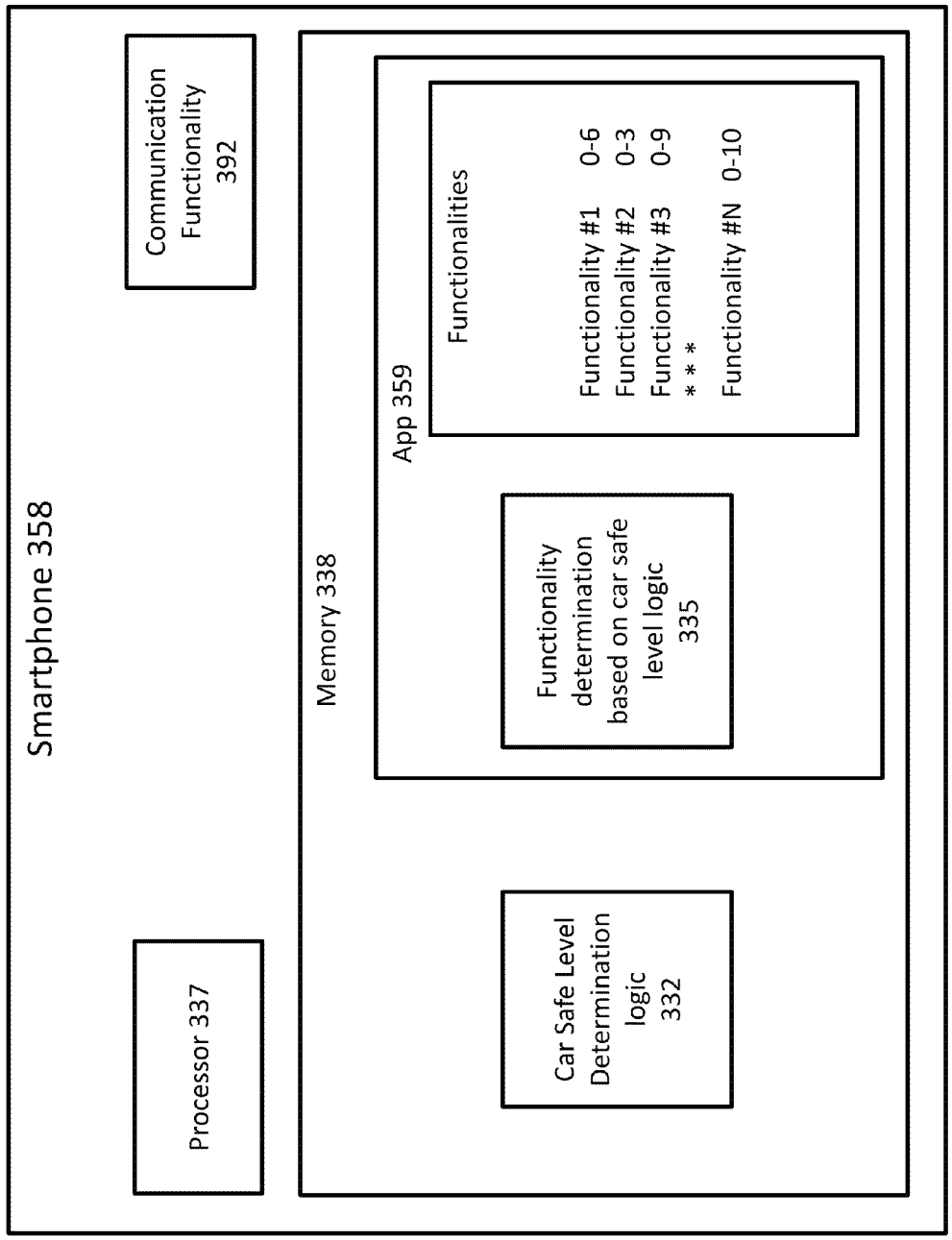
FIG. 3K is another example of a block diagram of the smartphone in which the car safe level and the allowed (or disallowed) functionality are determined.

FIG. 3K is another example of a block diagram of the smartphone 358 in which the car safe level and the allowed (or disallowed) functionality are determined. FIG. 3K is similar to FIG. 3J except for the placement of the functionality determination based on car safe level logic 335. In FIG. 3K, functionality determination based on car safe level logic 335 is within app 359. In this regard, when executing app 359 (including functionality determination based on car safe level logic 335 within app 359), the car safe level is input to app 359 in order for functionality determination based on car safe level logic 335 to determine which functions are allowed (or disallowed). Further, one, some, or all apps within smartphone 358 may each include therein functionality determination based on car safe level logic 335.

Figure 3L:
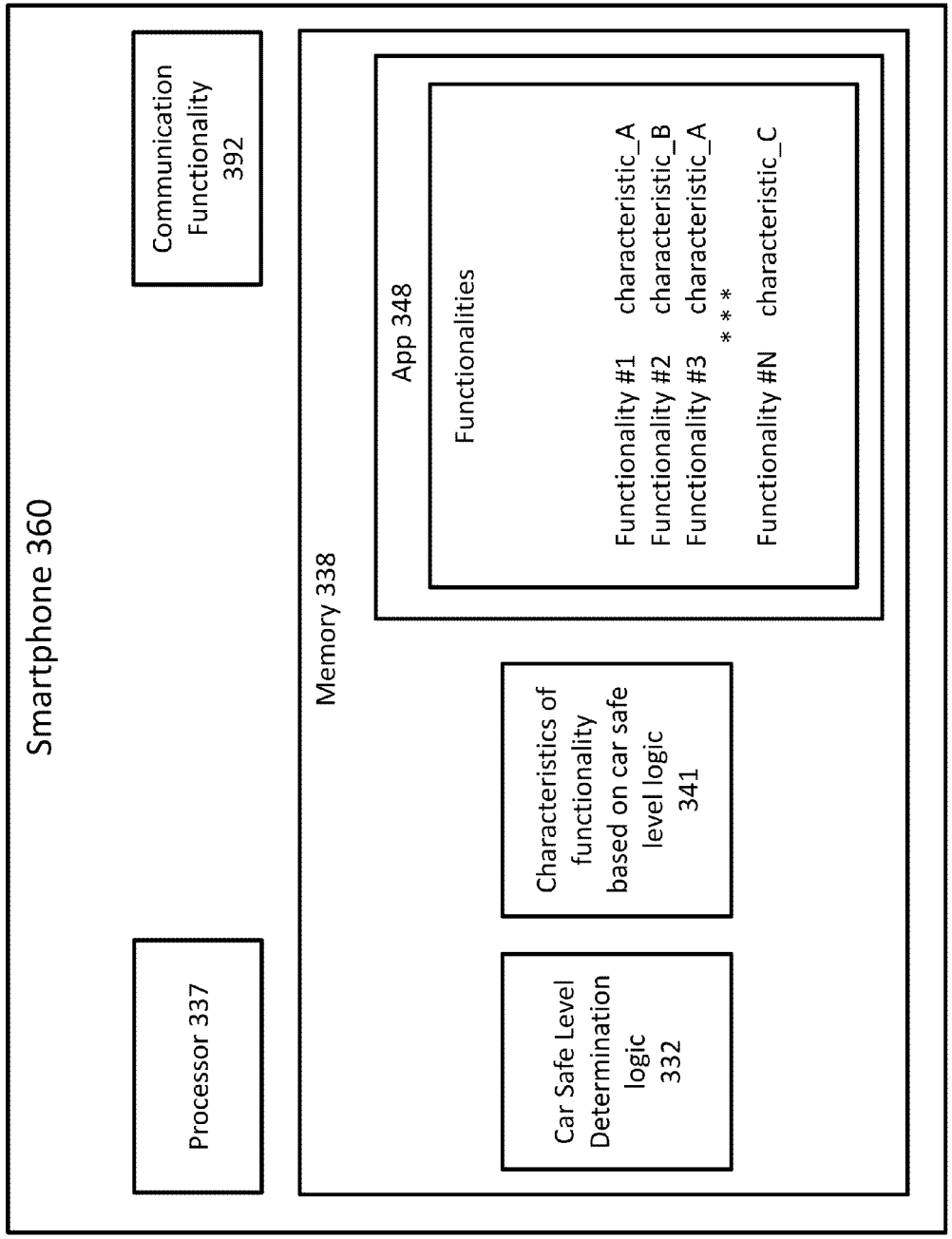
FIG. 3L is an example of a block diagram of the smartphone in which the car safe level and the allowed (or disallowed) characteristics are determined.

FIG. 3L is an example of a block diagram of the smartphone 360 in which the car safe level and the allowed (or disallowed) characteristics are determined. Memory 338 within smartphone 360 includes car safe level determination logic 332 and characteristics of functionality determination based on car safe level logic 341. As discussed above, car safe level determination logic 332, when executed by processor 337, is configured to determine the car safe level based on one or more inputs. Further, characteristics of functionality determination based on car safe level logic 341 is configured to input the car safe level in order to determine the characteristics of functionality that are allowed (or disallowed). Based on this determination as to the allowed (or disallowed) characteristics, the processor 337 may determine which of the functionalities in app 348 has the allowed (or disallowed characteristics) and, accordingly, allow (or disallow) the functionalities.

Figure 3M:
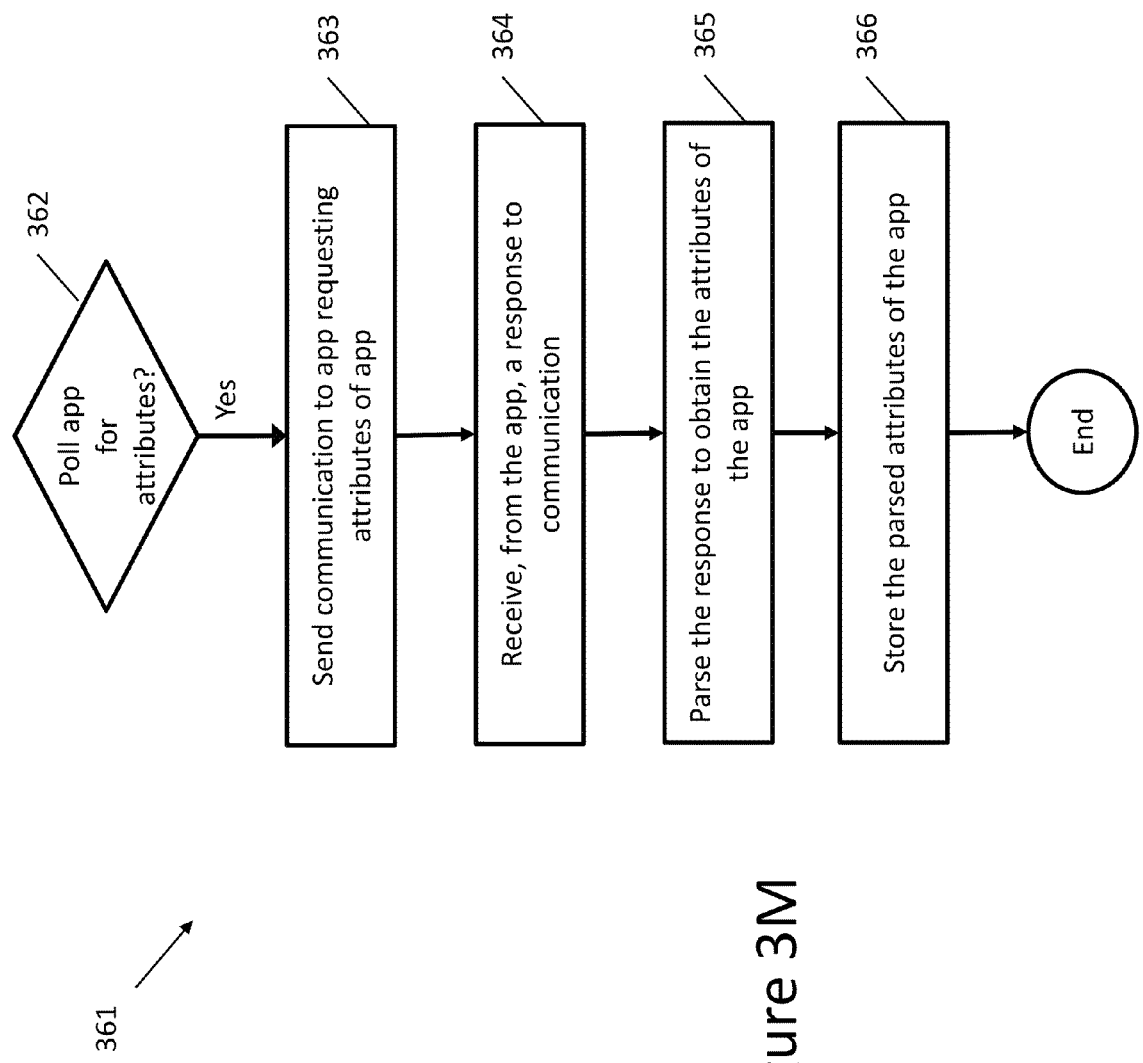
FIG. 3M is a flow diagram in which the car safe program (either resident in the head unit or in the smartphone) poll one or more apps to determine the attributes of the respective apps.

FIG. 3M is a flow diagram 361 in which the car safe program (either resident in the head unit or in the smartphone) polls one or more apps to determine the attributes of the respective apps. At 362, it is determined whether to poll the app for attributes. If so, at 363, a communication is sent to the app requesting attributes of the app. In one embodiment, the communication may be sent from the head unit electronics to the smartphone in which the app resides. In an alternative embodiment, the communication may be sent within a smartphone (such as when the car safe control software and the app are resident in the same smartphone, see FIGS. 3J-L). The requested attributes may comprise the functionalities of the app, characteristics of the functionalities of the app, etc. Though not depicted, the app, in response to receiving the communication, may generate a response that includes one or more of its attributes. At 364, in response to sending the communication to the app, the car safe control software receives a response from the app to the communication. At 365, the response is parsed to obtain the attributes of the app that are contained in the response. At 366, the parsed attributes are stored for future use (such as discussed in FIG. 3O).

Figure 3N:
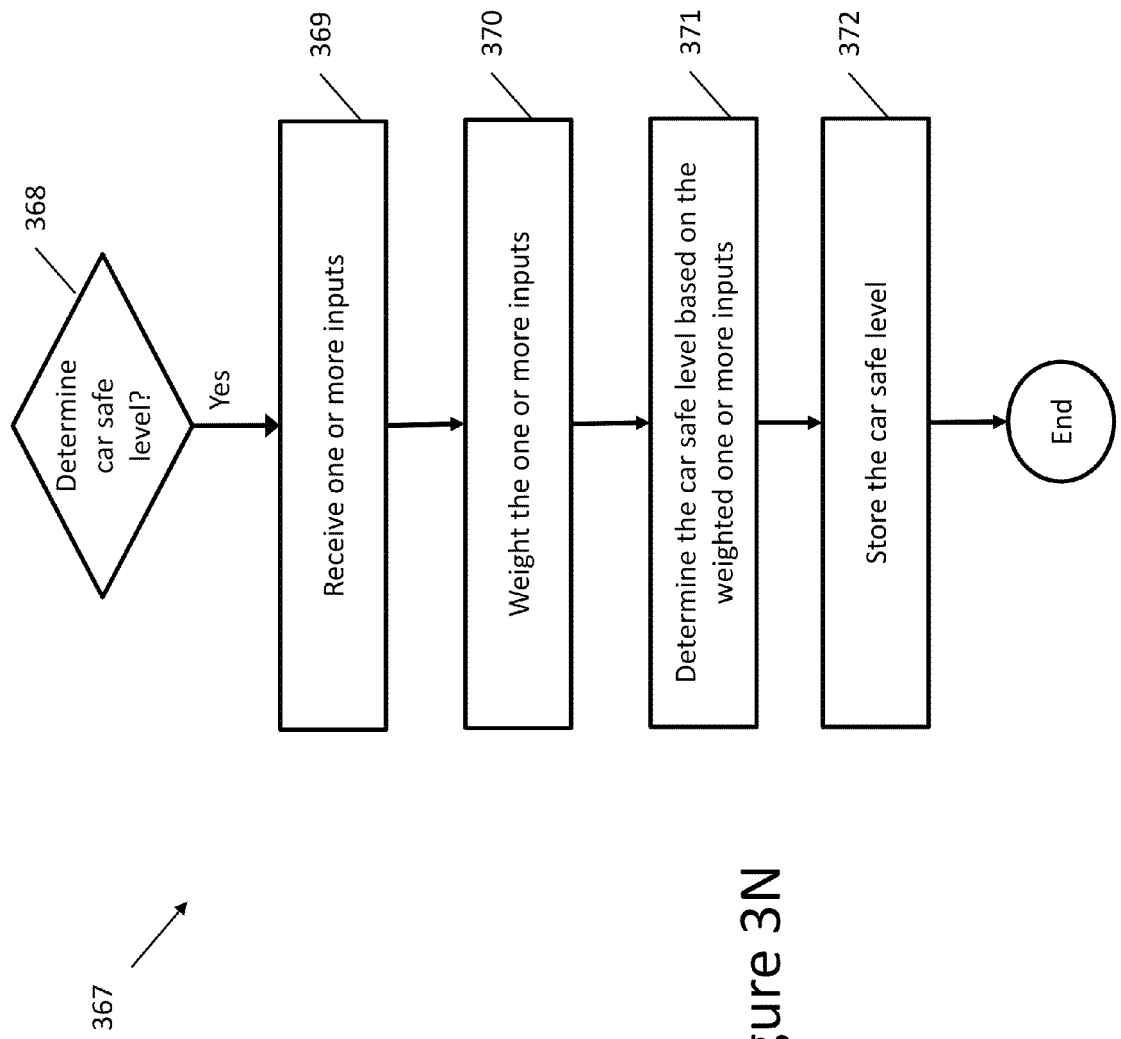
FIG. 3N is a flow diagram in which the car safe logic (either resident in the head unit or in the smartphone) determines the car safe level.
Figure 30:
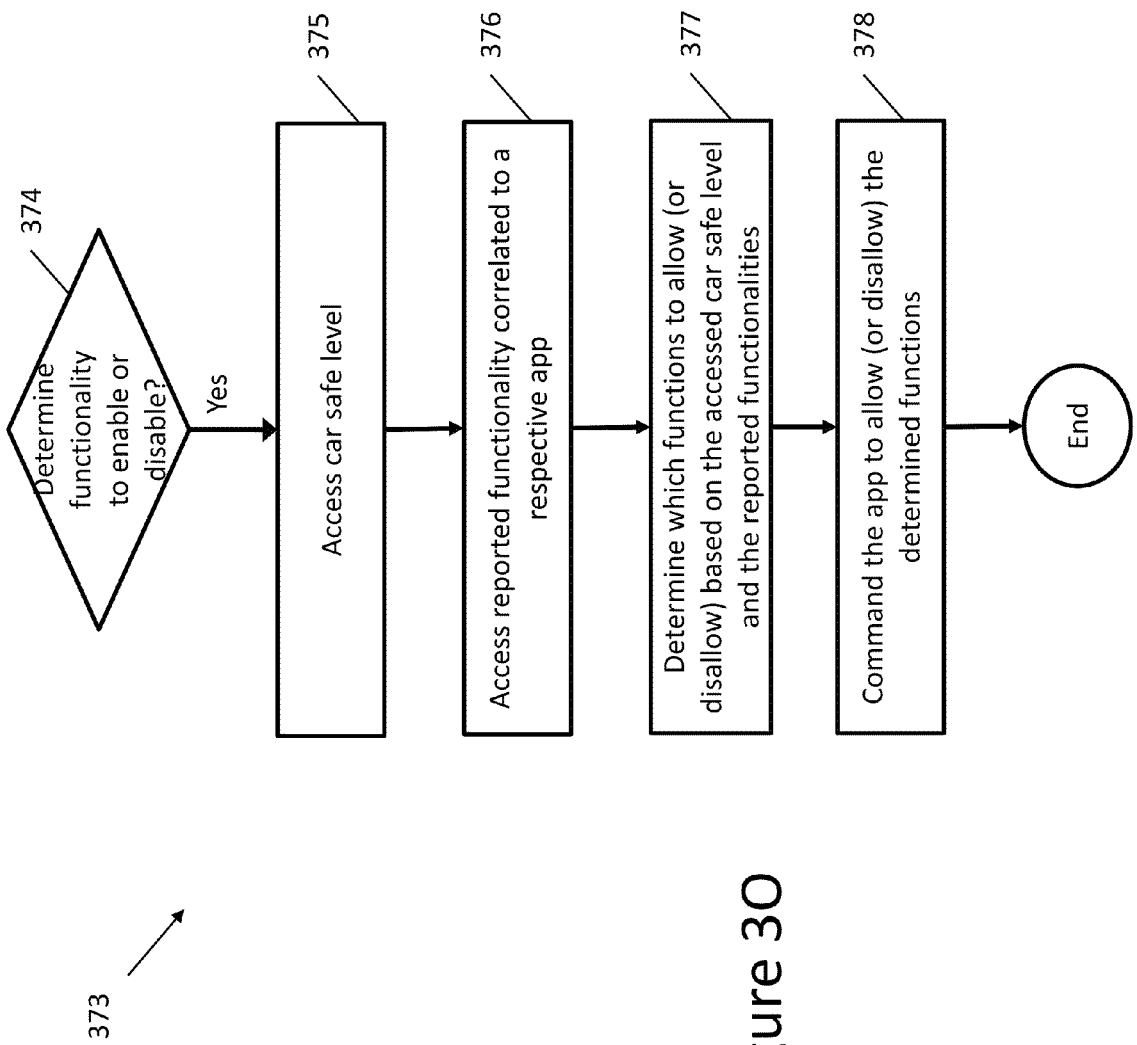

FIG. 3N is a flow diagram 367 in which the car safe logic (either resident in the head unit or in the smartphone) determines the car safe level. As discussed above, the car safe level is an indicator of a need for driver awareness. The greater the car safe level, the greater the need for the driver to pay attention to driving. Thus, increased speed, inclement weather, bad traffic, etc. are each indicators that the driver needs to pay greater attention to the road.

At 368, it is decided whether to determine the car safe level. The car safe level may be determined periodically, such as, for example, every second. Alternatively, the car safe level may be determined in response to a change in one or more of the inputs illustrated in FIG. 3B-1, 3B-2, 3I-1 or 3I-2. If yes, at 369, one or more of the inputs is received. Regardless, during a car ride, the car safe level may vary based on changes in the inputs. For example, the car safe level may be dynamically updated, changing based on the speed of the vehicle. As discussed above, the car safe level may be at a first level (such as 0 when the speed of the vehicle is 3 MPH or less) and may be at a second level (such as 2 when the speed is at least 10 MPH).

At 370, the one or more inputs may optionally be weighted. Weighting may depend on a variety of factors. In one example, the OEM may provide some or all of the weights. Alternatively, or in addition, one or more rules may be used in order to determine the car safe level. The rules may be dependent on the one or more inputs. An example rule may comprise that vehicle speed greater than 60 MPH results in a car safe level of 8 or greater. At 371, the car safe level is determined based on the weighted one or more inputs. For example, weights may be selected such that added weighted inputs may result in the car safe level (the added weighted inputs result in a value between 0 and 10). At 372, the car safe level may be stored for later use.

FIG. 3O is a flow diagram 373 in which the functionality determination logic (either resident in the head unit or in the smartphone) determines which functions are allowed or disallowed. At 374, it is decided whether to determine the functionality to enable (or disable). For example, if an updated car safe level is determined, it may be decided to determine the functionality to enable (or disable). If yes, at 375, the car safe level is accessed. At 376, optionally, the previously reported functionality may be accessed. As discussed above with respect to FIG. 3M, attributes of an app, such as the functionality or characteristics of a particular app, may be polled. The polled attributes of the particular app may be stored by the car safe program and correlated with the particular app. At 377, it is determined which functions to allow (or disallow) based on the accessed car safe level (and optionally based on the reported functionalities). At 378, a command is sent to the app to allow (or disallow) the determined functionality (or functionalities). As one example, if the determined car safe level indicates functionality X and functionality Y are disallowed, and the app only reported functionality X, then the software may send a command to the app that indicates that functionality X should be disabled. As another example, if the determined car safe level indicates functionality X and functionality Y are disallowed, and the app was not polled for its functionality, then the software may send a command to the app that indicates that functionality X and functionality Y should be disabled. In the event that the app only has functionality X, the app may have the intelligence to disable functionality X and to disregard the command to disable functionality Y (since the app does not have functionality Y).

Figure 3P:
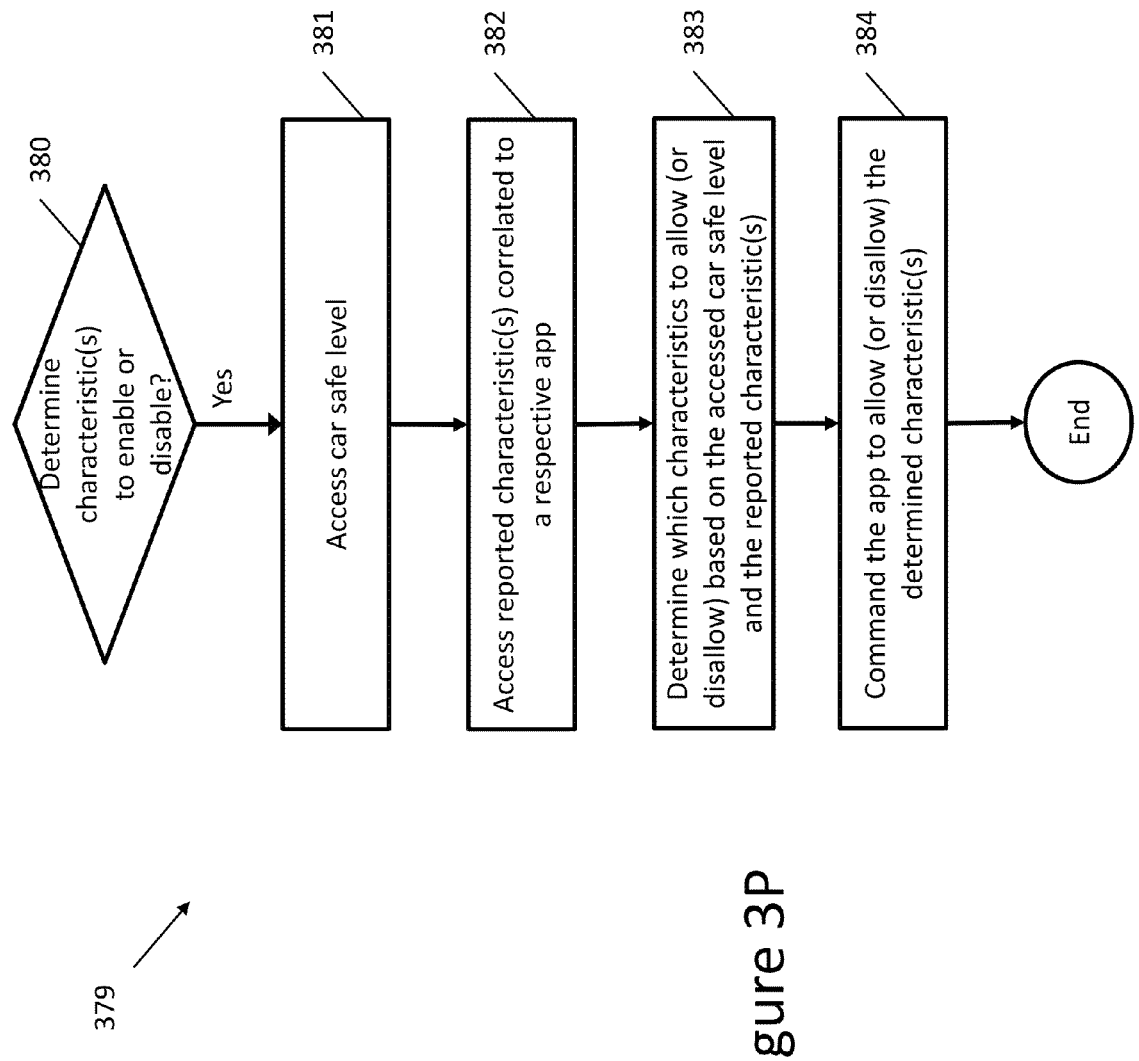
FIG. 3P is a flow diagram in which the characteristic determination logic (either resident in the head unit or in the smartphone) determines which characteristics are allowed or disallowed.

FIG. 3P is a flow diagram 379 in which the characteristic determination logic (either resident in the head unit or in the smartphone) determines which characteristics are allowed or disallowed. At 380, it is decided whether to determine the characteristic(s) to enable (or disable). For example, if an updated car safe level is determined, it may be decided to determine the characteristic(s) to enable (or disable). If yes, at 381, the car safe level is accessed. At 382, optionally, the previously reported characteristic(s) may be accessed. As discussed above with respect to FIG. 3M, attributes of an app, such as the functionality or characteristics of a particular app, may be polled. The polled attributes of the particular app may be stored by the car safe program and correlated with the particular app. At 383, it is determined which characteristic(s)

to allow (or disallow) based on the accessed car safe level (and optionally based on the reported characteristic(s)). At 384, a command is sent to the app to allow (or disallow) the determined characteristic(s). As one example, if the determined car safe level indicates characteristic A and characteristic B are disallowed, and the app only reported characteristic A, then the software may send a command to the app that indicates that characteristic A should be disabled. As another example, if the determined car safe level indicates characteristic A and characteristic B are disallowed, and the app was not polled for its characteristic(s), then the software may send a command to the app that indicates that characteristic A and characteristic B should be disabled. In the event that the app only has characteristic A, the app may have the intelligence to disable characteristic A and to disregard the command to disable characteristic B (since the app does not have characteristic B).

FIG. 3Q is a flow diagram 393 in which the smartphone detects an association with a vehicle and monitors operation and/or environment of the vehicle in order to determine whether to modify operation of apps being executed in the smartphone or in the vehicle. At 394, the smartphone determines whether there is an association with a vehicle. As discussed above, there are several ways in which the smartphone may determine whether it is associated with a vehicle. In one embodiment, the processor of the smartphone executing the car safe functionality is configured to determine whether there is an association with the vehicle by determining whether the smartphone is in near field communication (e.g., Bluetooth) with the head unit of the vehicle. In an alternate embodiment, the processor of the smartphone is configured to determine whether there is an association with the vehicle by determining whether a network is formed amongst the smartphone and the head unit.

In response to the smartphone determining no association with the vehicle, the smartphone may prevent or reject modifying operation of the app the current operation or the current environment of the vehicle.

In response to determining that the smartphone has an association with the vehicle, the smartphone may then monitor one or both of the current operation or the current environment of the vehicle in order to determine whether and/or how to modify operation of apps running on either the smartphone or the head unit of the vehicle. In one embodiment, at 395, the trigger for the car safe functionality executed on the smartphone to determine whether and/or how to modify operation of apps is whether there is data and/or an alert related to the current operation or the current environment of the vehicle. In a first more specific embodiment, in response to the smartphone generating data and/or an alert related to the current operation or the current environment of the vehicle, the smartphone may determine whether and/or how to modify operation of apps. In a second more specific embodiment, in response to the smartphone receiving data and/or an alert related to the current operation or the current environment of the vehicle (e.g., receiving the data or alert from the head unit), the smartphone may determine whether and/or how to modify operation of apps. In a third more specific embodiment, in response to the smartphone generating and/or receiving data and/or an alert related to the current operation or the current environment of the vehicle, the smartphone may determine whether and/or how to modify operation of apps.

At 396, the smartphone may analyze at least one aspect of the current operation and/or current environment of the vehicle. In one embodiment, the analysis may be based, at least in part, on the data and/or the alert in 395. As discussed above, the analysis may comprise determining, based on the data and/or the alert, a car safe level. The car safe level may, in turn, be used to determine which functionality/characteristics are allowed or disallowed.

In response to the analysis at 396, at 397, at least one aspect of the app being executed on the smartphone or in the head unit is modified. In one embodiment, the smartphone allows or disallows functionality of the app being executed on the smartphone. Alternatively, or in addition, the smartphone may transmit a communication to the head unit, the communication indicative to the head unit to modify operation of the app in the head unit (e.g., the communication is indicative to the head unit to disallow at least one functionality or characteristic of the app being executed in the head unit).

For example, the data or the alert may be indicative or be based on the speed of the vehicle. The speed may be determined by the head unit and transferred to the smartphone. Alternatively, the speed may be calculated by the smartphone. Regardless, the processor on the smartphone may analyze the speed of the vehicle and, based on the analysis of the speed, determine whether or how to modify the operation of the app (e.g., disable text entry into the smartphone or into the head unit).

State transition 301 initiates a registration process 400 as described in FIG. 4. 410 makes an API call with the Car Safe Registration number for the application. The registration is verified at 420. If the verification fails 430, the Car Safe Service Controller 320 does not register the app and it acts as if it is yet another non Car Safe App for the duration of the session. If the registration is valid, at 420 the App is registered in 440 and the registered and the process terminates 450. This function, when successful, makes the application Car-Safe Aware. For example, the Car Safe Agent knows about this application as active in the system operating in the vehicle.

Figure 5:
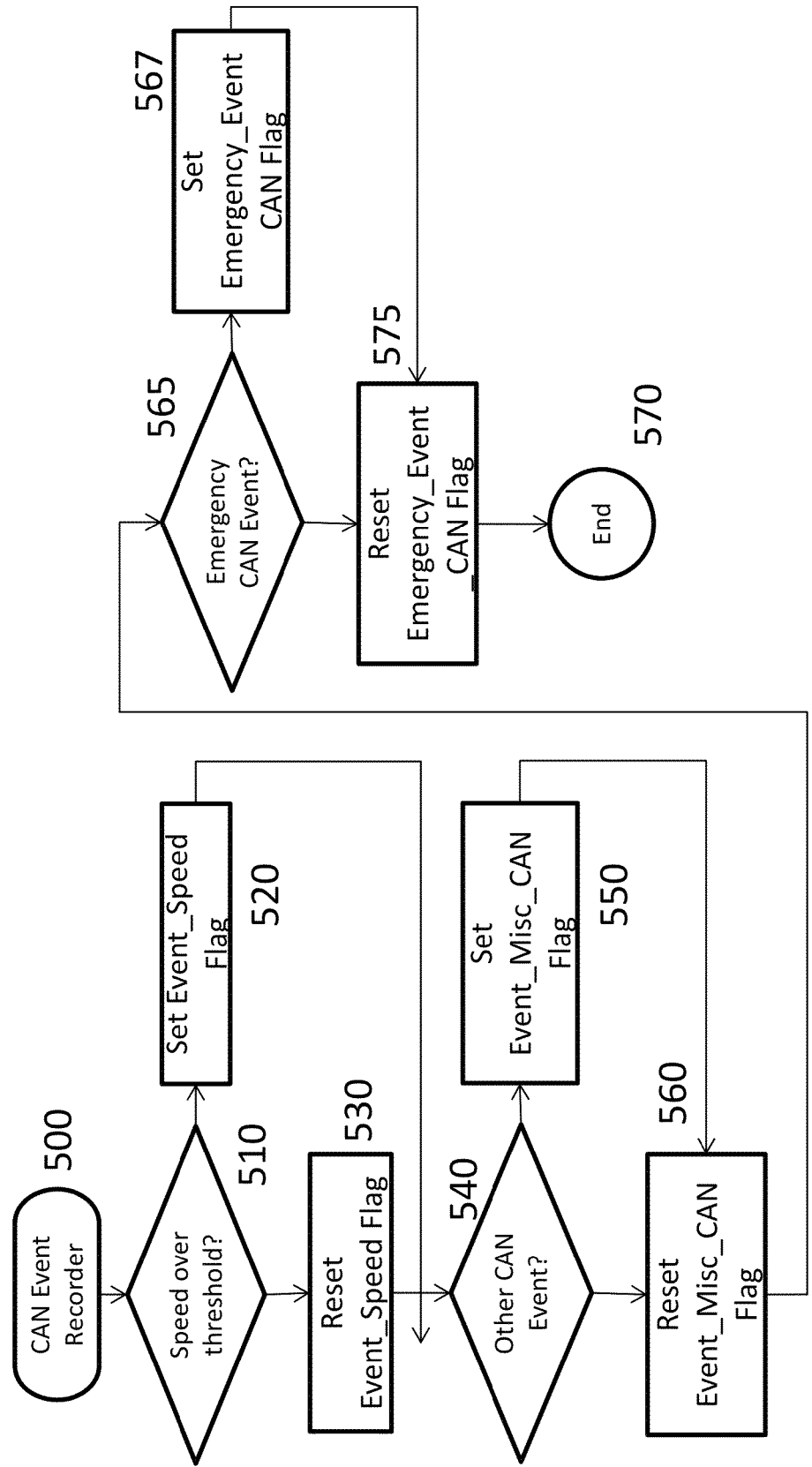
FIG. 5 is a flow diagram of the functionality performed by the CAN alert manager.

As discussed above, one or more alerts may be generated based on information from the vehicle. FIG. 5 describes one example of the functionality for generating alerts using information from the CAN bus. A similar flow chart for FIG. 5 may be created for other types of alerts, such as an ADAS related alert. More specifically, FIG. 5 is a flow diagram of the functionality performed by the CAN/ADAS/smartphone alert manager 322. State transition 302 initiates the CAN Alert notification 500 to the Car Safe Service Controller 320. At 510, the speed is checked to see if the speed is over the threshold. If the threshold is reached, then the Speed Event flag is set at 520 and the CAN Event Alert is initiated. If the threshold is not reached then the Event flag is reset at 530 and notification is made back to Car Safe Service Controller 320. At 540, other Can events are checked during Misc CAN Alerts that are flagged in the configuration. If a miscellaneous CAN is set, at 550 a notification issues. Otherwise, at 560, the CAN Misc flag is reset. If the configuration does not have any Misc flag set, blocks 540-560 are not executed. Similarly the program checks for Emergency CAN event in 565, e.g. tire burst, fuel empty and sets the High_Alert_CAN flag, otherwise at 575 the High_Alert_CAN flag is reset. If there is no Emergency CAN event then blocks 565-575 are not executed.

Figure 6:
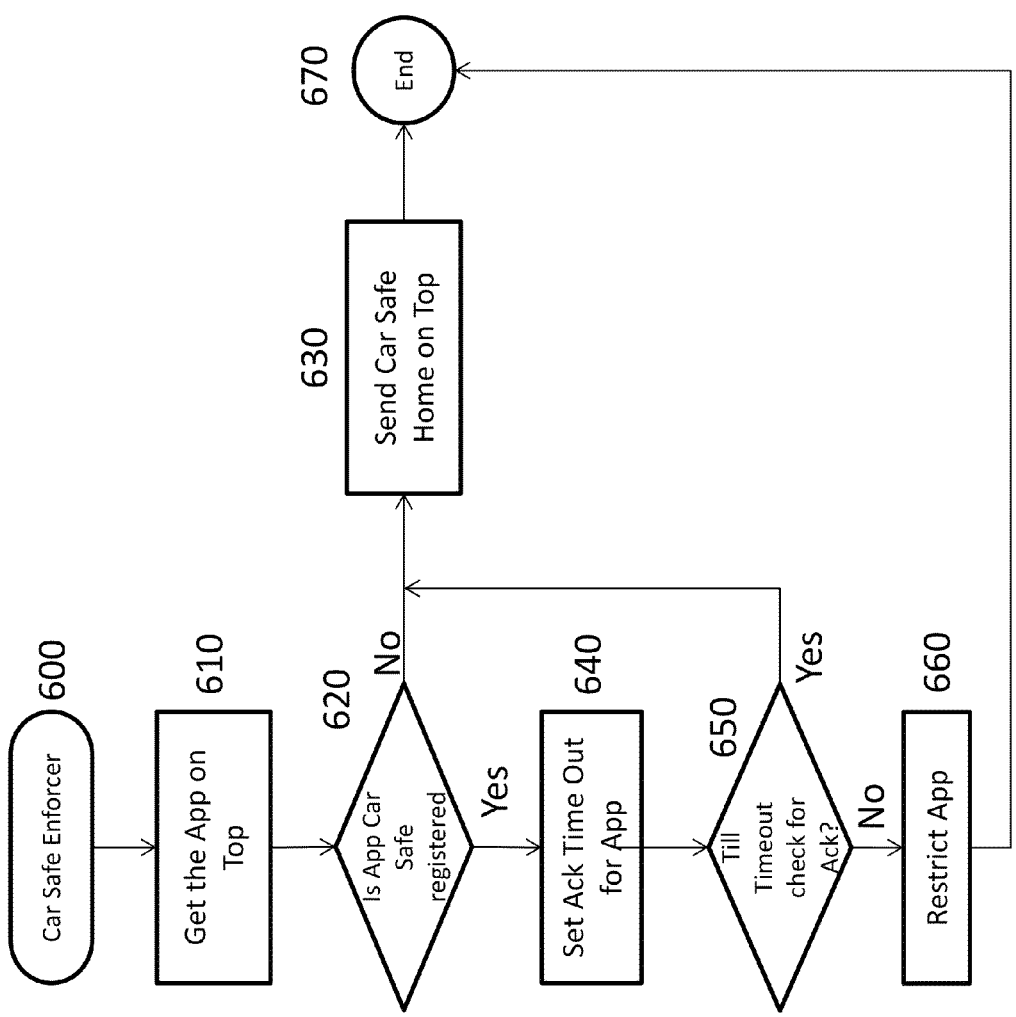
FIG. 6 is a flow diagram of the functionality performed by the car-safe service controller.

As discussed above, one or more factors may be used to determine whether (and how) to modify operation of the apps. The one or more factors include any combination of the following: the type of alert (e.g., speed alert versus catastrophic alert); the type of app (e.g., whether or not the app is designated as "car safe"), the type of device executing the app and/or used to output the app (e.g., whether the app is outputting on a display on the head unit visible to the driver or on a display visible to a passenger; whether the app is being executed by the head unit FIG. 6 is a flow diagram of the functionality performed by the car-safe service controller 320. When the Threshold Alert at 302 is sent to the Car Safe Service Controller 320, the alert triggers the Car Safe System to become active. The Car Safe System functionality, which may be implemented in Car Safe Service Controller 320, examines one or more of the following to determine whether (and how) to modify operation of the app: the type of alert; whether the app is designated as "car safe"; the type of device, etc. For example, the process starts with 600. 610 requests for the App on top and tests whether the App is "car safe" at 620. If the App is not "car safe", then operation of the App is modified, such as setting the Home App on top in 630 (thereby putting the App into the background) and terminating at 670. If the App is "car safe", it may then be determined whether (or how) to modify operation of the App. A timer may be used to determine whether an acknowledgement has been received from the App. Specifically, a time-out clock is set for receiving an Ack receipt from App in 640. At 650, it is determined whether the timeout has expired. If Ack is not received in 650, then the App is deemed as not "car safe" (the App did not send an acknowledgement as to the proper "car safe" operation). The operation of the App is then modified, such as by bringing the home app in 630 and terminate in 670. If Ack is received in 650, proceed to restrict the App in 660 according to the Policy established then terminate 680.

Under special alert from 302 to 320 (e.g., indication of tire pressure loss or burst, lane guidance warning received, traffic congestion sensed based on video from surround cameras indication that the battery is not charging, indication that the fuel gauge is registering empty), the Car Safe System may send an event notification 312 to Signed Car Safe High Alert App 345. This event notification 312 brings the Car Safe High Alert App 345 to the foreground with the appropriate message (such as indicating the type of high alert). Block 345 further sends 313 Ack back to 320.

Figure 7:
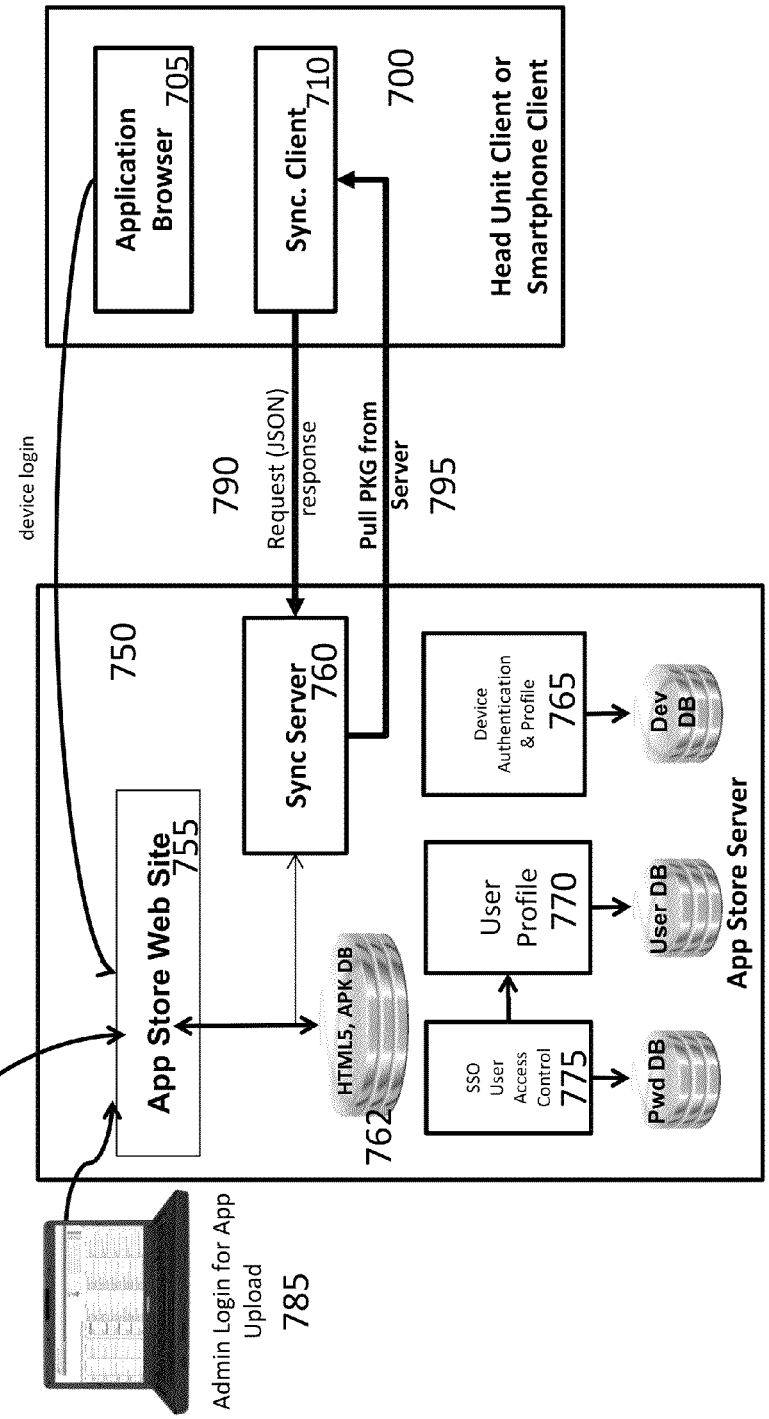
FIG. 7 is a block diagram of the app store architecture.

Another stage in the life cycle of an app is downloading of the app. FIG. 7 is a block diagram of the App Store architecture. FIG. 7 elaborates on the App Store Architecture for Android/HTML5 systems. Android/HTML5 systems are merely discussed as examples of different systems. FIG. 7 illustrates Server 750 and Client 700. The Client 700 may be either a head unit device or a smartphone screen. The Client 700 may install an app using the Application Browser 705 available in the client. The Sync. Client 710 may retrieve any packages that have to installed, deleted or refreshed in the server 750. Sync. Client 710 communicates to its counterpart Sync Server 760 in the Server 750 using JSON request 790 and then pull the packages into head unit with 795.

The Server 750 may be organized as an App Store Web Site 755, Sync Server 760, HTML5 data base 762, SSO (Single Sign On) User Access control 775, User profile 770 and Device Authentication and profile 765. Each of the blocks 775, 770 and 765 may have their respective databases, or may be combined into a single database. Administrative login 785 allows the installation of Apps in the Web Portal, while 780 allows electronic devices, such as iPad®-like devices, to perform the App administration such as Launch, Delete, Refresh of Apps.

The Server 750 is architected so that if request 790 comes as Android JSON requests, then Server 750 shows only the APK packets. Similarly, for HTML5 JSON requests the server 750 shows only OPKg lists.

In one embodiment, the app may be downloaded to the head unit. In this embodiment, prior to accepting the download of the app, the head unit may determine whether the app is designated as "car safe" or may determine whether the head unit may control operation of the app based on different operations of the vehicle. If the head unit determines that the app is "car safe" or can be controlled based on different operations of the vehicle, the app is downloaded into the head unit. If the head unit determines that the app is not "car safe" or cannot be controlled based on different operations of the vehicle, the head unit rejects the download. Alternatively, the head unit may accept download of the app regardless of whether the app is designated as "car safe" or may determine whether the head unit may control operation of the app based on different operations of the vehicle. Instead, upon requesting execution of the app by the head unit, the head unit may determine whether the app is designated as "car safe" or may determine whether the head unit may control operation of the app based on different operations of the vehicle. If the head unit determines that the app is "car safe" or can be controlled based on different operations of the vehicle, the app is executed by the head unit. If the head unit determines that the app is not "car safe" or cannot be controlled based on different operations of the vehicle, the head unit rejects execution of the app.

In an alternate embodiment, the app may be downloaded to a smartphone, which communicates with the head unit, such as illustrated in FIGS. 1D-E. In this embodiment, upon the app (which is executing on the smartphone) requesting access to the head unit (such as receiving data from or sending data to the head unit), the head unit may determine whether the app is designated as "car safe" or may determine whether the head unit may control operation of the app based on different operations of the vehicle. If the head unit determines that the app (executing on the smartphone) is "car safe" or can be controlled based on different operations of the vehicle, the head unit grants access by the app to the data on the vehicle (e.g., begins communicating data to the app on the smartphone). If the head unit determines that the app is not "car safe" or cannot be controlled based on different operations of the vehicle, the head unit rejects communication with the app.

Figure 8:
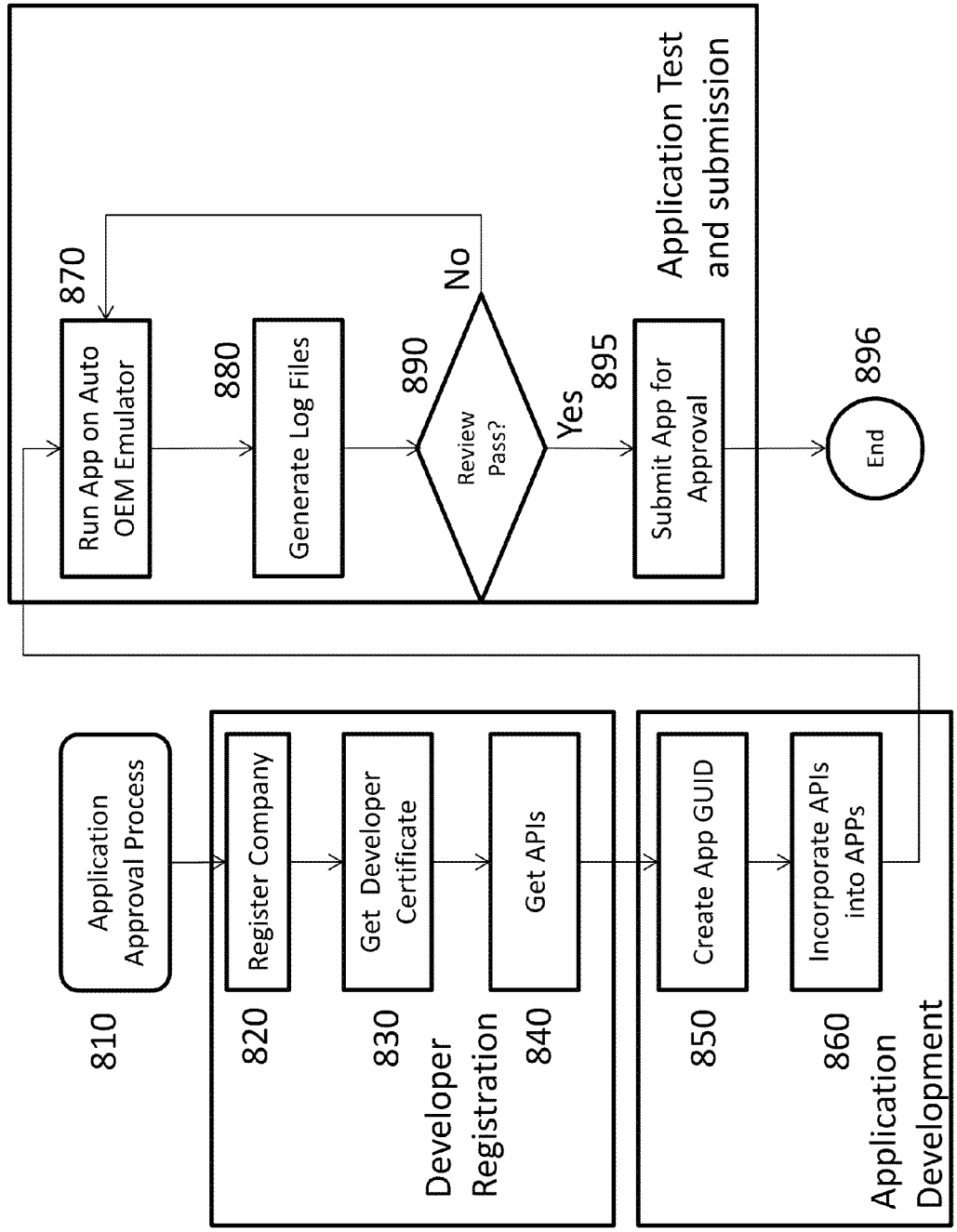
FIG. 8 is a flow diagram of the app approval process on the Internet.

Still another stage in the life cycle of an app is testing. An environment may be configured for automated testing and classification of apps so that third parties may integrate the apps into the automotive app world. FIG. 8 is a flow diagram of the app approval process on the Internet. Application process commences with block 810 in FIG. 8. Blocks 820-840 are part of the registration developer registration block which includes an application developer to register his company, obtain a developer certificate and access the "car safe" APIs for incorporation into the app. The "car safe" APIs are one way in which to enable the control of the app by the head unit (or the smartphone). More specifically, when a vehicle alert is issued, the car safe service controller 320 may issue a command using one or more of the "car safe" APIs in order to control the app as desired.

Blocks 850-860 comprise of the Application Development process wherein the customer creates an identification for this application and incorporates the "car safe" APIs into its app prior to testing. The third set of blocks (870-895) is the Application Test and submission for approval process. After which, at 896, FIG. 8 ends One or more APIs may be used, including for example, API: CS_U_API. CS_U_API details the list of APIs that may be made available in SDK and platform runtime to allow 3rd party developers to develop applications that can be published as certified for "car safe" operation. The methods include:

Handle CS_RegisterApp(AppID): Input: Application Identifier. Output: Returns an handle(hCS) which may be passed to all subsequent calls as a context.

Response CS_Subscribe(hCS, EventEnum): Inputs: (1) Handle to the context; (2) Event that needs to be subscribed for. Output: Response code, which indicates success or error.

Status CS_GetStatus(hCS): Input: Handle to the context. Output: Status of CAR Safe state (e.g., moving or parked).

Error CS_GetError(hCS): Input: Handle to the context. Output: Error code if in error state, else 0.

Response CS_AcknowledgeEvent(hCS, EventEnum): Inputs: (1) Handle to the context; (2) Event which is handled currently. Output: Response code, which indicates success or error.

Response CS_SetParams(hCS, param): Inputs: (1) Handle to the context; (2) Param list of available settings, such as speed threshold, sampling frequency etc. Output: Response code, which indicates success or error.

Response CS_EnquireOtherAppForCSSafe(hCS, AppID): Inputs: (1) Handle to the context; (2) Application Identifier to check if safe to run or not. Output: Response code, which indicates success or error.

Events include the following: (1) Event(Registered); (2) Event(Moving), set the application to distraction safe mode; (3) Event(Parked), set the application to full functional mode; and (4) Event(Error).

The application developer may be provided one or more options of OEM test emulation (e.g., Toyota, Nissan, Mazda) on which the App is tested. Each OEM may require its own testing and install process.

Figure 9:
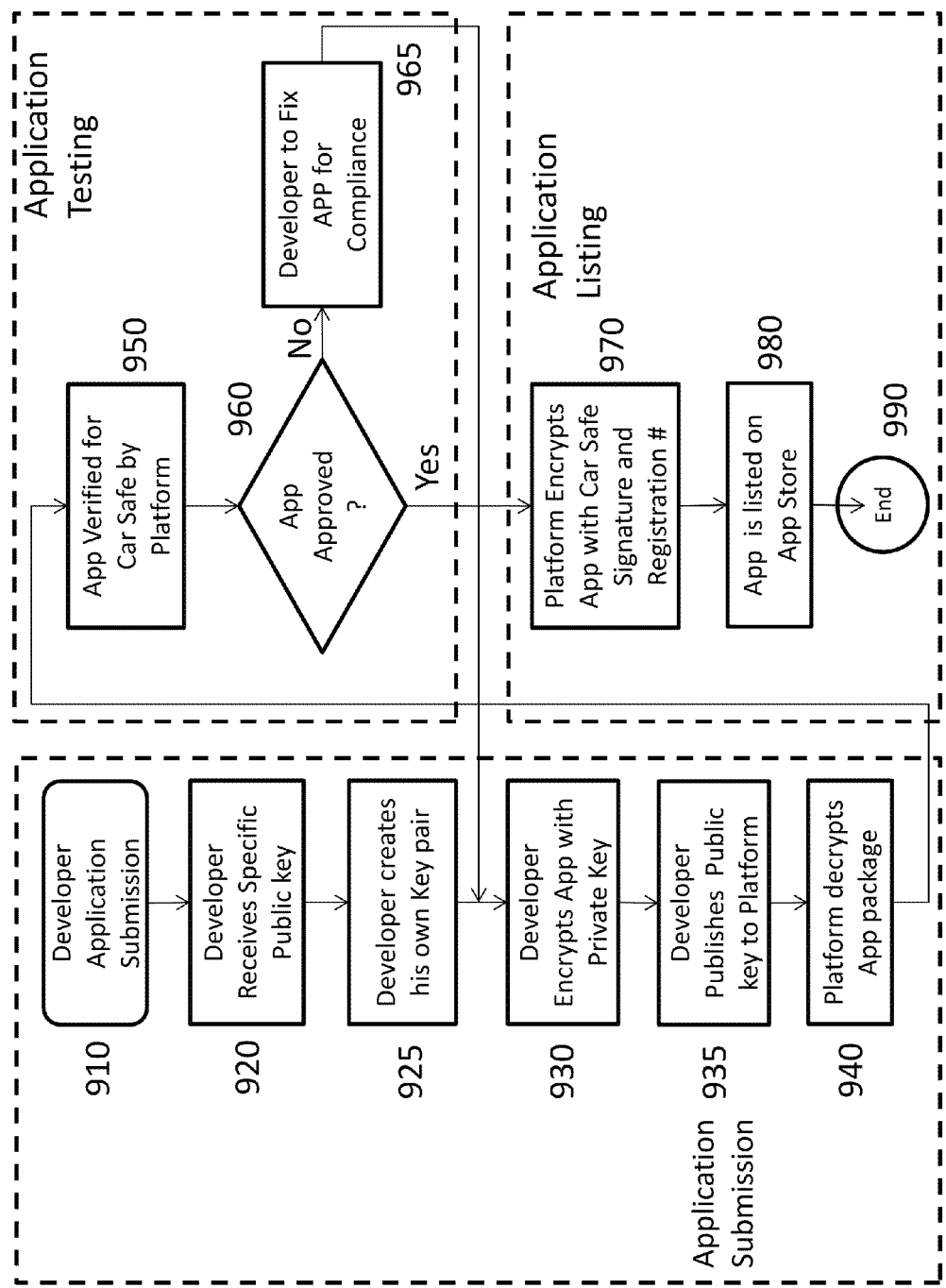
FIG. 9 is a flow diagram of the app submission, approval and listing in the app store.

FIG. 9 is a flow diagram of the app submission, approval and listing in the app store. The Application submission process is illustrated in a series of blocks 910-940, in which the developer may present his application for approval using a secure process. This involves a Platform, such as an Excelfore Platform, generating a public and a private key pair for the developer by the Platform. The developer is then assigned the public key at 920, with the developer then creating his own public and private key pair at 925. The developer encrypts his applications using his Platform public and his private key at 930. The developer then sends the encrypted package application with his public key at 935. At 940, the Platform accepts the package and decrypts it using the developer public key presented and the Platform's own private key.

The application may then enter the testing phase. At 950, the Application Testing phase involves testing by the Platform for "car safe" attributes. At 960, if the application is approved, it is presented for listing in the App Store. Otherwise, at 965, the application is returned to the developer for compliance fixes The application listing process may involve taking the approved developer application, adding a designation (such as a car-safe signature specific to the device or OEM), and encrypt the combination (such as encrypting using a Platform private key specifically generated for the device or OEM at 970). The device has a specific key stored during manufacturing and provisioning of the device. This process may result in the application only being able to be registered on one specific device. The application is then listed in the App Store at 980. The listing process may be either to a consumer marketplace portal or an OEM specific portal. At 990, FIG. 9 ends.

Figure 10:
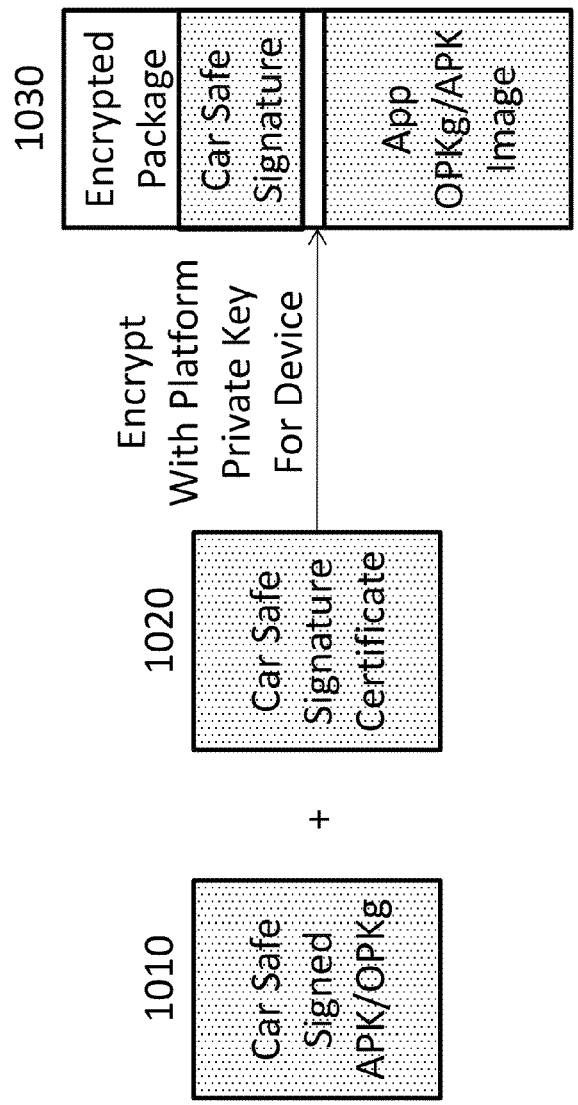
FIG. 10 is a block diagram of the creation of a secure app container for listing in the app store.

FIG. 10 is a block diagram of the creation of a secure app container for listing in the app store. More specifically, the application package process prior to listing is illustrated in FIG. 10. 1010 represents the approved "car safe" application, which is then combined with a "car safe" signature certificate 1020 and encrypted with a private key created for the OEM device 1030.

Figure 11:
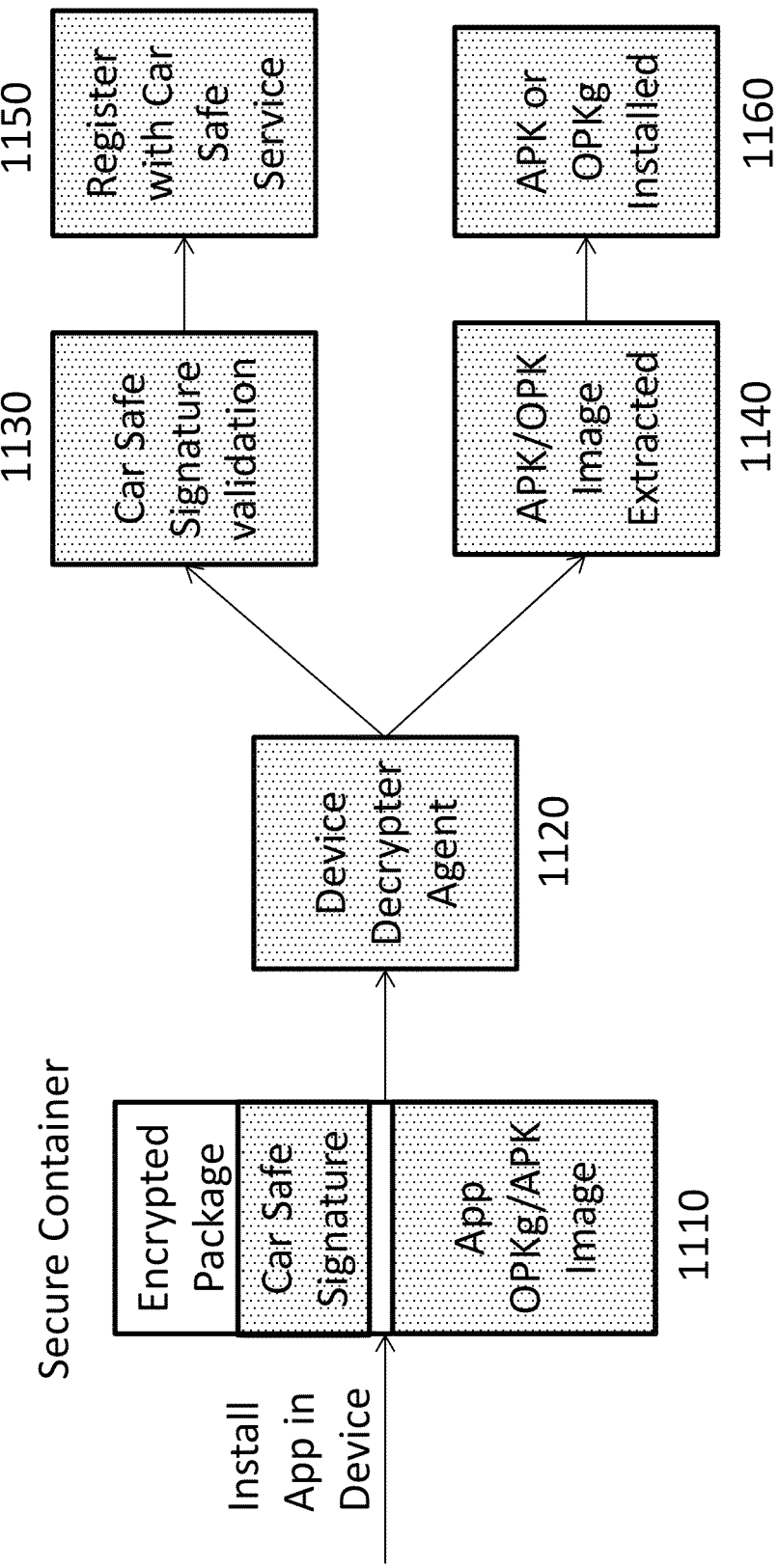
FIG. 11 is a block diagram of the car-safe app installation on the head unit or the smartphone device.

FIG. 11 is a block diagram of the car-safe app installation on the head unit or the smartphone device. In particular, FIG. 11 describes the procedure of a static installation of the app in a head unit device or a smartphone which is paired with the head unit. This installation is termed as static because it is the stage where the application is not executing but has been installed using the Platform sync agent, into the system. The process involves taking the encrypted package 1110, which is decrypted using the device decryptor agent 1120. This results in the two packets, one is the "car safe" signature packet 1130 and the other is the approved application 1140. The "Car Safe" Signature for the application is registered with the Car Safe System 1150 and the application package (e.g., APK for Android or OPKg for HTML5) is installed as any normal application in 1160.

Figure 12:
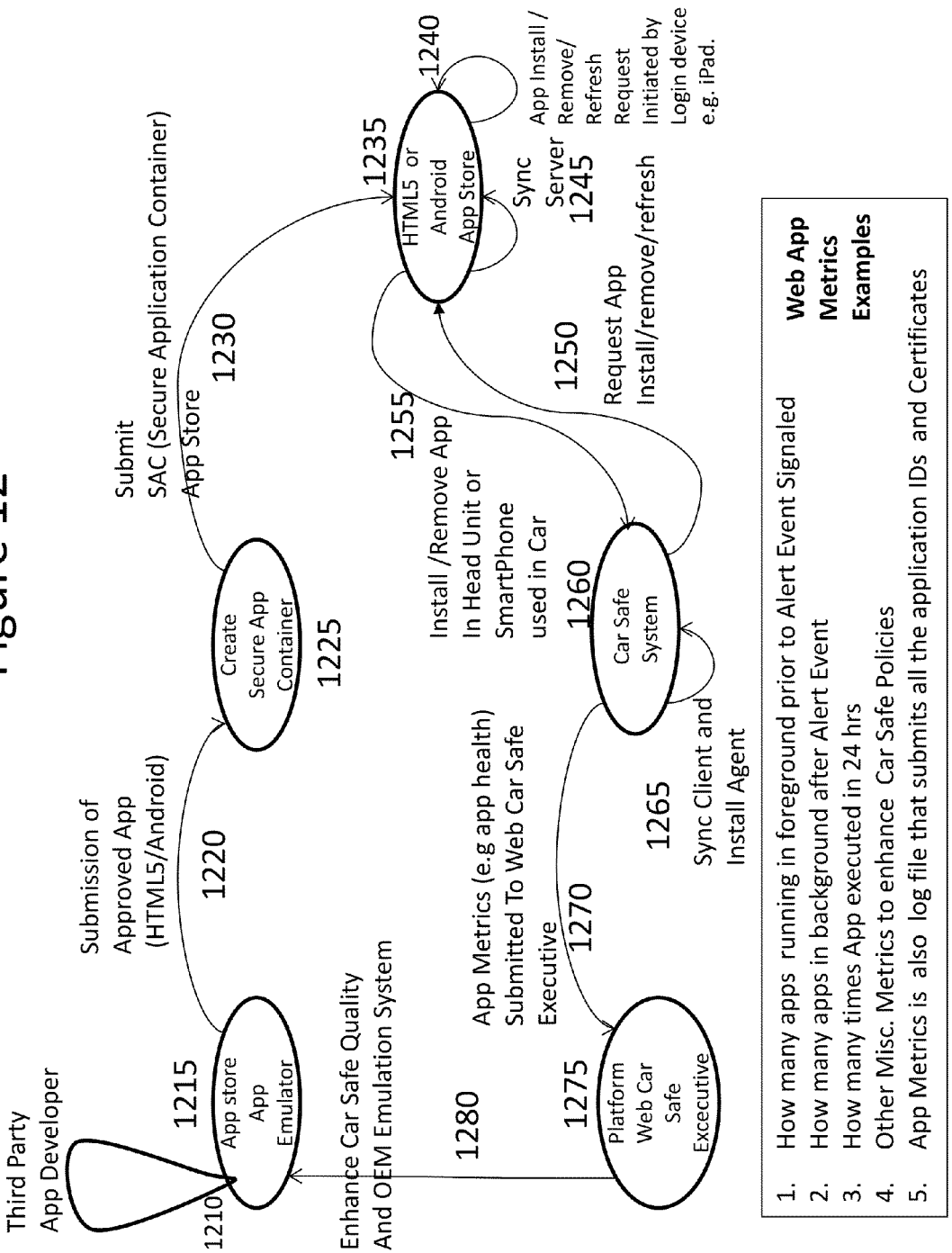
FIG. 12 is a process diagram of the car-safe app install management system.

FIG. 12 is a process diagram of the car-safe app install management system. More specifically, FIG. 12 illustrates a static flow diagram of the process of Applications that are installed and how the Internet supports how they are administered (install, Remove, Refresh, Billing, Provisioning and other functions) from the Internet onto the device. The first block is 1215 which is the Appstore Emulator, that contains emulation environment for each OEMs. The reason for different environments is because head units may carry a different screen resolution and or OS. So app developers 1210, need to work out the proper mechanics of their application on the simulation platform. In this way most of the basic testing of the applications and its behavior are tested before they are submitted for final approval and acceptance.

Applications following testing in the emulation environment are presented for approval in 1220. 1225 proceeds to take the approved app and create a secure container. 1230 presents the secure container for listing into the Appstore 1235.

Appstore also acts as a center for performing application administration into a Head Unit/Smartphone device as directed. While the actions can be initiated by 1240 or 1250, the request action is acknowledged and completed by 1255 in conjunction with the Sync server 1245 in the Appstore 1235 and the 1265 Sync Client in the Device. An application cache in the 1235 maintains a mirror of all installed applications in the device.

Functions performed by 1235+1255 include, but are not limited to: installing applications into a device; removing applications from a device; automatically refreshing an application if flagged and also when OEM requests an OS refresh into the device; billing in which some applications may have a cost associated with them and if purchased, then the user is billed for the application through the Appstore.

Commands for install/remove applications may be initiated through a browser interface from either the Device or an external device e.g., an iPad® that logs into the Appstore and initiates action on the device subscribed.

Once the apps are downloaded into the Car Safe System, they may be registered. This is discussed above in FIG. 11.

At predetermined intervals, app activity metrics (e.g. app health, memory leaks, usage, interaction with other apps) discussed above may be loaded by 1270 into the "Car Safe Executive" running in the Appstore 1275. The inputs from the metrics are then provided by 580 to enhance the OEM emulation environment.

Figure 13:
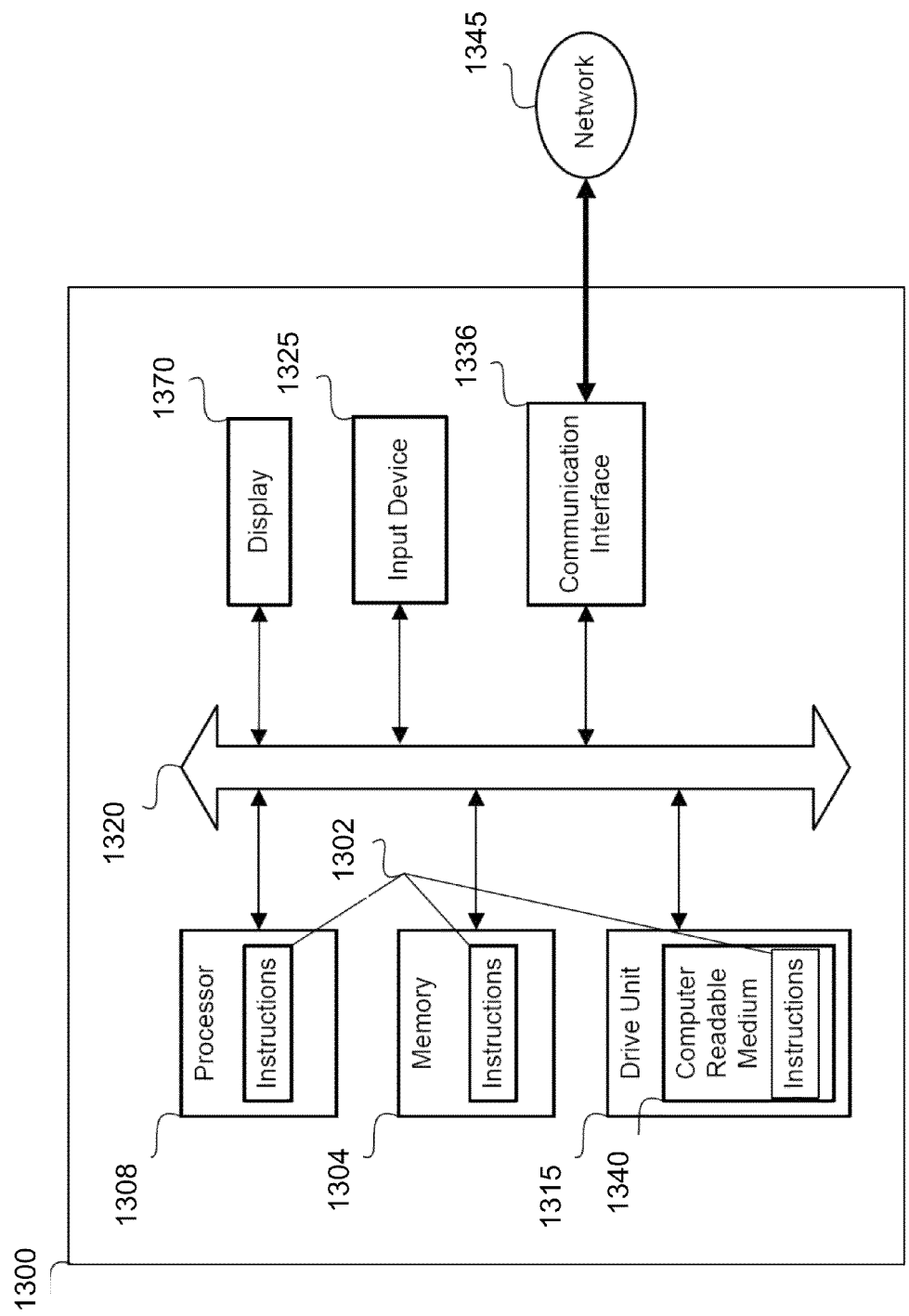
FIG. 13 is a general computer system, programmable to be a specific computer system, which may represent any of the computing devices referenced herein, such as the head unit or the smartphone.

FIG. 13 illustrates a general computer system 1300, programmable to be a specific computer system 1300, which can represent any server, electronic device or electronic component, such as the head unit client 700 or smartphone client 700, app store server 750, electronic device 780, administrative electronic device 785, head unit depicted in FIGS. 1A-C, and smartphone depicted in FIGS. 1D-E. The computer system 1300 may include an ordered listing of a set of instructions 1302 that may be executed to cause the computer system 1300 to perform any one or more of the methods or computer-based functions disclosed herein. The computer system 1300 can operate as a stand-alone device or can be connected, e.g., using the network 1345, to other computer systems or peripheral devices.

In a networked deployment, the computer system 1300 can operate in the capacity of a server or as a client-user computer in a server-client user network environment, or as a peer computer system in a peer-to-peer (or distributed) network environment. The computer system 1300 can also be implemented as or incorporated into various devices, such as a personal computer or a mobile computing device capable of executing a set of instructions 1302 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 1300 can include a memory 1304 on a bus 1320 for communicating information. Code operable to cause the computer system to perform any of the acts or operations described herein can be stored in the memory 1304. The memory 1304 can be a random-access memory, read-only memory, programmable memory, hard disk drive or any other type of volatile or non-volatile memory or storage device.

The computer system 1300 can include a processor 1308, such as a central processing unit (CPU) and/or a graphics processing unit (GPU). The processor 1308 can include one or more general processors, digital signal processors, application specific integrated circuits, field programmable gate arrays, digital circuits, optical circuits, analog circuits, combinations thereof, or other now known or later-developed devices for analyzing and processing data. The processor 1308 can implement the set of instructions 1302 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 1300 can also include a disk or optical drive unit 1315. The disk drive unit 1315 can include a computer-readable medium 1340 in which one or more sets of instructions 1302, e.g., software, can be embedded. Further, the instructions 1302 can perform one or more of the operations as described herein. The instructions 1302 can reside completely, or at least partially, within the memory 1304 or within the processor 1308 during execution by the computer system 1300. Accordingly, the databases 206 or 260 can be stored in the memory 1304 or the disk unit 1315.

The memory 1304 and the processor 1308 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 1300 can include an input device 1325, such as a keyboard or mouse, configured for a user to interact with any of the components of system 1300. It can further include a display 1370, such as a liquid crystal display (LCD), a cathode ray tube (CRT), or any other display suitable for conveying information. The display 1370 can act as an interface for the user to see the functioning of the processor 1308, or specifically as an interface with the software stored in the memory 1304 or the drive unit 1315.

The computer system 1300 can include a communication interface 1336 that enables communications via the communications network 1345. The network 1345 can include wired networks, wireless networks, or combinations thereof. The communication interface 1336 network can enable communications via any number of communication standards, such as 802.11, 802.17, 802.20, WiMax, 802.15.4, cellular telephone standards, or other communication standards, as discussed above. Simply because one of these standards is listed does not mean any one is preferred, as any number of these standards can never actually be adopted in a commercial product.

Block diagrams of different aspects of the system, including FIGS. 1A-C, 1D-E, 2, 3 and 7 may be implemented using the computer functionality disclosed in FIG. 13. Further, the flow diagrams illustrated in FIGS. 4-6 and 8-11 may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A smartphone comprising:
a transceiver;
a processor in communication with the transceiver, the processor being configured to:
determine an association with a vehicle;
in response to determining the smartphone is associated with the vehicle:
analyze at least one aspect related to a current operation or a current environment of the vehicle by analyzing an alert related to the current operation or current environment of the vehicle; and
in response to the analysis, modify at least one aspect of operation of an app,
wherein the app is configured for execution in the smartphone or in a head unit of the vehicle,
wherein the processor is configured to analyze at least one aspect related to the current operation or the current environment of the vehicle by:
determining, based on the at least one aspect, a vehicle safe indicator, the vehicle safe indicator indicative of a degree of vehicle safety; and
accessing allowed or disallowed functionalities or characteristics correlated to the determined vehicle safe indicator,
wherein the processor is configured to, in response to the analysis, modify at least one aspect of operation of the app by:
in response to determining a disallowed functionality or characteristic, modifying operation of the app such that the operation of the app does not include the disallowed functionality or characteristic.

2. The smartphone of claim 1, wherein the processor is configured to determine the association with the vehicle by determining whether the smartphone is in short range wireless communication with the head unit.

3. The smartphone of claim 1, wherein the processor is configured to determine the association with the vehicle by determining whether a network is formed amongst the smartphone and the head unit.

4. The smartphone of claim 1, wherein the processor is further configured to:
in response to determining no association with the vehicle, reject modifying operation of the app based on the at least one aspect related to the current operation or the current environment of the vehicle.

5. The smartphone of claim 1, further comprising a memory in communication with the processor, the memory configured to store the app; and
wherein the processor is configured to modify the at least one aspect of operation of the app by modifying operation of the app in the smartphone.

6. The smartphone of claim 1, wherein the processor is configured to modify the at least one aspect of operation of the app by transmitting a communication to the head unit, the communication indicative to the head unit to modify operation of the app in the head unit.

7. The smartphone of claim 6, wherein the communication is indicative to the head unit to disallow at least one functionality or characteristic of the app being executed in the head unit.

8. The smartphone of claim 1, wherein the alert comprises one of a speed alert indicative of speed of the vehicle, a weather alert indicative of weather in the current environment of the vehicle, a traffic alert indicative of traffic in the current environment of the vehicle, or an accident alert indicative of an accident in the current environment of the vehicle.

9. The smartphone of claim 1, wherein the processor is further configured to receive data related to the current operation or the current environment of the vehicle; and
  wherein the processor is configured to analyze at least one aspect related to the current operation or the current environment of the vehicle by:
    generating, based on the data related to the current operation or the current environment of the vehicle, the alert related to the current operation or current environment of the vehicle; and
    determining, based on the alert, how to modify the at least one aspect of operation of the app.

10. The smartphone of claim 1, wherein the processor is further configured to receive the alert from an electronic device external to the smartphone; and
  wherein the processor is configured to analyze at least one aspect related to the current operation or the current environment of the vehicle by:
    determining, based on the alert, how to modify the at least one aspect of operation of the app.

11. The smartphone of claim 10, wherein the smartphone is configured to receive the alert from the head unit.

12. The smartphone of claim 1, wherein the vehicle safe indicator comprises a weighted average of data related to the current operation and the current environment of the vehicle.

13. The smartphone of claim 1, wherein the vehicle is configured to generate sensor-based alerts;
  wherein the current environment of the vehicle comprises indications regarding weather and road condition; and
  wherein the vehicle safe indicator comprises a weighted average of the sensor-based alerts and the indications regarding the weather and the road condition.

14. The smartphone of claim 1, wherein the processor is configured to analyze at least one aspect related to a current operation or a current environment of the vehicle by analyzing speed of the vehicle; and
  wherein the processor is configured to, in response to analyzing speed of the vehicle, modify the at least one aspect of operation of the app.

15. The smartphone of claim 14, wherein the processor is further configured to determine the speed of the vehicle.

16. The smartphone of claim 14, wherein the processor is further configured to receive the speed of the vehicle from the head unit.

17. The smartphone of claim 1, wherein the processor is configured to analyze at least one aspect related to a current operation or a current environment of the vehicle based on a current location of the vehicle.

18. A smartphone comprising:
  a transceiver;
  a processor in communication with the transceiver, the processor being configured to:
    determine an association with a vehicle;
    in response to determining the smartphone is associated with the vehicle:
      analyze at least one aspect related to a current operation or a current environment of the vehicle by analyzing speed of the vehicle; and
      in response to the analysis, modify at least one aspect of operation of an app,
  wherein the app is configured for execution in the smartphone or in a head unit of the vehicle,
  wherein the processor is configured to analyze the speed of the vehicle by:
    determining, based on the speed of the vehicle, a vehicle safe indicator, the vehicle safe indicator indicative of a degree of vehicle safety; and
    accessing allowed or disallowed functionalities or characteristics correlated to the determined vehicle safe indicator,
  wherein the processor is configured to, in response to the analysis, modify at least one aspect of operation of the app by:
    in response to determining a disallowed functionality or characteristic, modifying operation of the app such that the operation of the app does not include the disallowed functionality or characteristic.

19. The smartphone of claim 18, wherein the disallowed functionality or characteristic comprises disabling all text entry.

20. A smartphone comprising:
  a transceiver;
  a processor in communication with the transceiver, the processor being configured to:
    determine an association with a vehicle;
    in response to determining the smartphone is associated with the vehicle:
      analyze at least one aspect related to a current operation or a current environment of the vehicle based on a current location of the vehicle; and
      in response to the analysis, modify at least one aspect of operation of an app,
  wherein the app is configured for execution in the smartphone or in a head unit of the vehicle,
  wherein the processor is configured to analyze at least one aspect related to a current operation or a current environment of the vehicle based on the current location of the vehicle by:
    determining, based on the current location of the vehicle, a jurisdiction in which the vehicle is located, the jurisdiction selected from a plurality of different jurisdictions;
    determining, based on the determined jurisdiction, one or more rules correlated to the determined jurisdiction; and
    applying the determined one or more rules in order to determine whether or how to modify operation of the app.

21. The smartphone of claim 20, wherein the processor is further configured to:
  periodically analyze the current location of the vehicle;
  determine whether the jurisdiction of the vehicle has changed based on the current location of the vehicle; and
  in response to determining that the jurisdiction of the vehicle has changed, accessing the one or more rules in the changed jurisdiction.

* * * * *